(12) United States Patent
Rodde et al.

(10) Patent No.: US 9,203,889 B2
(45) Date of Patent: *Dec. 1, 2015

(54) FACILITATING SCALABLE MOBILE MULTI-SERVICE COMMUNICATIONS INCLUDING 2-WAY VIDEO AND OTHER HIGH-BANDWIDTH SERVICES

(71) Applicant: AVISTAR COMMUNICATIONS CORPORATION, San Mateo, CA (US)

(72) Inventors: Anton F. Rodde, Santa Fe, NM (US); Lester F. Ludwig, Houston, TX (US)

(73) Assignee: Avistar Communications Corporation, San Mateo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/224,025

(22) Filed: Mar. 24, 2014

(65) Prior Publication Data

US 2014/0204172 A1   Jul. 24, 2014

Related U.S. Application Data

(63) Continuation of application No. 13/174,757, filed on Jun. 30, 2011, now Pat. No. 8,681,969.

(60) Provisional application No. 61/398,818, filed on Jun. 30, 2010.

(51) Int. Cl.
*H04M 7/00* (2006.01)
*H04L 29/06* (2006.01)
*H04N 7/14* (2006.01)

(52) U.S. Cl.
CPC ............ *H04L 65/80* (2013.01); *H04L 65/1066* (2013.01); *H04M 7/00* (2013.01); *H04N 7/147* (2013.01)

(58) Field of Classification Search
USPC .............. 455/405, 424, 445, 452, 404, 452.2; 379/221.07; 348/14.02
See application file for complete search history.

(56) References Cited

U.S. PATENT DOCUMENTS 7,738,492 B2 *   6/2010   Lauwers et al. ............... 370/468
2010/0315949 A1 * 12/2010   Agarwal ....................... 370/235

* cited by examiner

*Primary Examiner* — Olisa Anwah
(74) *Attorney, Agent, or Firm* — TransPacific Law Group; Pavel I. Pogodin, Esq.

(57) ABSTRACT

A bandwidth management system for multiple-service mobile networks for use with a plurality of instances of mobile communications devices. A plurality of communications silo each provide at least one communications service using a mobile network wherein at least one communications service from at least one communications silo involving the transport of real-time two-way video or other high bandwidth communications. Call/session state information from the communications silos and packet-level network transport measurement information responsive to packet-level network transport processes in the mobile network are used by a control system to create control messages transmitted to the communications silos for controlling call/session admission application QoS parameters responsive to traffic and network operation.

2 Claims, 39 Drawing Sheets

FIG. 2    (adapted from http://en.wikipedia.org/wiki/IP_Multimedia_Subsystem (adapted from http://en.wikipedia.org/wiki/IP_Multimedia_Subsystem)

FIG. 4   (adapted from http://en.wikipedia.org/wiki/UMTS )

FIG. 5    (adapted from http://en.wikipedia.org/wiki/Video_share )

("Permitted States" are inside the striated boxes, while "Impossible States" are outside the striated boxes)

FACILITATING SCALABLE MOBILE MULTI-SERVICE COMMUNICATIONS INCLUDING 2-WAY VIDEO AND OTHER HIGH-BANDWIDTH SERVICES

CROSS-REFERENCE TO RELATED PATENT APPLICATIONS

The present U.S. patent application relies upon, claims the benefit of priority from, and is a continuation of U.S. patent application Ser. No. 13/174,757 filed on Jun. 30, 2011, which claims priority to provisional patent application No. 61/398,818 filed on Jun. 30, 2010, the entire disclosure of both of which are incorporated by reference herein.

COPYRIGHT AND TRADEMARK NOTICES

A portion of the disclosure of this patent document may contain material, which is subject to copyright protection. Certain marks referenced herein may be common law or registered trademarks of the applicant, the assignee or third parties affiliated or unaffiliated with the applicant or the assignee. Use of these marks is for providing an enabling disclosure by way of example and shall not be construed to exclusively limit the scope of the disclosed subject matter to material associated with such marks.

FIELD OF THE INVENTION

The invention pertains to mobile real-time 2-way audio-video communications and similar or related media (animations, visualizations, audio-video editors etc.) employing high performance communications for mobile applications, and more specifically to technical approaches to network technology and mobile devices for these so as to make associated applications and telecommunications services commercially viable more quickly than would otherwise occur via natural market and technology evolution trends.

BACKGROUND OF THE INVENTION

The present invention is directed to mobile real-time 2-way audio-video communications and similar or related media (animations, visualizations, audio-video editors etc.) employing high performance communications for mobile applications, and more specifically to technical approaches to network technology and mobile devices for these so as to make associated applications and telecommunications services commercially viable more quickly than would otherwise occur via natural market and technology evolution trends.

"Mobile Devices" and "Wireless Devices:" Terminology and Networking

In this discussion "mobile devices" are viewed as communications devices comprising at least high radio frequency networking provided by cellular common-carrier providers, while "wireless devices" are devices comprising at least high radio frequency networking provided by local "WiFi" networks. Examples of "mobile devices" include but are not limited to smartphones, cellphones, Personal Digital Assistants (PDAs), tablet computers, and laptop computers Some smartphones, cellphones, and other types of portable devices only operate as mobile devices. Other types of portable devices only operate as wireless devices. Some smartphones, cellphone, and other types of portable devices can operate in multiple modes: as mobile devices, as wireless devices, or in some implementations as both wireless devices simultaneously.

Types of Mobile and Wireless Video Services

Video services provided by mobile and wireless devices currently include at least some form of the following:

Broadcast video reception (mobile/wireless TV)

Streaming video reception from servers (Flash, YouTube, etc.)

Live streaming video reception

Live broadcast video transmission

Two-way video conversations

Other bandwidth intensive and processor intensive services supportable by mobile and wireless devices include at least:

Interactive animations (Google Earth & Street View)

High-speed file download

High-speed file upload

As mobile and wireless device technology improve, future bandwidth intensive and processor intensive capabilities supportable by mobile and wireless devices are likely to include at least:

Multi-point two-way video conferencing

Encrypted two-way video conferencing

High-speed file upload

FIG. 1 depicts the current evolution of video services on mobile devices.

Bandwidth Management in Enterprise and Mobile Networks

In the enterprise, bandwidth limitations come and go over time, but at this writing there is a current crisis and with new high-bandwidth applications, and this crisis is likely to persist for quite a while (and certainly reoccur again). A number of innovative yet pragmatic and practical solutions to bandwidth management in enterprise in networks are taught in U.S. Pat. No. 7,738,492 and pending U.S. patent application Ser. Nos. 12/828,145 and 61/503,053.

Mobile networks will increasing need to support advanced applications with extensive bandwidth needs, creating a bandwidth need explosion against limited available spectrum. In mobile networks, typically there is a permanent bandwidth limitation due to limited spectrum. Fine-grained reuse has been one solution, but not adequate in many situations and has its own ultimate limitations despite introductions of spatially-bounded bandwidth re-use strategies (micro-cells, pico-cells, femto-cells, etc.) causing acute impending needs for bandwidth management.

Value of the Present Invention

The present invention first modifies and adapts the teachings of U.S. Pat. No. 7,738,492 and pending U.S. patent application Ser. Nos. 12/828,145 and 61/503,053 for use providing bandwidth management to advanced applications in mobile networks, and further builds synergistically upon those foundations with new capabilities.

SUMMARY OF THE INVENTION

Features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

In an embodiment, the invention provides for adaptations of multiservice bandwidth management systems such as those taught in U.S. Pat. No. 7,738,492 and pending U.S. patent application Ser. Nos. 12/828,145 and 61/503,053 to be combined with congestion control methods and systems developed for wireless networks, as well as with other component technologies, to synergistically create a practical, highly scalable multi-service environments comprising video for mobile devices.

In an embodiment, the invention provides for adaptations of protocol gateways and transcoders to support aspects of highly scalable multi-service environments comprising video for mobile devices.

In an embodiment, the invention provides for adaptations of video multipoint bridges to support aspects of highly scalable multi-service environments comprising video for mobile devices.

In an embodiment, the invention provides for adaptations of real-time data collaboration to support aspects of highly scalable multi-service environments comprising video for mobile devices.

In an embodiment, the invention provides for adaptations of real-time data collaboration multipoint bridges to support aspects of highly scalable multi-service environments comprising video for mobile devices.

In an embodiment, the invention provides for adaptations of one-way video messaging (for example, video-mail) to support aspects of highly scalable multi-service environments comprising video for mobile devices.

In an embodiment, the invention provides for bandwidth associated multi-service resource management systems such as those taught in pending U.S. patent application Ser. No. 12/828,145 to support additional aspects of highly scalable multi-service environments comprising video for mobile devices.

BRIEF DESCRIPTION OF THE DRAWINGS

The above and other aspects, features, and advantages of the present invention will become more apparent upon consideration of the following description of preferred embodiments, taken in conjunction with the accompanying drawing figures, wherein:

FIG. 21a shows how a single service inverse blocking algorithm can be used with the arrangement depicted in FIG. 20a.

FIG. 21b illustrates how a multiple service inverse blocking algorithm can be used with the arrangement depicted in FIG. 20b.

DETAILED DESCRIPTION

In the following, numerous specific details are set forth to provide a thorough description of various embodiments. Certain embodiments may be practiced without these specific details or with some variations in detail. In some instances, certain features are described in less detail so as not to obscure other aspects. The level of detail associated with each of the elements or features should not be construed to qualify the novelty or importance of one feature over the others.

Further, in the following detailed description reference is made to the accompanying drawing figures which form a part hereof, and which show by way of illustration specific embodiments of the invention. It is to be understood by those of ordinary skill in this technological field that other embodiments may be utilized, and structural, electrical, as well as procedural changes may be made without departing from the scope of the present invention.

1. Preliminaries 1.1 Current Evolution of Mobile and Wireless Video Services

Video services provided by mobile and wireless devices currently include at least some form of the following:

Broadcast video reception (mobile/wireless TV)
Streaming video reception from servers (Flash, YouTube, etc.)
Live streaming video reception
Live broadcast video transmission
Two-way video conversations Other bandwidth intensive and processor intensive services supportable by mobile and wireless devices include at least:

Interactive animations (Google Earth & Street View)
High-speed file download
High-speed file upload As mobile and wireless device technology improve, future bandwidth intensive and processor intensive capabilities supportable by mobile and wireless devices are likely to include at least:

Multi-point two-way video conferencing
Encrypted two-way video conferencing
High-speed file upload WiFi networks (used by wireless devices) currently provide far greater bandwidth than cellular networks (used by mobile devices). Efforts are constantly afoot to increase the bandwidth of both WiFi networks and cellular networks.

Current migrations plans span 3G, LTE, 4G, and into early proposals for 5G.

Figure 1:
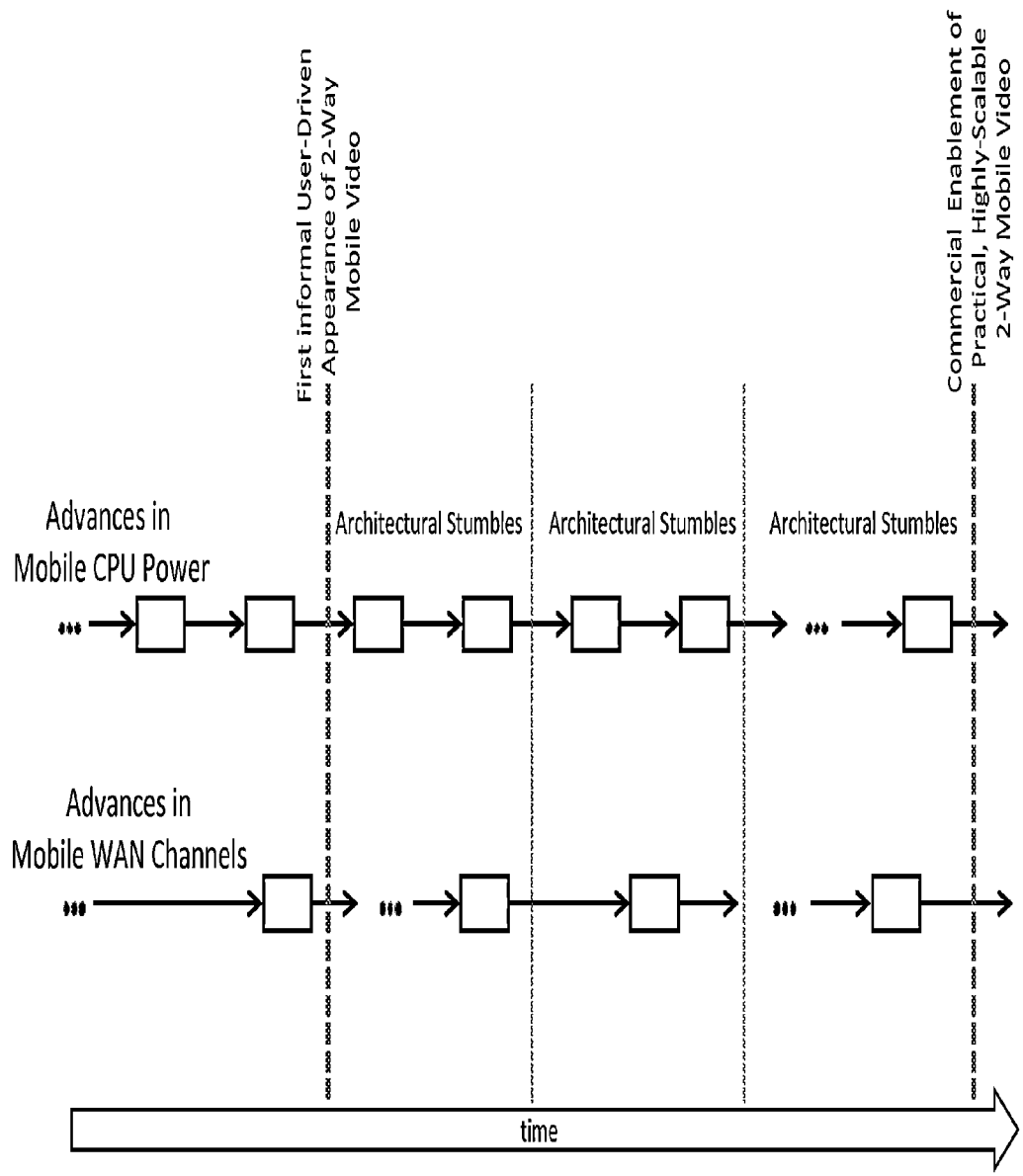
FIG. 1 depicts the current evolution of video services on mobile devices.

FIG. 1 depicts the current evolution of video services on mobile devices.

1.2 Network Environments in Supporting Video

Figure 2:
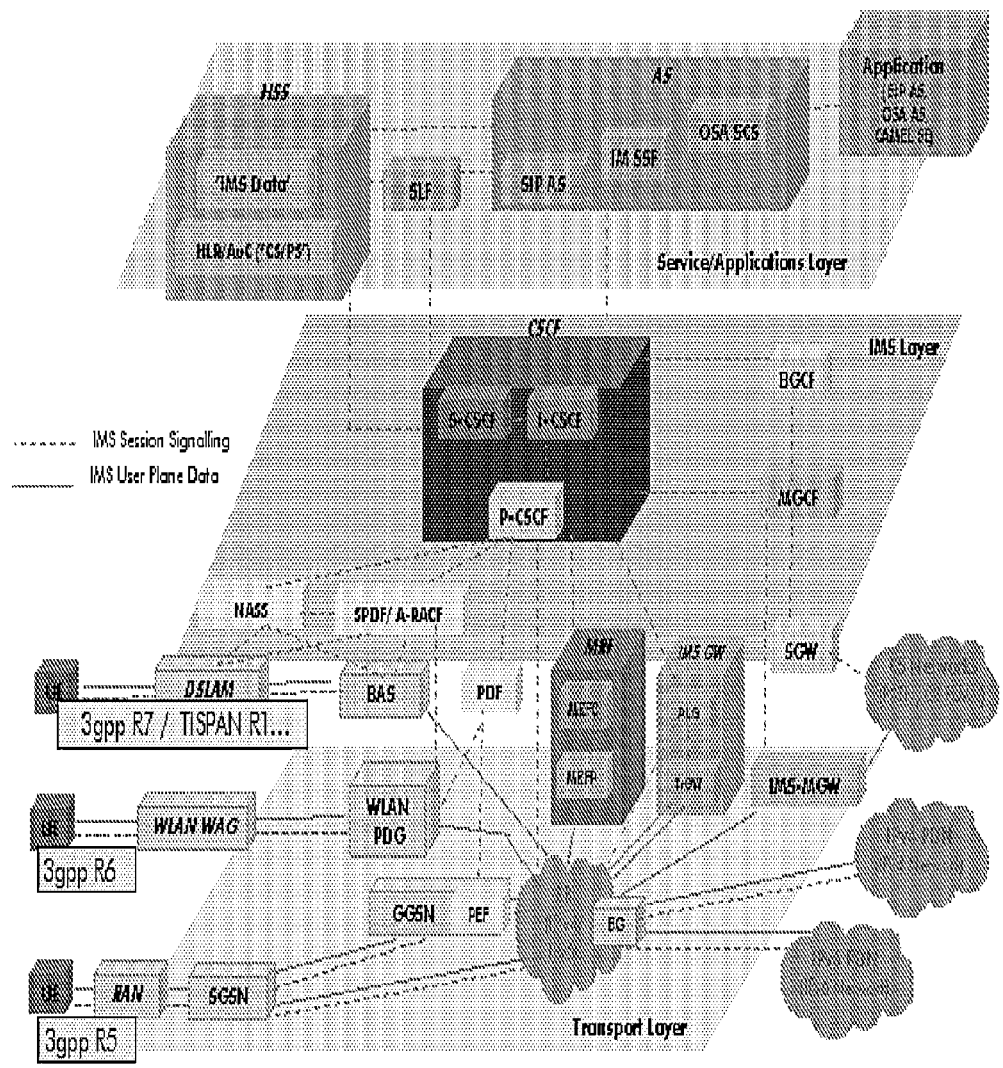
FIG. 2, adapted from http://en.wikipedia.org/wiki/IP_Multimedia_Subsystem, depicts an example representation of an architectural overview of the 3GPP/TISPAN IP Multimedia Subsystem (IMS).

FIG. 2, adapted from http://en.wikipedia.org/wiki/IP_Multimedia_Subsystem, depicts an example representation of an architectural overview of the 3GPP/TISPAN IP Multimedia Subsystem (IMS).

Figure 3:
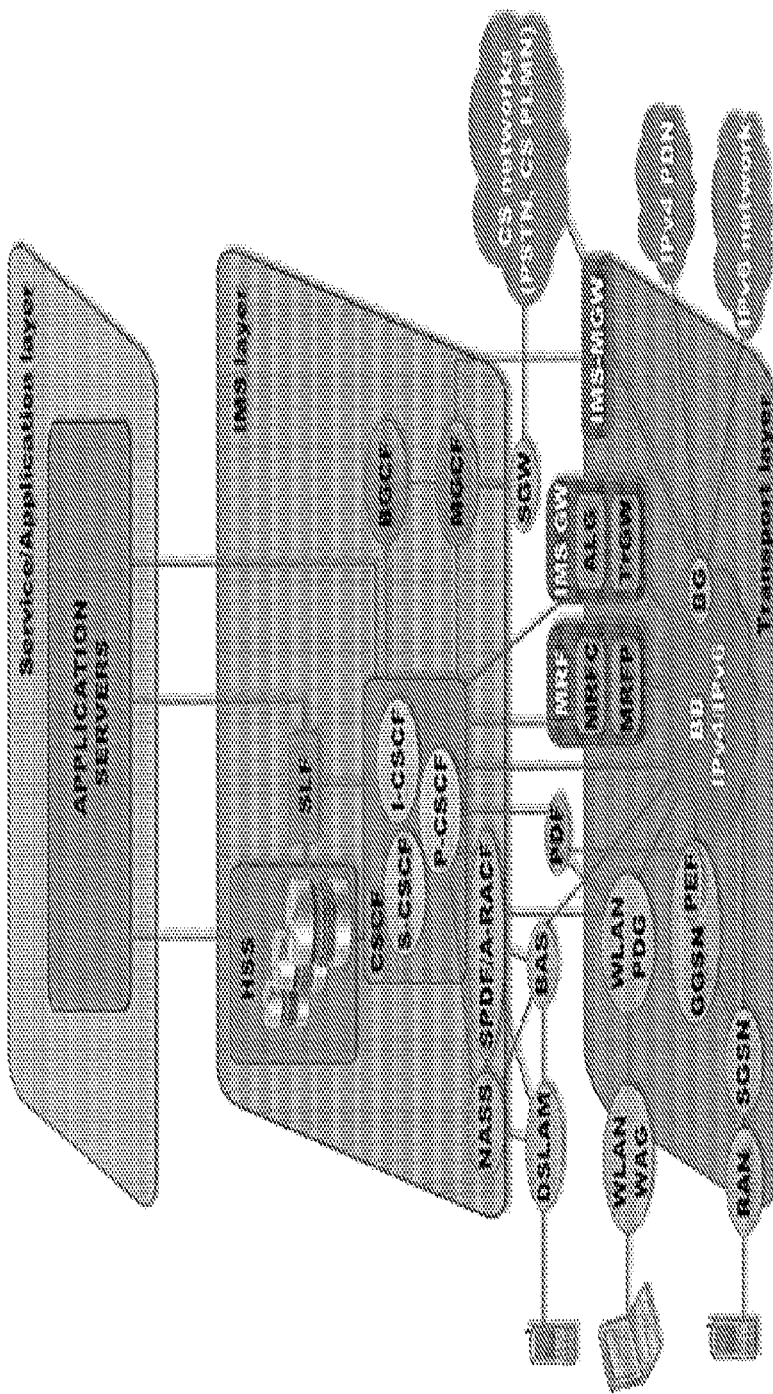
FIG. 3, adapted from http://en.wikipedia.org/wiki/IP_Multimedia_Subsystem, depicts an example representation of Home Subscriber Server (HSS) within the 3GPP/TISPAN IP Multimedia Subsystem (IMS) architecture.

FIG. 3, adapted from http://en.wikipedia.org/wiki/IP_Multimedia_Subsystem, depicts an example representation of Home Subscriber Server (HSS) within the 3GPP/TISPAN IP Multimedia Subsystem (IMS) architecture.

Figure 4:
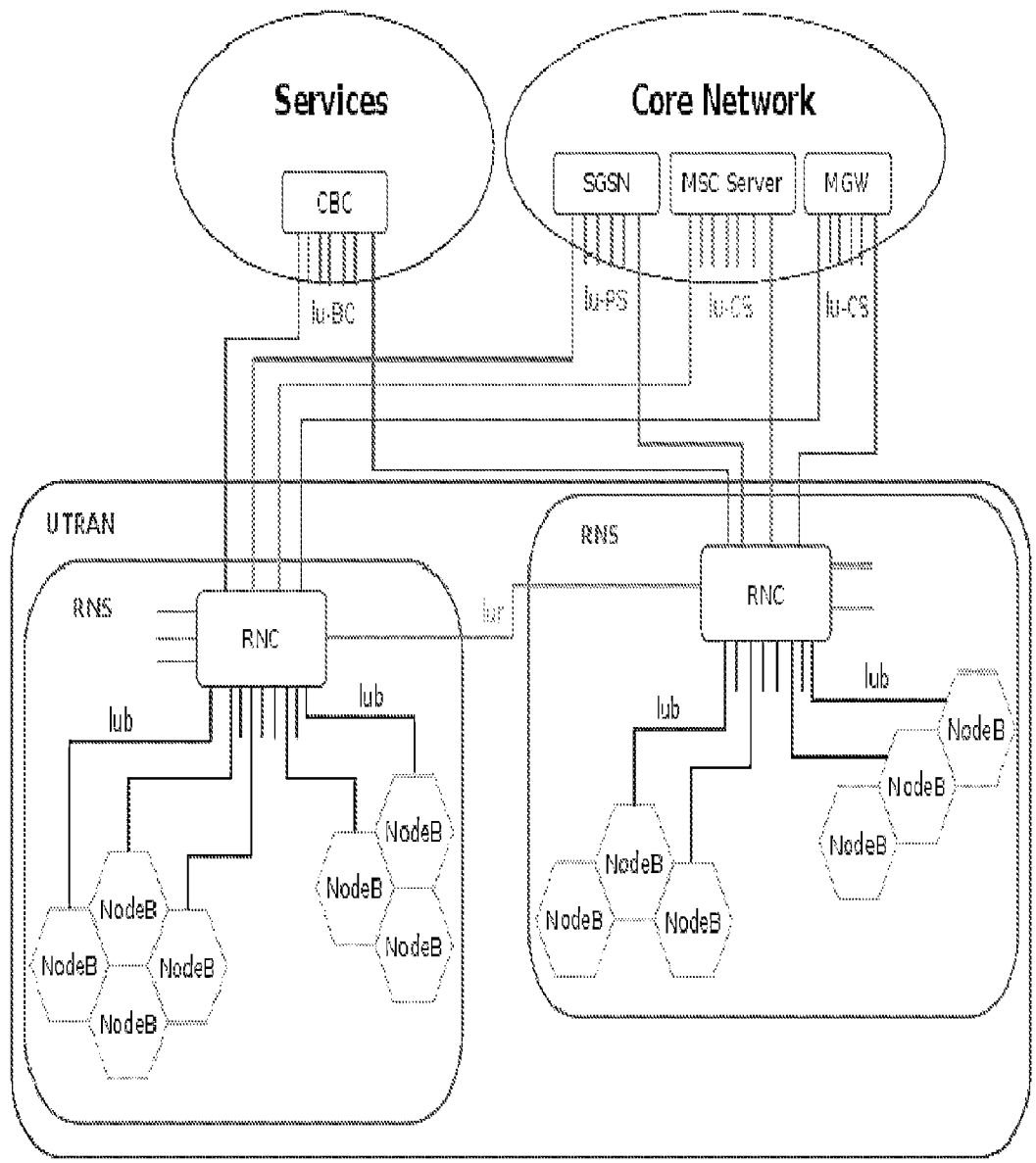
FIG. 4, adapted from http://en.wikipedia.org/wiki/UMTS, depicts an example representation of the UMTS Network Architecture.

FIG. 4, adapted from http://en.wikipedia.org/wiki/UMTS, depicts an example representation of the UMTS Network Architecture.

Figure 5:
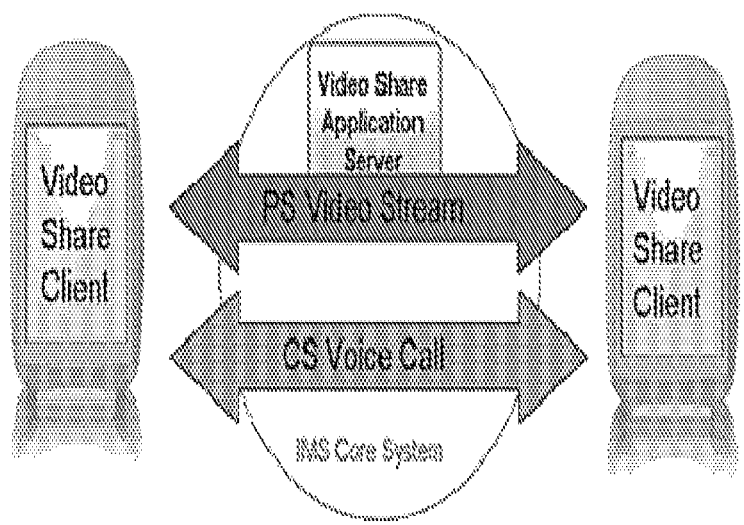
FIG. 5, adapted from http://en.wikipedia.org/wiki/Video_share, depicts an example representation of the IP Multimedia System (IMS) enabled "Video Share" service for mobile networks.

FIG. 5, adapted from http://en.wikipedia.org/wiki/Video_share, depicts an example representation of the IP Multimedia System (IMS) enabled "Video Share" service for mobile networks.

1.3 Programming Environments in Supporting Video

It is noted that most application programming environments for these types of devices are inefficient high-level programming language implementations in languages that do not directly run the processors in the device. The rational here is that most applications are relatively light-weight and by aligning the application development environment with widely familiar languages considerably lowers the barriers to applications development are significantly reduced, effectively opening up $3^{rd}$-party applications development to an extremely larger pool of application designers (in contrast to providing an applications development environment based on the native assembly-level language of the embedded processor CPU, which would be the approach to maximize the efficiency of software execution). Examples of such application programming environments aligned with widely familiar languages include:

iPhone: ObjectiveC (within iOS/iPhone OS)
Blackberry: Java
Android: Java

An important exception to the preceding are application development environments for the Symbian operating system developed by a consortia led by Nokia. The Symbian operating system provides an adapted form of C/C++ which importantly runs natively on the CPU(s) within smartphones manufactured by Nokia and Sony/Ericsson. Further, the Nokia Symbian-based smartphones provide the application programmer with direct access to the media processors(s) within the handheld device. A couple of other mentions are provide:

Web OS is a Linux-based mobile operating developed for use with smartphones and tablet computers. It replaces Palm OS (also called Garnet OS) which was a preceding Linux-based mobile operating system originally directed to Personal Digital Assistants (PDAs) manufactured by then developed by Palm, Inc. (now Hewlett-Packard) and accordingly arranged to facilitate touchscreen user interfaces.

Windows Phone 7 is a mobile operating system developed by Microsoft, as successor to the earlier Windows Mobile platform (although Windows Mobile applications are not supported on Windows Phone 7). It provides a user interface, a specialized typography-based design language ("Metro"), and integrates operating system features with services and hardware control, but has no multitasking capabilities.

1.4 Tradeoffs Among Network Bandwidth, Algorithms, Frame Rate, Image Resolution, Processing Speed, and Power Consumption in Supporting Video Power consumption is a major issue in smartphones, cellphone, and other types of portable mobile and/or wireless handheld devices. The major consumers of energy are algorithmic processing and active visual display. Real-time two-way audio-video communications require both. Reductions in media bandwidth diminishes the amount of data to process, but media compression/decompression is typically algorithmically intensive.

Video decompression is far simpler and less computationally intensive than video compression. For this reason many contemporary smart-phones and some higher-end cell-phones can support display of received video. Much of this is streaming video, such as YouTube views, "television" broadcast, and one-way video from video conferencing, typified by the offering from Fring™. Because the computational load for video decompression is relatively modest, video decompression applications can be supported by the inefficient application programming languages provided for most mobile handheld devices.

Higher frame rates and higher resolutions increase the amount of network bandwidth and processing power required (hence also increasing power consumption). Portable devices typically have small screens so the pixel count (and thus image resolution) can be considerably less than that for 2-way video on computers and in conference rooms.

1.5 Opportunities for Accelerated Deployment and Evolution of Mobile Video and Related Services FIG. 1 depicts the current evolution of video services on mobile devices.

Figure 6:
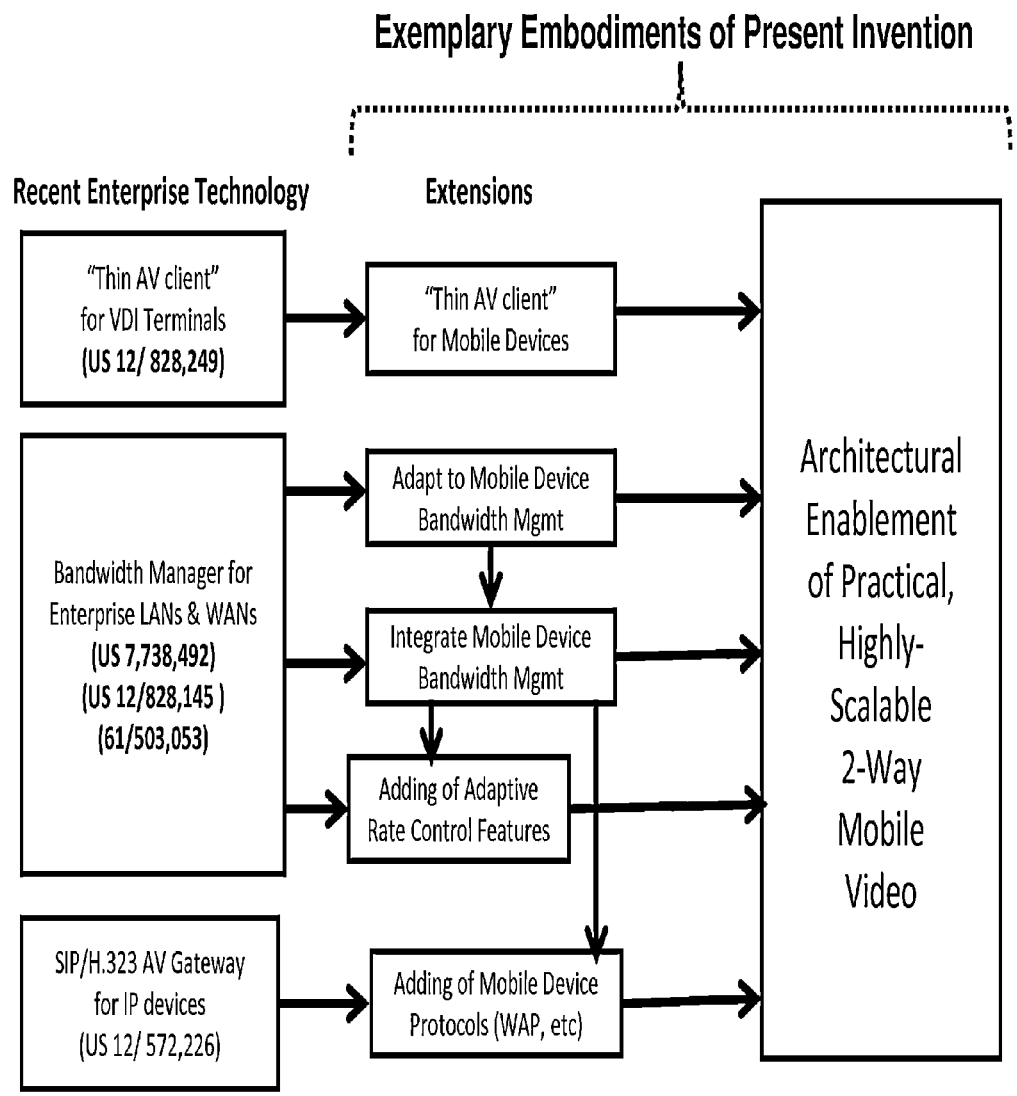
FIG. 6 depicts adaptations and combinations of multiservice bandwidth management technology, rate-adaptation congestion control methods, A/V gateway technologies, and thin-client A/V technologies to create multiservice mobile networks and devices supporting 2-way video.

FIG. 6 depicts adaptations and combinations of multiservice bandwidth management technology, rate-adaptation congestion control methods and systems A/V gateway technologies, and thin-client A/V technologies to create multiservice mobile networks and devices supporting 2-way video.

Figure 7:
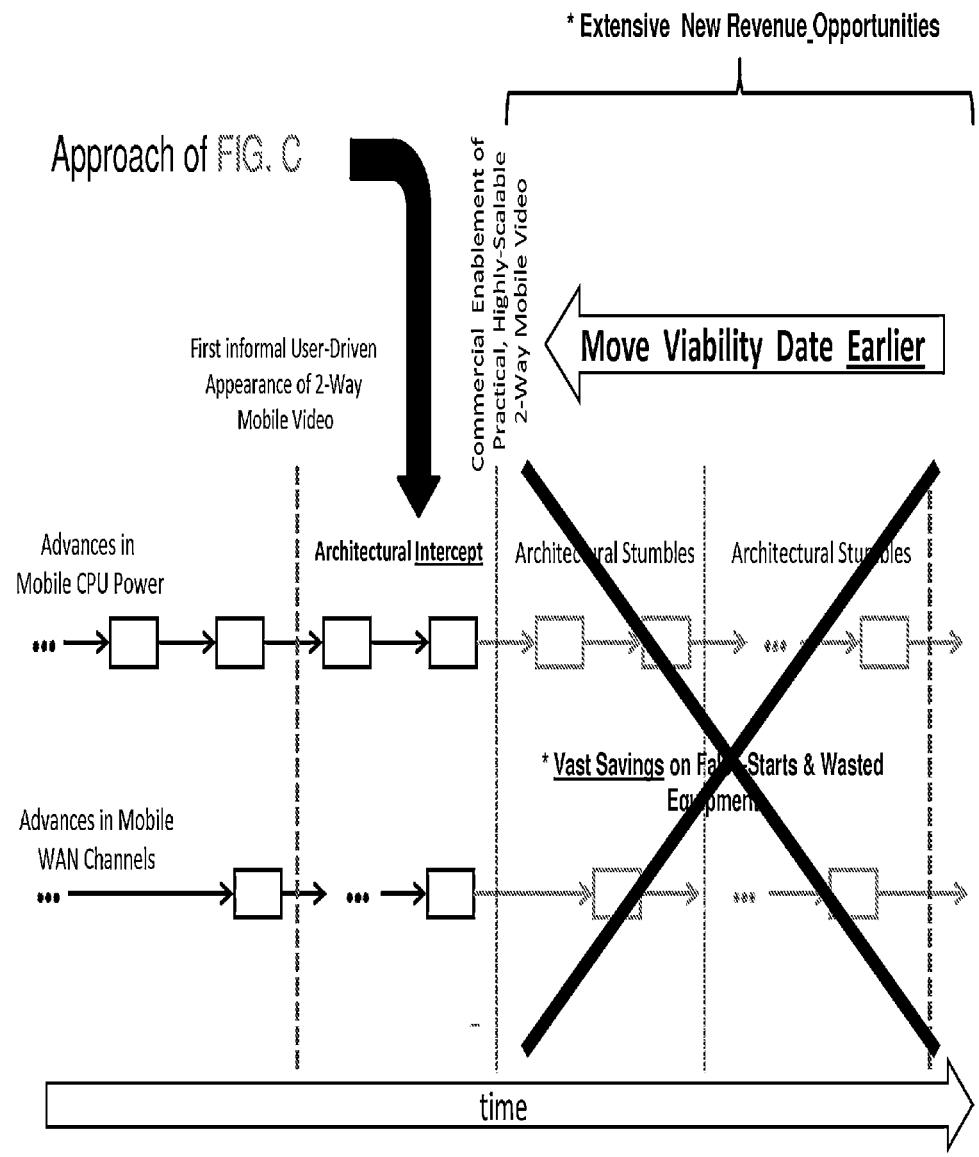
FIG. 7 depicts the exemplary far more rapid evolution of AV mobile services that include 2-way video, resulting in less waste, quicker revenue streams, and avoidance of false starts.

FIG. 7 depicts the exemplary far more rapid evolution of AV mobile services that include 2-way video, resulting in less waste, quicker revenue streams, and avoidance of false starts.

In an embodiment, the invention provides for adaptations of multiservice bandwidth management systems such as those taught in U.S. Pat. No. 7,738,492 and pending U.S. application Ser. Nos. 12/828,145 and 61/503,053 to be combined with congestion control methods and systems developed for wireless networks, as well as with other component technologies, to synergistically create a practical, highly scalable multi-service environment for mobile devices.

2. Bandwidth Management Control Systems Frameworks

Figure 8:
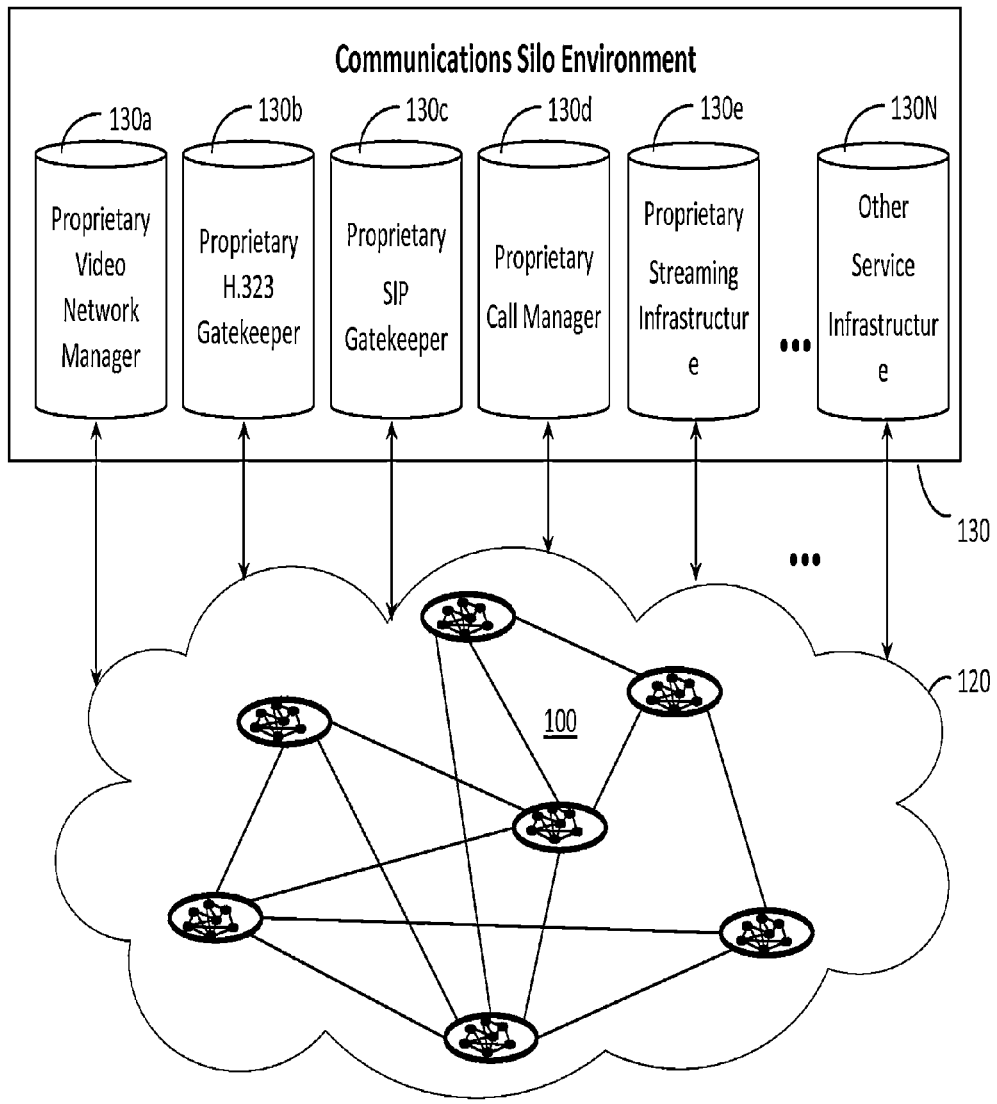
FIG. 8 depicts an exemplary block diagram of an mobile networking environment 100 including a representation of an exemplary mobile communication network 120 and a Communications Silos Environment comprising a plurality of communication silos 130a-130n, each pertaining to a separate service-specific bandwidth reservation system.

It is noted that this section comprises material adapted from the teachings in U.S. Pat. No. 7,738,492 and pending provisional U.S. Patent Application 61/503,053 but which have been modified for mobile services to form integrative and synergetic aspects and capabilities along with other parts of the invention FIG. 8 depicts an exemplary block diagram of the mobile networking environment 120 including a representation of an exemplary mobile communication network 100 and a Communications Silos Environment 130 comprising a plurality of communication silos 130*a*, 130*b*, 130*c*, . . . , 130N, each communication silo associated with and/or pertaining to at least one separate service-specific bandwidth reservation system. The mobile networking environment 120 can also include one or more of VPNs, Intranets, the Internet, Extranets, etc.

In an embodiment provided for by the invention, each communication silo is uniquely associated with and/or pertains to a separate service-specific bandwidth reservation system. In another embodiment provided for by the invention, at least one of the communication silos is associated with and/or pertains to more than one separate service-specific bandwidth reservation system. In another embodiment provided for by the invention, at least two of the communication silos are associated with and/or pertain to more the same service-specific bandwidth reservation system (for example, as can be advantageous in server and/or network load balancing, security structuring, vendor environment segregation, product-vintage version segregation, etc.).

In contemporary product offerings and known proposed systems, each such bandwidth reservation system carves out a dedicated portion of the overall network bandwidth available in the mobile for exclusive use by one or more applications. That is, by definition adopted above, each bandwidth reservation system is provided with a dedicated pool of mobile network bandwidth for the exclusive use of a service associated with that particular bandwidth reservation system. In applications where session admission control is used, rather than call admission, the internal details and sharing effects can differ but for the sake of illustration a session admission system can be viewed in this model as a communications silo (such as 130*a*, 130*b*, 130*c*, . . . , 130N.) comprising a bandwidth reservation system.

In practice, commercial bandwidth reservation system products and there foreseen progeny are largely "black boxes" providing one or more of varied levels, types, and forms of controls, internal control systems, information, and internal dynamics. In particular, the internal control systems and internal dynamics will typically not be known.

Figure 9:
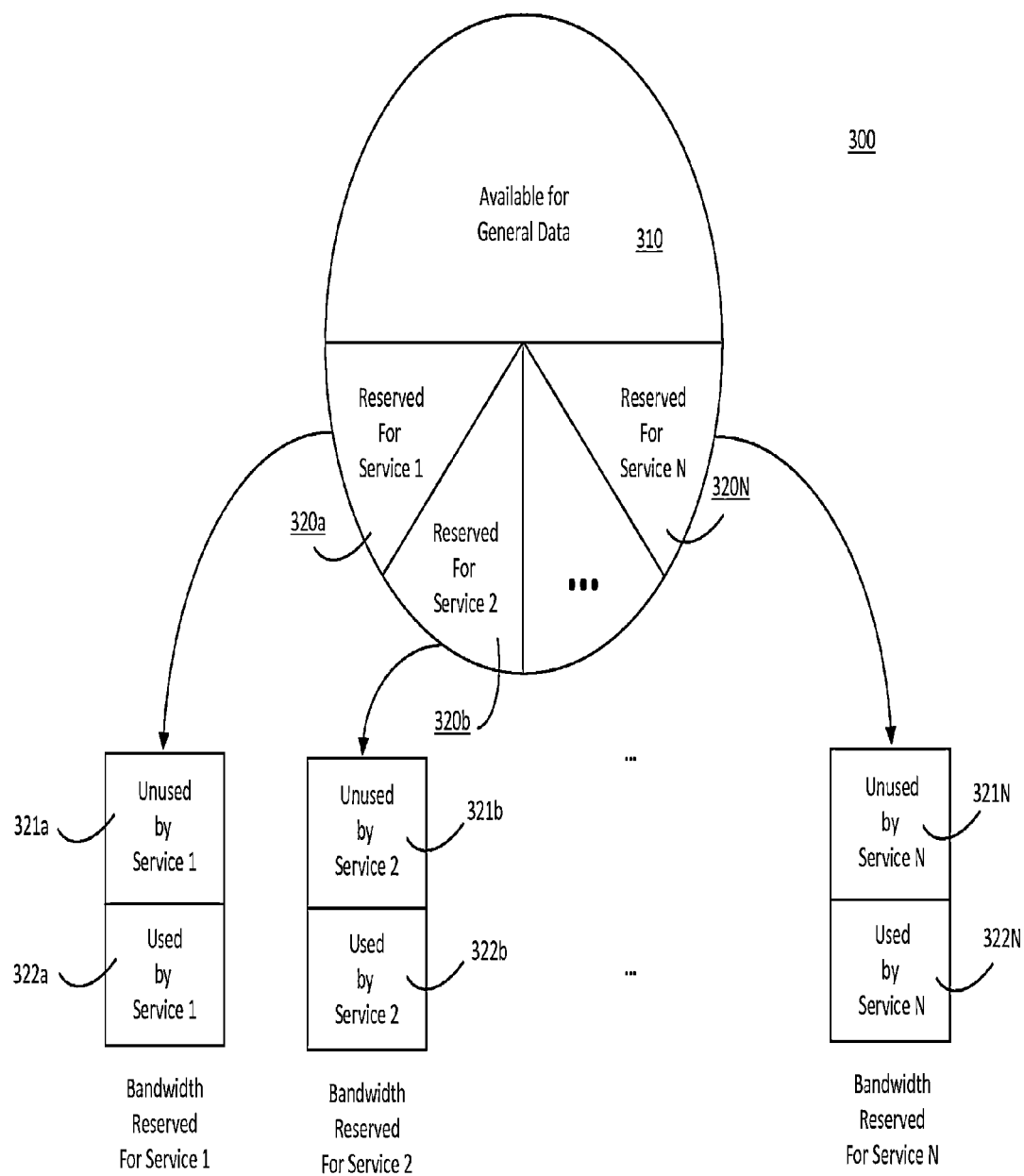
FIG. 9 shows a "pie chart" representation depicting of how, at any particular moment in time, each of the bandwidth slices internally comprises both used bandwidth and unused bandwidth.

The upper portion of FIG. 9 provides a "pie chart" 300 view representing how mobile network bandwidth is carved up among some number of these services, the number here represented as the variable "N." Each slice 320*a*, 320*b*, 320*c*, . . . , 320N of the pie 300 associated with these services (Service 1, Service 2, . . . Service N) represents a portion of bandwidth reserved for the labeled service, i.e., reserved for the exclusive use of each associated bandwidth reservation system to allocate to calls or sessions. The remaining mobile network bandwidth 310 remains available for general purpose use, outside the scope and reach of the communications silos 130*a*, 130*b*, 130*c*, . . . , 130N and their associated services. As a result, its bandwidth is not used by these N services.

The lower portion of FIG. 9 shows a "pie chart" view 300 of how, at any particular moment in time, each of the bandwidth slices 320*a*, 320*b*, 320*c*, . . . , 320N internally comprises both unused bandwidth 321*a*, 321*b*, 321*c*, . . . , 321N and used bandwidth 322*a*, 322*b*, 322*c*, . . . , 322N. As any of this unused bandwidth 321*a*, 321*b*, 321*c*, . . . , 321N is not made available for other services, it is effectively wasted. Should the demand for a particular service exceed the total amount carved out for that service, any further requests for that service must be denied. This is the case even if there is unused bandwidth 321*a*, 321*b*, 321*c*, . . . , 321N in the isolated bandwidth pools of other communications silos 130*a*, 130*b*, 130*c*, . . . , 130N.

Figure 10:
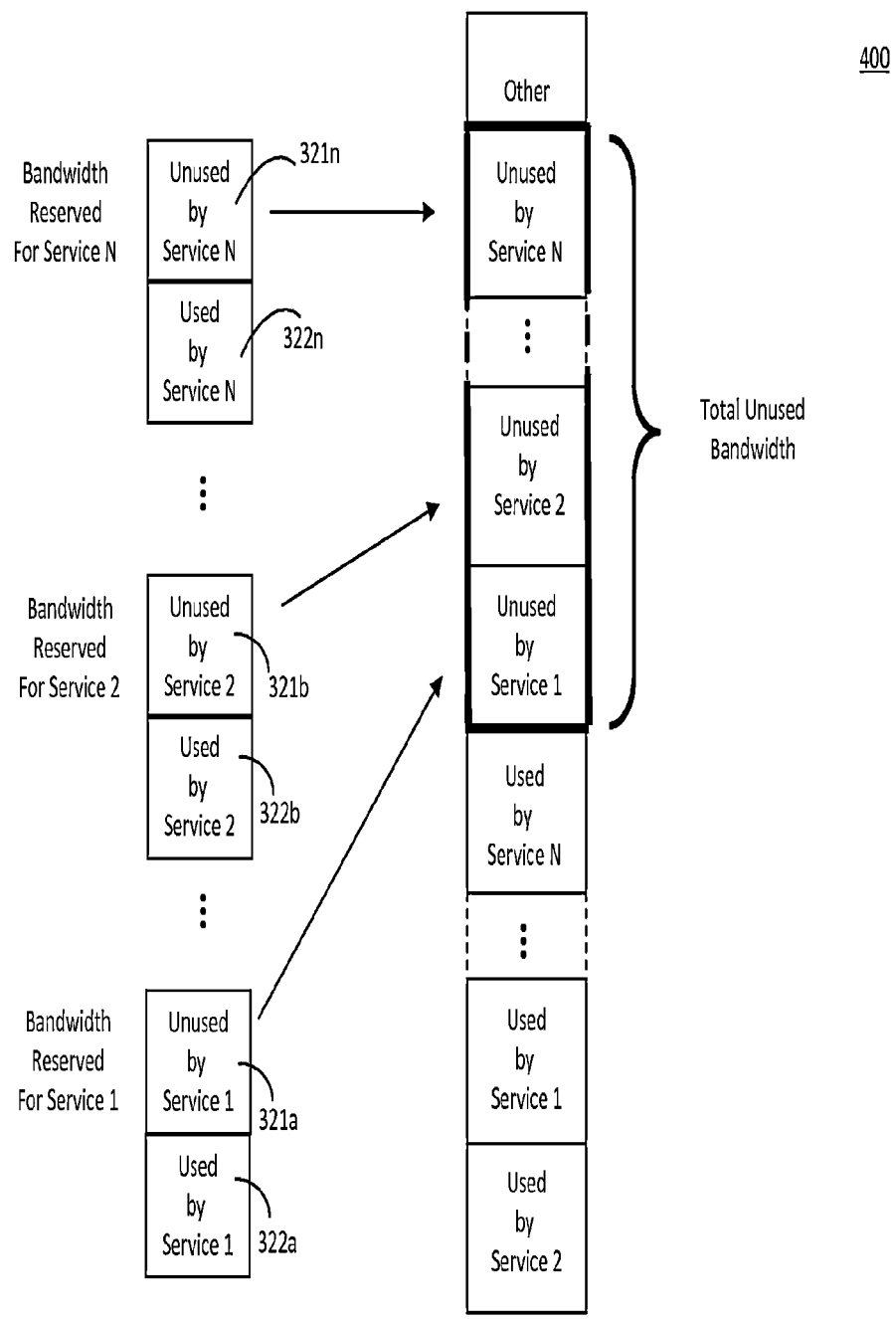
FIG. 10 shows a macro-scale view showing all unused bandwidth being aggregated contiguously.

FIG. 10 shows a macro-scale view 400 showing all unused bandwidth 321*a*, 321*b*, 321*c*, . . . , 321N on the left side as in FIG. 9 and on the right side reorganized so as to be contiguously aggregated. If there are a large number of services, or inappropriate sizes in the carve-outs for each service, there can be tremendous wastes of bandwidth. On the other hand, if the carve-outs for each particular service are not large enough, that service could suffer a high frequency of request rejections and denial of service. In fact, classic properties of blocking-policy resource allocation systems and methods confirm worse-case fears—with fixed bandwidth partitions and partitions of service requests, there is less efficiency and steep trade-offs between the amount of wasted bandwidth required to be kept in reserve versus the increases in blocking of service requests.

Figure 11:
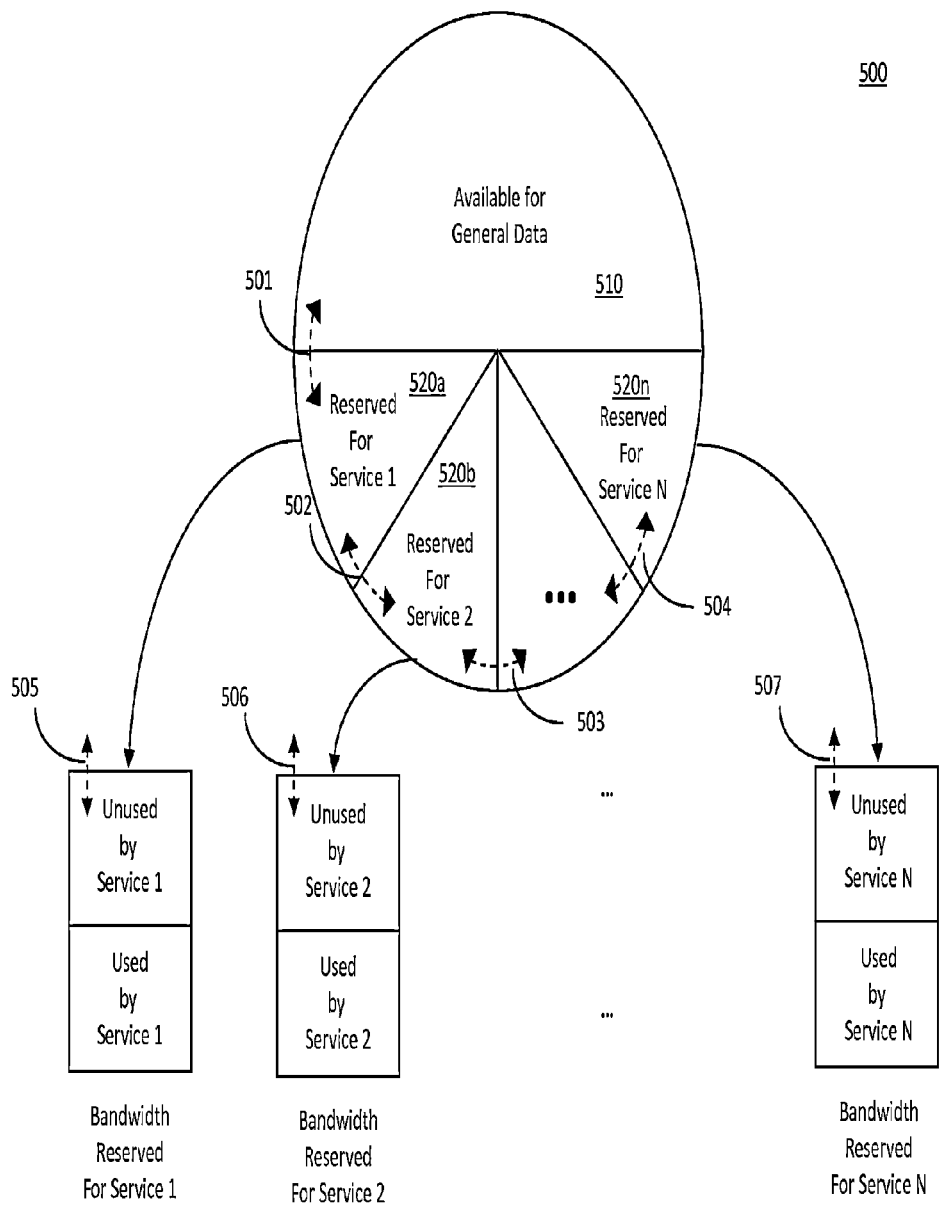
FIG. 11 shows a "pie chart" view of how bandwidth allocation can be adjusted.

FIG. 11 depicts a recasting of the 'fixed-boundary' "pie chart" view 300 of FIG. 9 as a variable boundary' "pie chart" view 500 wherein bandwidth allocation for each service can be dynamically adjusted as suggested by the dashed arrowed lines 501-507. These dynamic adjustments can be determined or controlled by higher level policies, human operation, automatic hierarchical control systems, etc.

U.S. Pat. No. 7,738,492 teaches systems and methods for such arrangements. More specifically, U.S. Pat. No. 7,738, 492 teaches, among other things, exemplary systems and methods for a Unified Bandwidth Manager for monitoring and for controlling the affairs of a plurality of such bandwidth allocation communications silos. The control capabilities taught include:

human-operator control,
assistance to human-operator control, and
automatic control.

The above list and remarks are only exemplary and not to be taken as limiting.

The Unified Bandwidth Manager, or "Meta-Gatekeeper," taught U.S. Pat. No. 7,738,492 teaches a wide number of ways in which dynamical adjustment of the size of individual bandwidth allocations, as suggested by the dashed arrowed lines 501-507 in FIG. 11, can be made to each of the bandwidth reservation systems. In an embodiment provided for by the invention, the Unified Bandwidth Manager provides a unified management infrastructure for all mobile network real-time communications (such as video conferencing).

In an embodiment provided for by the invention, the Unified Bandwidth Manager is capable of spanning many types of mobile communications services.

Figure 12:
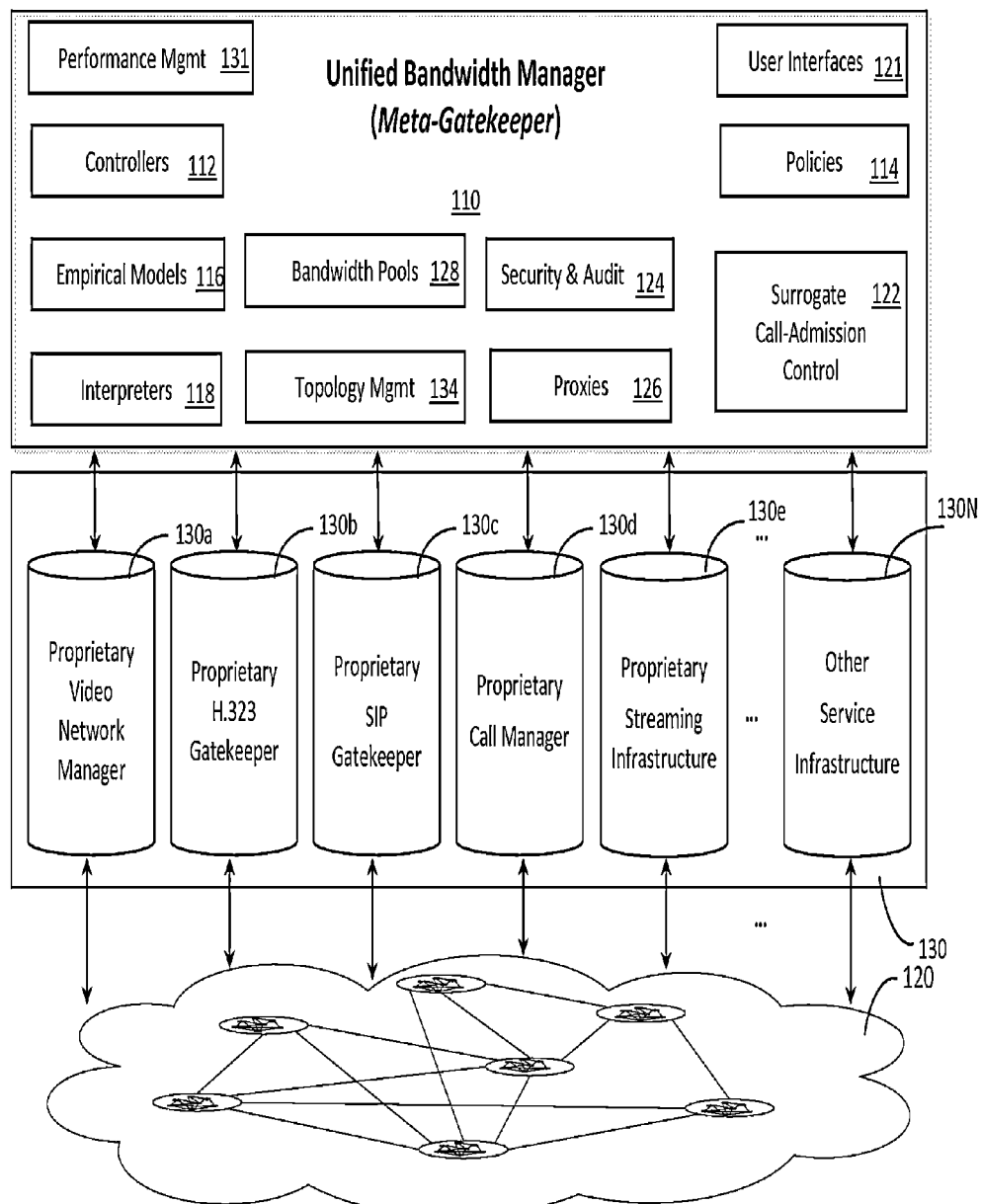
FIG. 12 depicts an exemplary high-level view of an exemplary Unified Bandwidth Manager for controlling the maximum settings of each of the bandwidth reservation systems as provided for and as expanded by the present invention.

FIG. 12 depicts an exemplary representation of exemplary embodiments of the Unified Bandwidth Manager as taught in U.S. Pat. No. 7,738,492 and as both provided for by the present invention and to be expanded by the present invention. More specifically, FIG. 12 depicts an exemplary high-level view of an exemplary Unified Bandwidth Manager for controlling the maximum settings of each of the bandwidth reservation systems as provided for and as expanded by the present invention. In the depiction of FIG. 12, exemplary embodiments of the Unified Bandwidth Manager 110 interact with the plurality of bandwidth reservation systems included in the plurality of communication silos 130*a*, 130*b*, 130*c*, . . . , 130N. Exemplary embodiments of the Unified Bandwidth Manager 110 can provide, for example, unified bandwidth management functions that include call admission control functionality for all real-time traffic on mobile networking environment 120, which can include VPNs, Intranets, the Internet, Extranets, and so on. The real-time IP packet traffic can include VoIP, video conferencing, video streaming, e-mail, internet, internal applications, and so on. Exemplary embodiments of the Unified Bandwidth Manager 110 can also interact with associated network resources relating to other applications.

Exemplary embodiments of the Unified Bandwidth Manager 110 provide an integration layer atop a plurality of real-time communications technologies—more specifically atop a plurality of bandwidth reservation systems. Depending upon implementation details and available information flows, such an integration layer makes possible a number of functions and features in the areas of administration, bandwidth management, and cost reductions.

Exemplary embodiments of the Unified Bandwidth Manager 110 interface with various outside gatekeeper, manager, and proxy server products and standards. These include, but are not limited to, communications systems built on SIP, H.323 gatekeepers for voice and/or video, VoIP call managers, and Content Delivery Networks.

Exemplary embodiments of the Unified Bandwidth Manager 110 also provides a common network topology model and associated bandwidth pools, a single interface for administrators to describe their networks, a single interface for administrators to manage real-time communications, and a single interface for deeply-embedded QoS infrastructure.

Figure 13A:
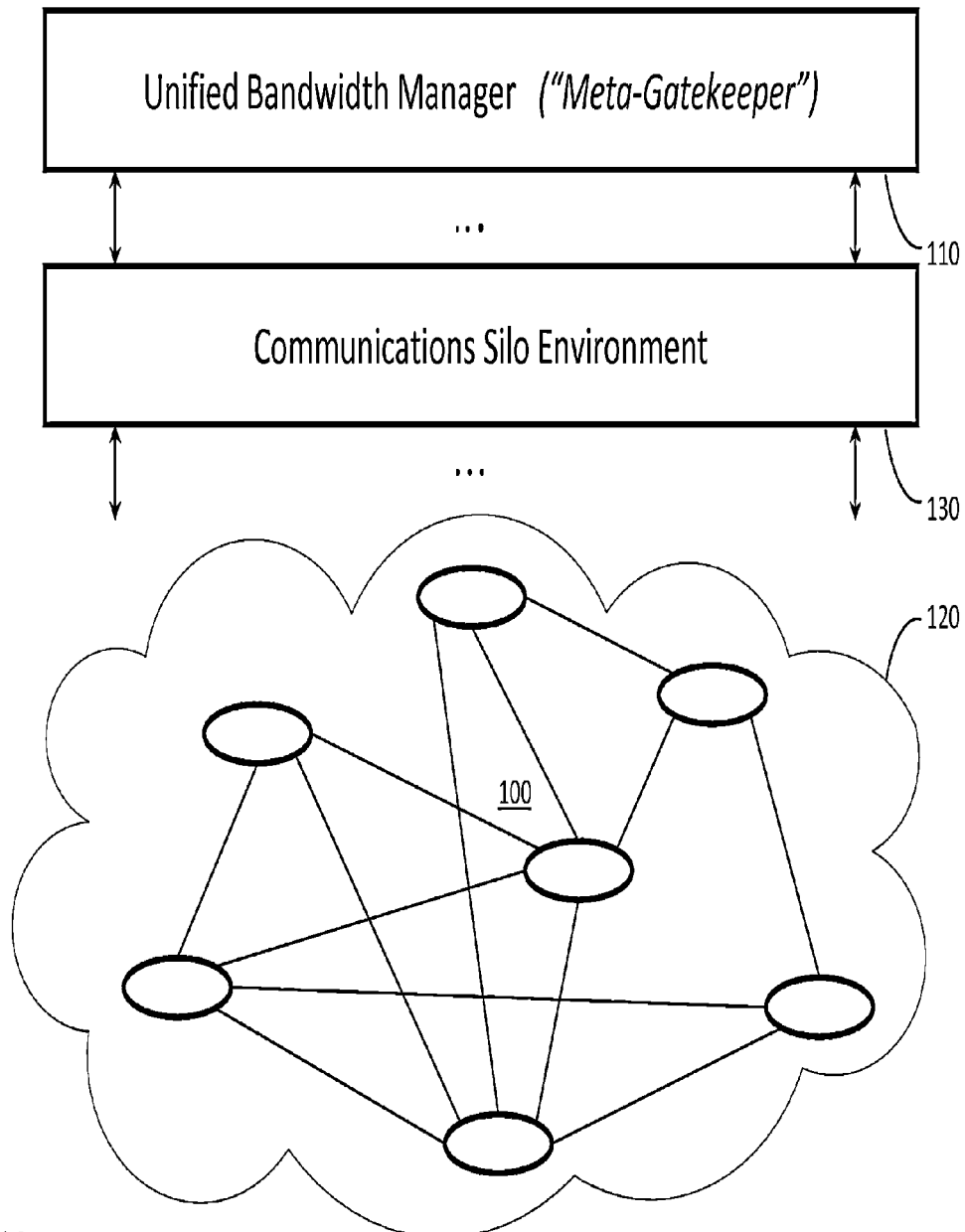
FIG. 13a depicts a first level of abstraction of arrangements such as that depicted in FIG. 12.
Figure 13B:
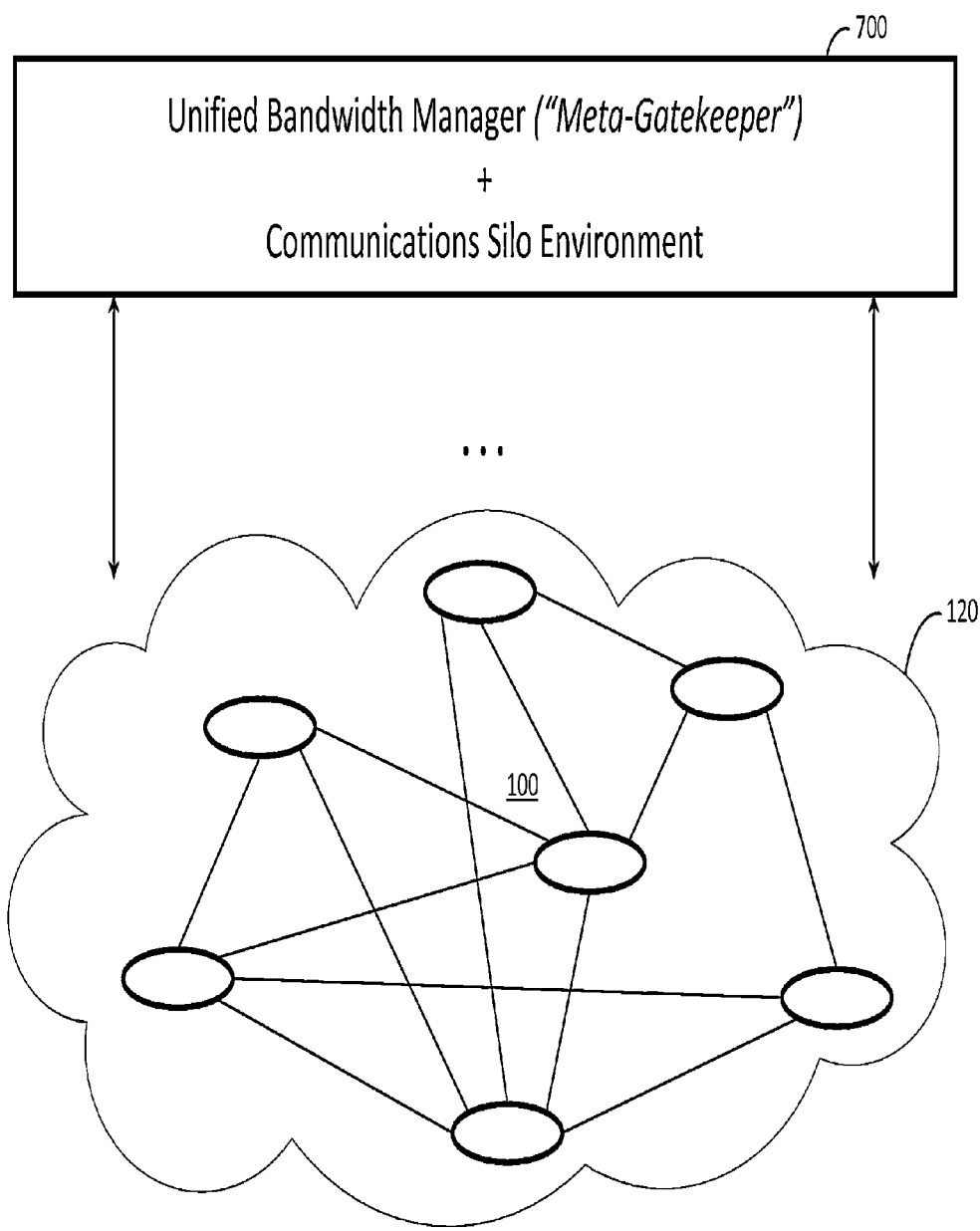
FIG. 13b depicts a higher level of abstraction of arrangements such as that depicted in FIG. 12 wherein the Unified Bandwidth Manager and Communications Silo Environment are aggregated as a single controlling entity.

FIG. 13*a* depicts a first level of abstraction of arrangements such as that depicted in FIG. 12. At this level of abstraction, exemplary internal features, structures, etc. are suppressed. FIG. 13*b* depicts a higher level of abstraction of arrangements such as that depicted in FIG. 12 wherein the Unified Bandwidth Manager and Communications Silo Environment are aggregated as a single controlling entity 700.

Figure 14:
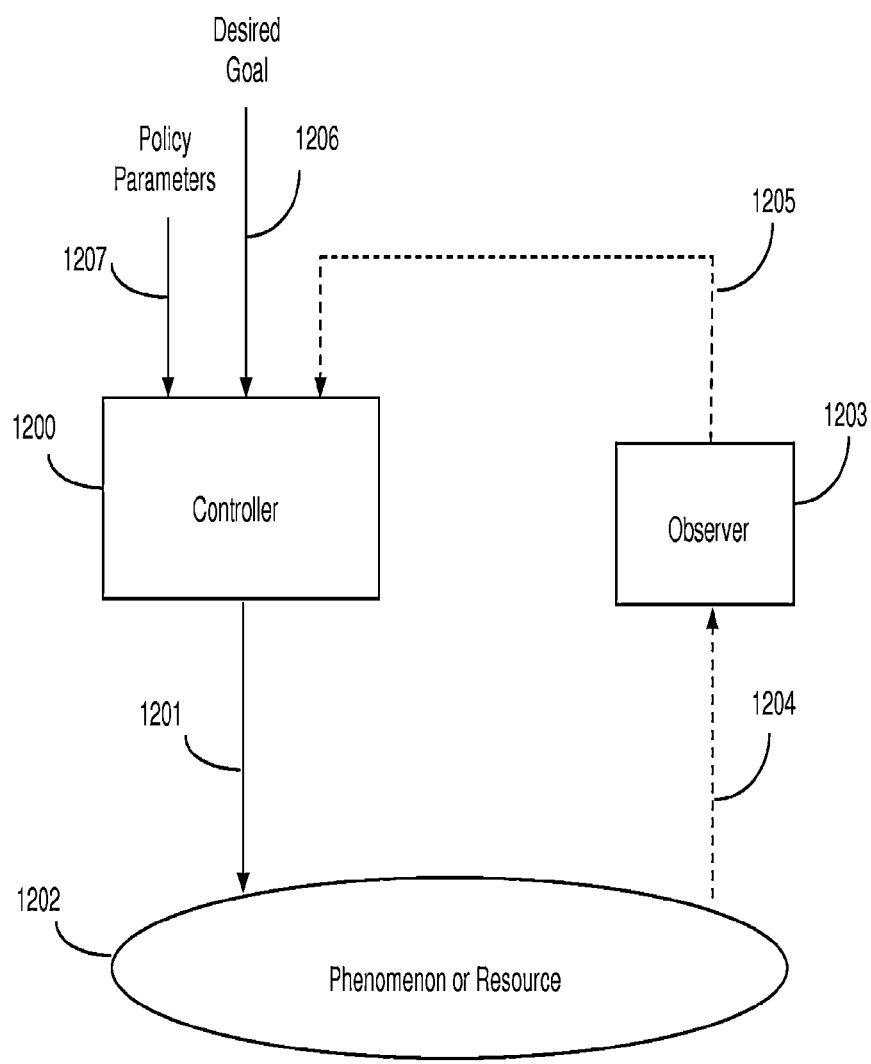
FIG. 14, FIG. 15, and FIG. 16 illustrate an exemplary regulation system within the Unified Bandwidth Manager.

FIG. 14 illustrates a regulation system 1250. Regulation system 1250 can be used to represent selected aspects of commercial bandwidth reservation system products afore discussed. A controller 1200 takes a controlling action 1201 on a phenomenon or resource 1202 (here relating to call admissions, bandwidth usage, etc.) its current state is observed by an observation entity 1203 (usually called "observer" by those skilled in the art). The observer 1203 observes measures, monitors 1204 the controlled phenomenon or resource 1202 by means or methods appropriate and provides observation information 1205 to the controller 1200 in a form the controller can use to control the phenomenon or resource 1202. The controller 1200 in this model is further provided with desired goal information 1206. For example, a home heating system taken as such a system 1200 would have home air serving as phenomenon or resource 1202, a thermostat setting serving as desired goal information 1206, a temperature sensor serving as observer 1203, the air temperature serving as the measurement means 1204, an electrically-controlled heating unit serving as the controller 1200, and the signal from the temperature sensor (observer 1203) to the heating unit (controller 1200) serving as observation information 1205. The controller 1200 interaction with the phenomenon or resource 1202 has an inherent type of dynamics (in the home heating example, how long it takes the running heating unit to raise the temperature by 1 degree in a designated part of the home) and the resulting feedback loop 1201, 1204, 1205 with these controller dynamics and observer 1203 characteristics produce a closed-loop behavior (for example, a heating temperature undershoot or overshoot that causes discomfort in some part of the home separate from the temperature sensor until the room temperature throughout the home stabilizes).

The controller 1200 is additionally provided with policy parameter information 1207 that can be used to control the behavior of the closed loop control system 1250. For the home heating example, the heating unit can pulsate on or off with a varying duty cycle that can be adjusted for the particulars of the home, or a hysteresis gap in the heater response than can be narrowed or widened according to the particulars of the home. It is typically not feasible to provide a wide range of policies, so in practice there is a selection of policies or a collection of policy variables that can be adjusted. In FIG. 14 these are therefore represented as "policy parameters" 1207.

Figure 15:
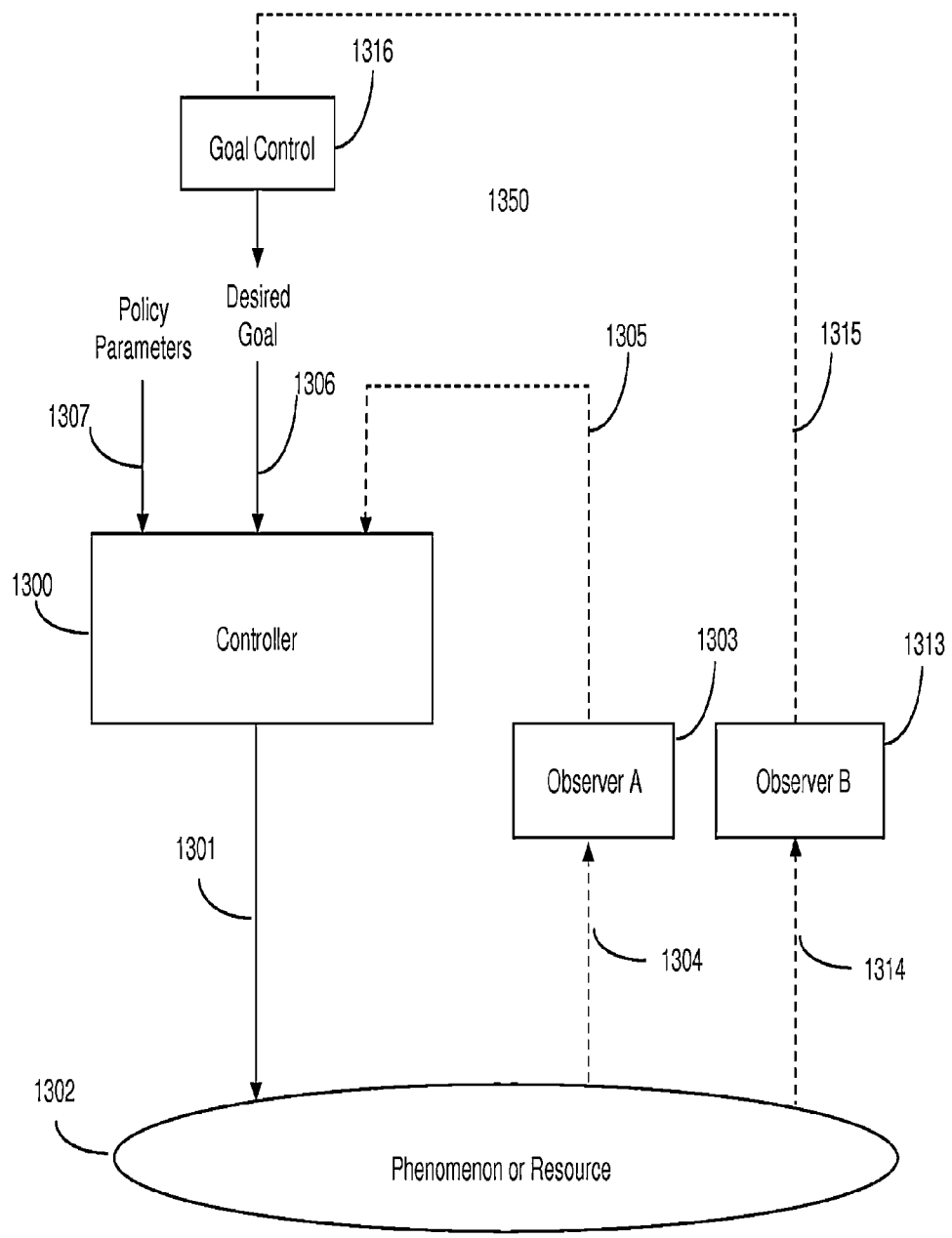

FIG. 15 illustrates a regulation system 1350. FIG. 15 is similar to FIG. 14 except that in FIG. 15, a second observer 1313 is also added for observing, measuring, and/or monitoring 1314 the phenomenon or resource 1302 and producing observation information 1315 directed to a goal controller 1316 that adjusts the desired goal 1306 in the system depicted in FIG. 14. In the home heating example, observer B 1313 can note that the air is too cool for someone with an illness who is in the house, and adjust the temperature setting accordingly. For a given desired goal setting, the inner feedback loop 1301, 1304, 1305 with the controller dynamics and observer characteristics produce a closed-loop behavior like the framework system depicted in FIG. 14.

Figure 16:
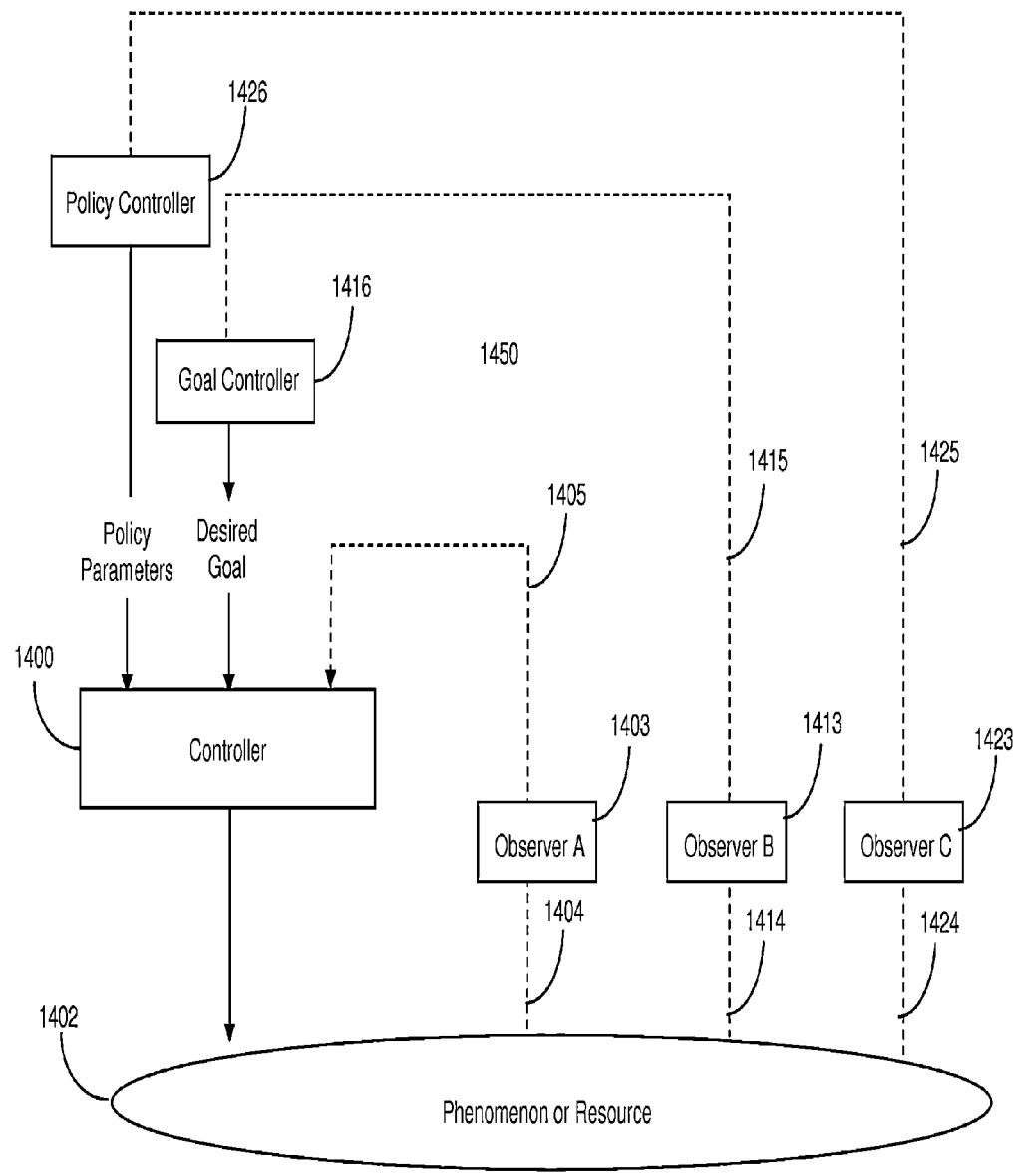

FIG. 16 illustrates a regulation system 1450. FIG. 16 is similar to FIG. 15 except that in FIG. 16, a third observer 1313 is also added for observing, measuring, and/or monitoring 1414 the phenomenon or resource 1402 and producing observation information 1415 directed to a policy controller 1416 that adjusts the policy 1407 in the systems depicted in FIG. 14 and FIG. 15. For example, in the home heating example, the controller 1400 can include adjustable parameters as to how long the fan runs after the heating element is turned off and a pause time before the heating element is turned on again. Observer C 1425 can monitor the temperature in various parts of the home, and the policy controller can adjust these fan intervals and pause interval settings based on the information 1425 from Observer C 1423.

In reference to FIG. 16, in some embodiments, the goal observer 1413 and goal controller 1416 functions are provided by a Unified Bandwidth Manager, such as Unified Bandwidth Manager 110, to a controller 1400. In some embodiments, the policy observer 1423 and policy controller 1426 functions are provided by a Unified Bandwidth Manager, such as Unified Bandwidth Manager 110, to a controller 1400.

Figure 17:
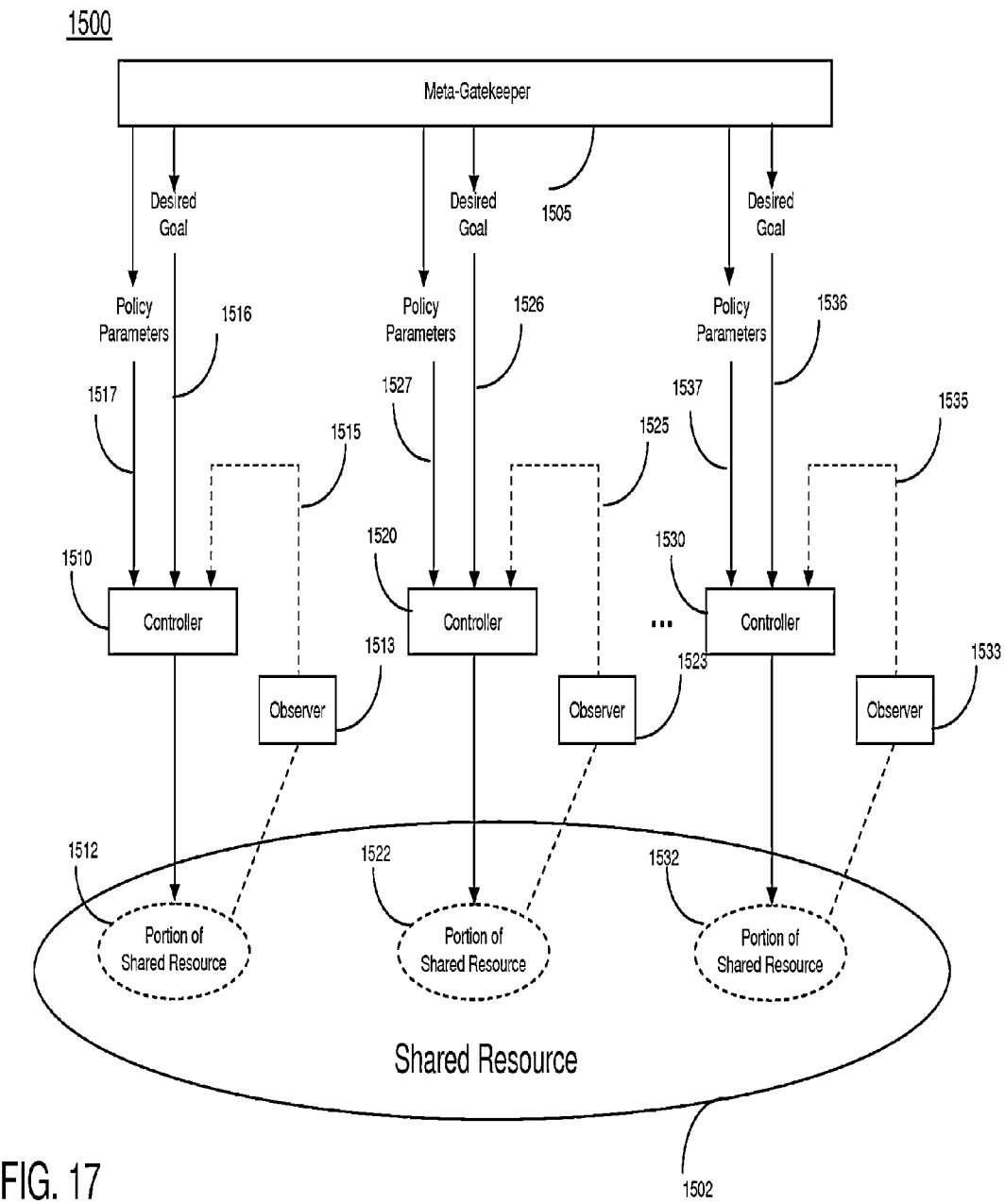
FIG. 17 illustrates a system including a Unified Bandwidth Manager, a shared resource and a plurality of framework controllers.

FIG. 17 illustrates a system 1500 including a Unified Bandwidth Manager 1505, a shared resource 1502 and a plurality of framework controllers 1510, 1520 and 1530. In some embodiments, the framework controllers 1510, 1520 and 1530 are those as discussed above with reference to FIG. 14. In some embodiments, each framework controller 1510, 1520 and 1530 respectively controls an associated portion 1512, 1522, 1532 of common shared resource 1502, such as mobile network bandwidth.

Needs for various types of services can vary, but typically each bandwidth reservation system product at the very least would comprise at least the controller 1510, 1520, 1530 and observer 1513, 1523, 1533 entities and the desired goal settings 1516, 1526, 1536. Most would additionally include at least some type of observer information path 1515, 1526, 1536, and at least some would utilize the resulting feedback loop. In this case, the desired goal settings 1516, 1526, and 1536 correspond to the maximum allowed number of calls or sessions for the associated service, as described earlier. Additionally, some products would also provide for policy parameter settings 1517, 1527, 1537, and, in reference to FIG. 16, can even internal provide some type of associated policy-oriented observer 1423 and observation 1425 directed to a policy controller 1426 so as to provide a policy feedback loop.

In some embodiments, the Unified Bandwidth Manager 1505 provides at least the policy observer and goal controller functions, such as policy observer 1423 and goal controller 1416 functions of FIG. 16, to at least the plurality of the controllers 1510, 1520, 1530 depicted in FIG. 17.

In some embodiments, the Unified Bandwidth Manager 1505 provides at least the policy observer 1423 and goal controller 1426 functions depicted in FIG. 16 to at least a plurality of controllers 1510, 1520, 1530 depicted in FIG. 17. In some embodiments, the Unified Bandwidth Manager 1505 provides at least observers 1513, 1523, 1533 depicted in FIG. 17.

Figure 18A:
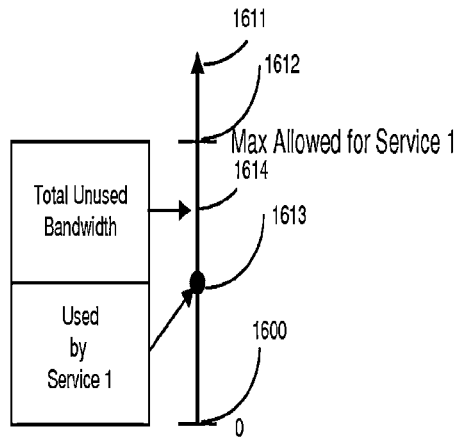
FIGS. 18a-18c depict the construction of a sequence of representations ("state-spaces") of instantaneous service usage (or service demand) that can be used for resource allocation.
Figure 18B:
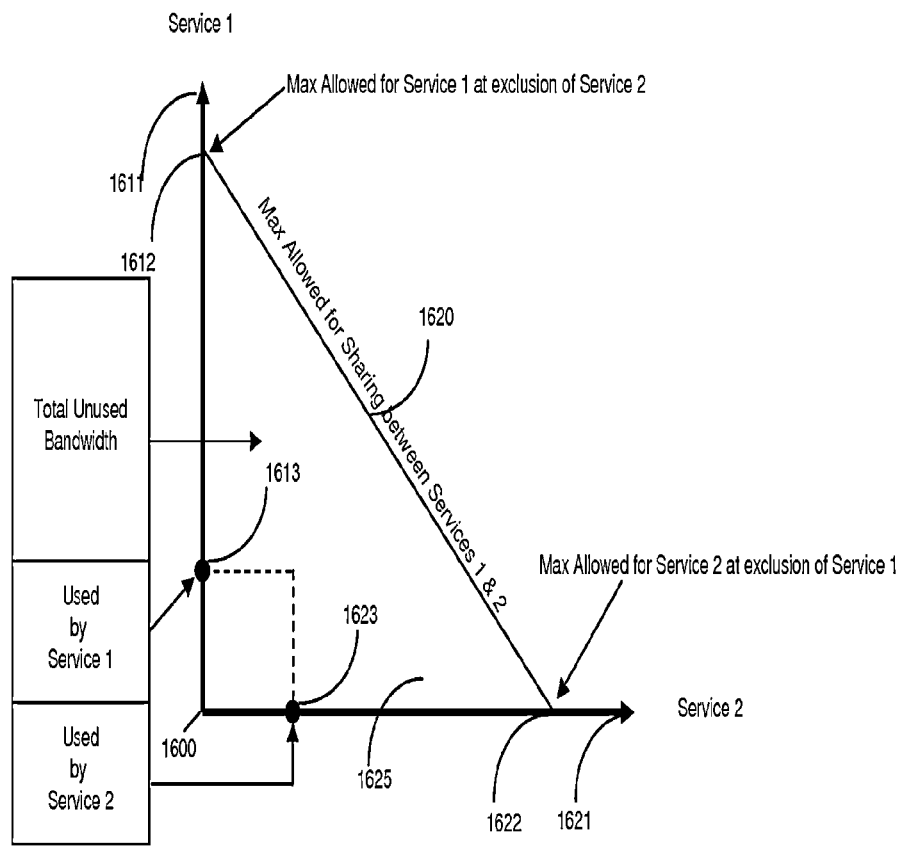
Figure 18C:
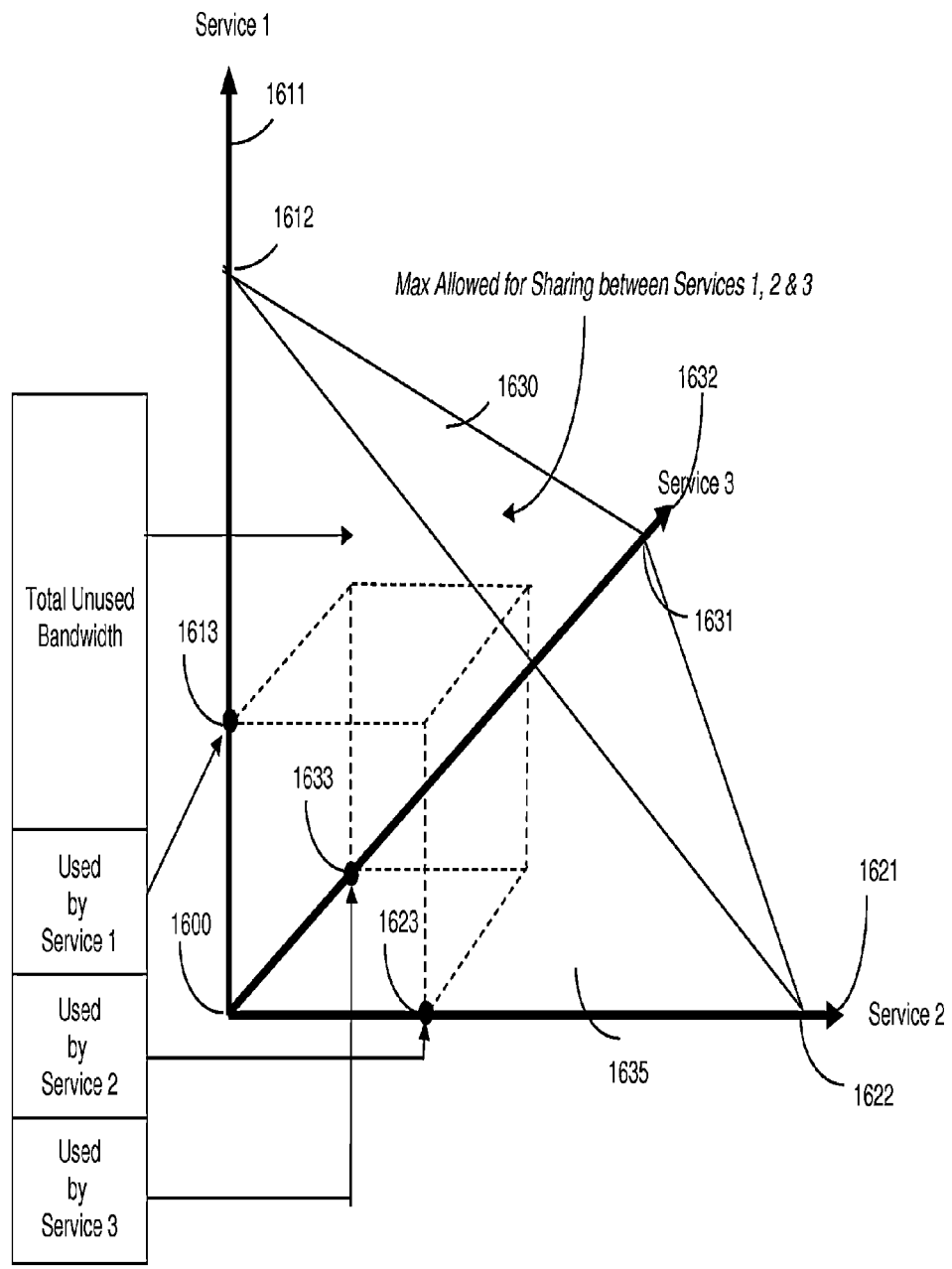

3. Controlling Call Admission, Session Admission, and Underlying Shared Mobile Bandwidth With these structural aspects of the hierarchical control system established, attention is now directed to how call admission, session admission, and underlying shared mobile bandwidth are controlled so as to realize the adjustable bandwidth allocations described earlier in conjunction with FIG. 11. FIGS. 18*a*-18*c* depict the construction of a sequence of geometric mathematical representations ("state-spaces") of instantaneous service usage (or service demand) that can be used for stochastic blocking-oriented performance prediction and other types of shared-constraint resource allocation computations. FIG. 18*a* depicts a case where there is only a single service, FIG. 18*b* depicts a case with two services, and FIG. 18*c* depicts a case with three services.

FIG. 18*a* depicts a case with only a single service "Service 1." For example, Service 1 can be a VoIP service operated under the control of an associate bandwidth reservation system. In FIG. 18*a*, the amount of bandwidth carved out for Service 1 determines the maximum number of Service 1 VoIP calls that can be allowed. This sets a maximum permitted extreme 1612 on a single axis or scale 1611 associated with Service 1. At any moment in time, the number of active calls (or in another type of design, demand for calls) lies at a point 1613 on this axis or scale 1611 in the interval between the zero value 1600 and the maximum permitted extreme 1612. The amount of unused bandwidth carved out only for Service 1 and not available to other bandwidth reservation systems comprised by other communications silos is the interval 1614 bounded by the number of active calls 1613 and the maximum permitted extreme 1612.

FIG. 18*b* expands the single service case of FIG. 18*a* into an arrangement accommodating two services, Service 1 and Service 2. Here, two scales or axes are used, one axis 1611 for Service 1 and another orthogonal axis 1621 for Service 2. At any moment in time, the number of active calls for Service 1 lies at a point 1613 on this axis or scale 1611 in the interval between the zero value 1600 and the maximum permitted extreme 1612. Similarly, at any moment in time, the number of active calls for Service 2 lies at a point 1623 on this axis or scale 1621 in the interval between the zero value 1600 and the maximum permitted extreme 1622. Here, by virtue of control by the Unified Bandwidth Manager, such as Unified Bandwidth Manager 110, unused bandwidth is pooled into a common group 1625 for potential reallocation. Because the total bandwidth used in this two service system must be the sum of the bandwidth used by Service 1 and bandwidth used by Service 2, the boundary for the permissible combinations is a line segment with negative slope 1620 connecting the external values 1612, 1622 for Service 1 and Service 2.

FIG. 18*c* expands the single service case of FIG. 18*a* and the dual service case of FIG. 18*b* into an arrangement that accommodates three services, Service 1, Service 2, and Service 3. Here, three scales or axes are used, one axis 1611 for Service 1, another orthogonal axis 1621 for Service 2, and a third orthogonal axis 1631 for Service 3. At any moment in time, the number of active calls for Service 1 lies at a point 1613 on this axis or scale 1611 in the interval between the zero value 1600 and the maximum permitted extreme 1612. Similarly, at any moment in time, the number of active calls for Service 2 lies at a point 1623 on this axis or scale 1621 in the interval between the zero value 1600 and the maximum permitted extreme 1622. Similarly, at any moment in time, the number of active calls for Service 3 lies at a point 1633 on this axis or scale 1631 in the interval between the zero value 1600 and the maximum permitted extreme 1632. Again, by virtue of control by the Unified Bandwidth Manager, such as Unified Bandwidth Manager 110, bandwidth not used by Service 1, Service 2 and Service 3 can be pooled into a common group 1635 for potential reallocation. Because the total bandwidth used in this two service system must be the sum of the bandwidth used by Service 1, the bandwidth used by Service 2, and the bandwidth used by Service 3, the boundary for the permissible combinations is a triangular plane section with negative slope 1630 connecting the external values 1612, 1622, 1632 for Service 1, Service 2 and Service 3.

This procedure depicted in FIGS. 216a-216c can be extended to include more services with associated bandwidth reservation system so as to produce state spaces with higher dimensions. The limiting point 1612 in FIG. 18a, limiting line segment 1622 in FIG. 18b, and limiting plane section 1632 of FIG. 18c generalize to a hyperplane of dimension one less than the number of services in a state space whose number of dimensions equal the number of services. The respect line segment, area, and volume of FIGS. 216a-216c bounded by the axes, the zero point 1600, and the limiting point/line/plane are respectively one, two, and three dimensional simplexes. All possible permissible combinations of allocations across the services lie within or on the borders of these simplexes. For N services, then, all permissible allocation combinations within the control of the combination of the Unified Bandwidth Manager, such as Unified Bandwidth Manager 110, with the N instances of bandwidth reservation system products controlled by the Unified Bandwidth Manager, such as Unified Bandwidth Manager 110, lie within such an N-dimensional simplex. It is important property that the points within such a simplex of any dimension can readily be sequenced by nesting of counting loops (such as a "DO-loop") as is well known to those familiar computer programming. For example, for an N-dimensional simplex, N separate nested "DO-loops" can be used with interdependent iterating counting limits.

In the case of calls and sessions such as the Unified Bandwidth Manager, such as Unified Bandwidth Manager 110, and controlled bandwidth reservation system products would expect to manage, it is empirically common that, at least piece-wise in time throughout the business day, call and session requests arrive independently of one another. This gives rise to fairly accurate modeling of the time behavior of incoming requests for calls and sessions, within at least piece-wise segments of the business day, by a stochastic process known as the Poisson process. Similar independence structures can be used to model the duration of time the call or session; these lead to an exponential probability distribution for the call or session duration. Together these create a well-vetted process for modeling blocking and resource allocations. As call arrival rates vary during a business day (for example busy hour, lunch hour, special events), a single parameter in the Poisson rate can be adjusted and the model will still largely apply.

Note this mathematical structure fits the call and session request process quite well, but does not apply to the time process for the underlying generation of individual packets. The number of active calls and sessions will modulate the rates of underlying packet generation, and thus directly correspond to a time-average of packet loading. However, in general the statistics of individual packet generation rates is quite different from a Poisson arrival/exponential duration model. In some embodiments the Unified Bandwidth Manager, such as Unified Bandwidth Manager 110, can model the time process of individual packet generation.

For calculating what level of blocking probability that call and session requests would be expected to experience for a single service exclusively drawing from shared resource (i.e., the case of FIG. 18a), well-know formulas and functions such as those attributed to and known as Erlang and Engset are used. It turns out that these formulas can be quite forgiving of the duration time probability distribution. Importantly, well-known algorithms are available for numerically calculating these Erlang and Engset blocking formulas.

For calculating what amount of resource available in the shared resource pool drawn upon by call or session requests of a single service so as to guarantee a maximum level of blocking, the Erlang and Engset blocking formulas can be inverted. Such inversion can be accomplished by putting an algorithm for the Erlang and Engset blocking formulas within a conditional counting loop, but other more sophisticated algorithms are widely known and can be readily applied by one skilled in the art of telephone traffic engineering. The inverted Erlang and Engset blocking formulas will be used in some embodiments of the control system, but they advantageously can be first extended to handle multiple services, particularly where the average bandwidth of each service is appreciably different. This is commonly the case; a (one-way) streaming audio session can use 16 kB to 32 kB per second, a (two-way) VoIP call can use twice this range, and a (two-way) point-to-point video session can use 200 kBps to 800 kBps.

If the empirically well-fitting Poisson arrival and exponential duration approximate statistics are in fact utilized for more of their mathematical power, they can be leveraged to address this problem. The Poisson arrival/exponential duration statistics impose a time-reversal symmetry, mathematically giving rise to an adjoint-like structure to the transition probabilities between states. Theorems of Kelly and others show that a brute force transition probability lattice can be constructed, only the points within the simplex need be kept, and the total sum of probabilities of each surviving state transitions can be used to renormalize the individual state transition probabilities. Further, this holds if the simplex is tilted in various ways. The simplex limit points at the axes can be scaled according to relatively how many service instances are permitted for the associated service multiplied by the relative amount of underlying resource one instance of that service uses. Thus, to handle multiple services with differing bandwidth requirements, call/session request arrival rates, and call/session durations, quite simple algorithms, very similar to those to numerically compute single service Erlang and Engset blocking formulas, can be used. Further, the average call/session arrival rate multiplied by the average call duration provides a well-known quantity called the traffic intensity, and this traffic intensity quantity is all that is needed from traffic observations for blocking calculations.

These properties will leverage further to address fairness among allocations within the collection of services. First, some examples are provided for applying the above to a two-service system.

Figure 19:
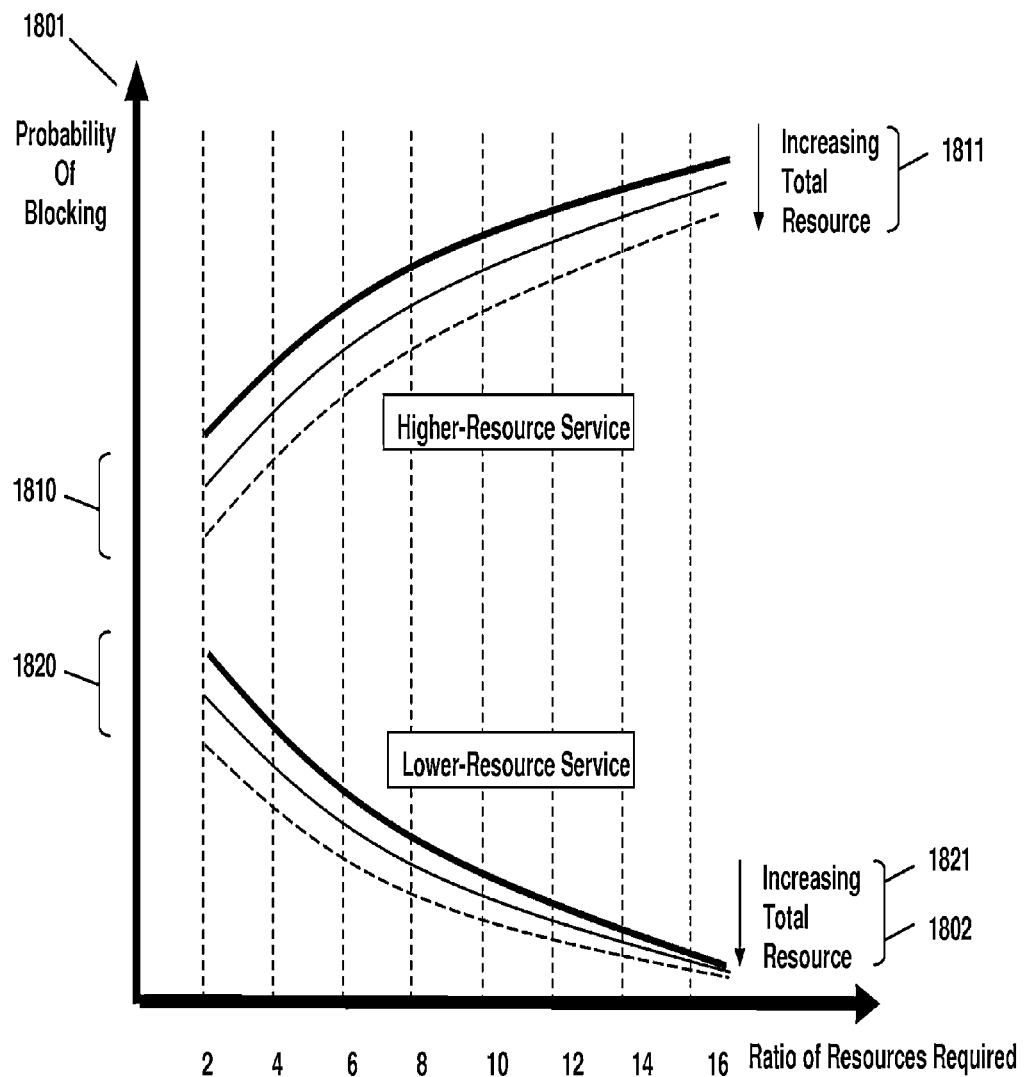
FIG. 19, adapted from [X1], illustrates examples of mixed bit-rate traffic call or session capacity blocking behaviors and their general structure for non-extreme ranges of parameters to each service.

One of the results of sharing bandwidth between services with differing bandwidth requirements is that services requiring higher bandwidth per call or session will experience a higher blocking probability than services requiring lower bandwidth per call or session. This can be appreciated using the last example: two higher resource sessions require 16 units of resource. If there are more than 4 lower resource sessions active, less than 16 units of resource would be available. The more general phenomenon is suggested by FIG. 19. FIG. 19, adapted from [X1] and created by Lyndon Ong based on the formulas of [X2], illustrates examples of cases where freely sharing bandwidth between services with differing bandwidth requirements results in the services requiring higher bandwidth per call or session will experience a higher blocking probability than services requiring lower bandwidth per call or session. Details here also depend on relative service request arrival rates for each type of service, and although there are notable curve variations as well as pathologies and exceptions, FIG. 19 illustrates examples of mixed bit-rate blocking behaviors and their general structure for non-extreme ranges of parameters. Families of blocking probability curves are shown for the "higher-resource service" 1810 and "lower-resource service" 1820. For each family of curves, the blocking probability 1801 decreases 1811, 1812 with increasing numbers of total shared resource, as is almost always the case in shared resource environments. However, the two families of curves 1810, 1820 spread with increasing divergence as the ratio 1802 of resource required increases, showing an increasingly unfair advantage for the "lower-resource service."

One way to make allocations and denials fairer, and in general have more predictable operation, is to impose minimum bandwidth allocations, such as, limit the number of resources that can be monopolized by any one service in the bandwidth sharing. This can be done by hacking away regions of the simplex of permitted shared bandwidth states.

Figure 20A:
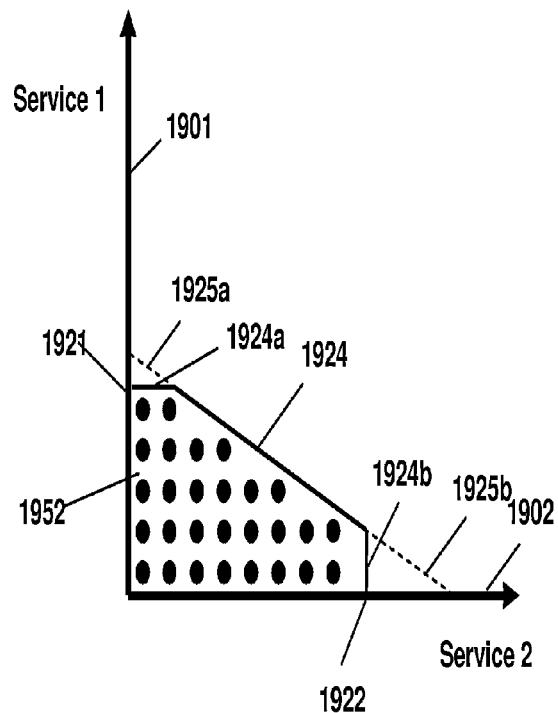
FIG. 20a illustrates the arrangement of FIG. 18b modified so as to include minimum bandwidth allocations to each service.

FIG. 20a shows truncation of the simplex of FIG. 18b that can be used to guarantee minimum bandwidth allocations for each service and thus reinstate fairness in a mixed bandwidth system that would otherwise exhibit the dynamics illustrated in FIG. 19. The constraint boundary for the full sharing in FIG. 18b has been replaced with a minimum bandwidth allocation boundary 1924, 1924a, 1924b truncating the states permitted by the original end-regions 1925a, 1925b associated with the 'open' policy with the minimum bandwidth allocation boundaries 1924a, 1924b corresponding to reservation levels 1921, 1922. These truncating minimum bandwidth allocation levels are dictated by the minimum bandwidth allocation constraints $2Y<Y_{max}$ (for Y boundary 1925a at intercept 1921) and $8X<X_{max}$ (for X boundary 1925b at intercept 1922).

Figure 20B:
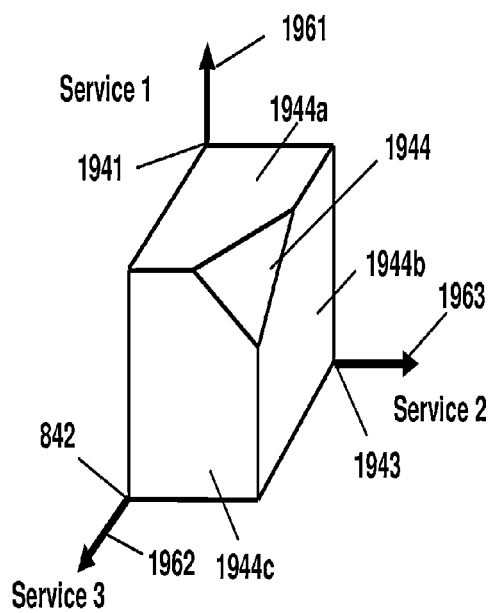
FIG. 20b illustrates the arrangement of FIG. 18c modified so as to include minimum bandwidth allocations.

These reservation constraints can be calculated from algebraic equations resulting from various fairness policies. This results in a non-triangular region of permissible states 1952. The reservation constraints depicted in the two-service case of FIG. 18c are relatively minor; more severe reservation effects are electively demonstrated in FIG. 20b. In particular, FIG. 20b shows the effect of reservations cutting off large portions of the surface of the geometric simplex of FIG. 18c, resulting in truncation planes 1944a, 1944b, 1944c with intercepts 1941, 1942 and 1943. In this example, the reservations are so significant that only a small portion 1944 of the original open surface 1934 of the geometric simplex depicted in FIG. 20b remains. (In the limit, stringent reservations effectively eliminate resource sharing, transforming the region of permissible states into a cube whose outward vertex shares only one point with the original open surface 1934 of the simplex.)

To summarize, sharing services across multiple services with differing bandwidth, arrival rates, and duration statistics can readily be accounted for in the Kaufmann or related model by straightforward shifting of simplex vertices and renormalization of the remaining relative state transition probabilities. Fairness can be provided for by truncating the simplex in the manner described in FIGS. 20a-20b. As described earlier, these blocking probability algorithms can be inverted, at least through embedding the within blocking probability algorithms conditional counting loops. In an embodiment the resulting inverted formula algorithms can be used to calculate the bandwidth needed to ensure the blocking probabilities required for each service given the observed call or session arrival rates for each service. In an embodiment, the Kaufmann or related model can be used for "scratchpad" calculations for an algorithm or interactive user interface operated by an administrator to explore "what if" cases of various candidate admission policy situations.

With this foundation, the power of the geometric state space and simplex manipulation representation of bandwidth sharing and reservations comes directly into play. Shifting or truncating the simplexes is equivalent to simple manipulation of the limits of "DO-loops". The mathematics inherent in the model formulas handles everything else within a renormalization factor. The renormalization factor is directly computed by sequencing the "DO-loops" so as to sum every state transition probability among neighboring states within the simplex. These systems and methods to be incorporated in embodiments of the Unified Bandwidth Manager, such as Unified Bandwidth Manager 110.

The Unified Bandwidth Manager 110, can use these types of inverted blocking probability algorithms in various ways to automatically readjust the bandwidth carved out for each of the bandwidth reservation systems as a function of the traffic pattern observations. The simpler single-service Erlang and Engset inverted blocking probability algorithms can be used to estimate the bandwidth carve-out needed for a specified call or session request refusal rate (i.e. blocking probability) and traffic intensity.

Figures 21A, 21B:
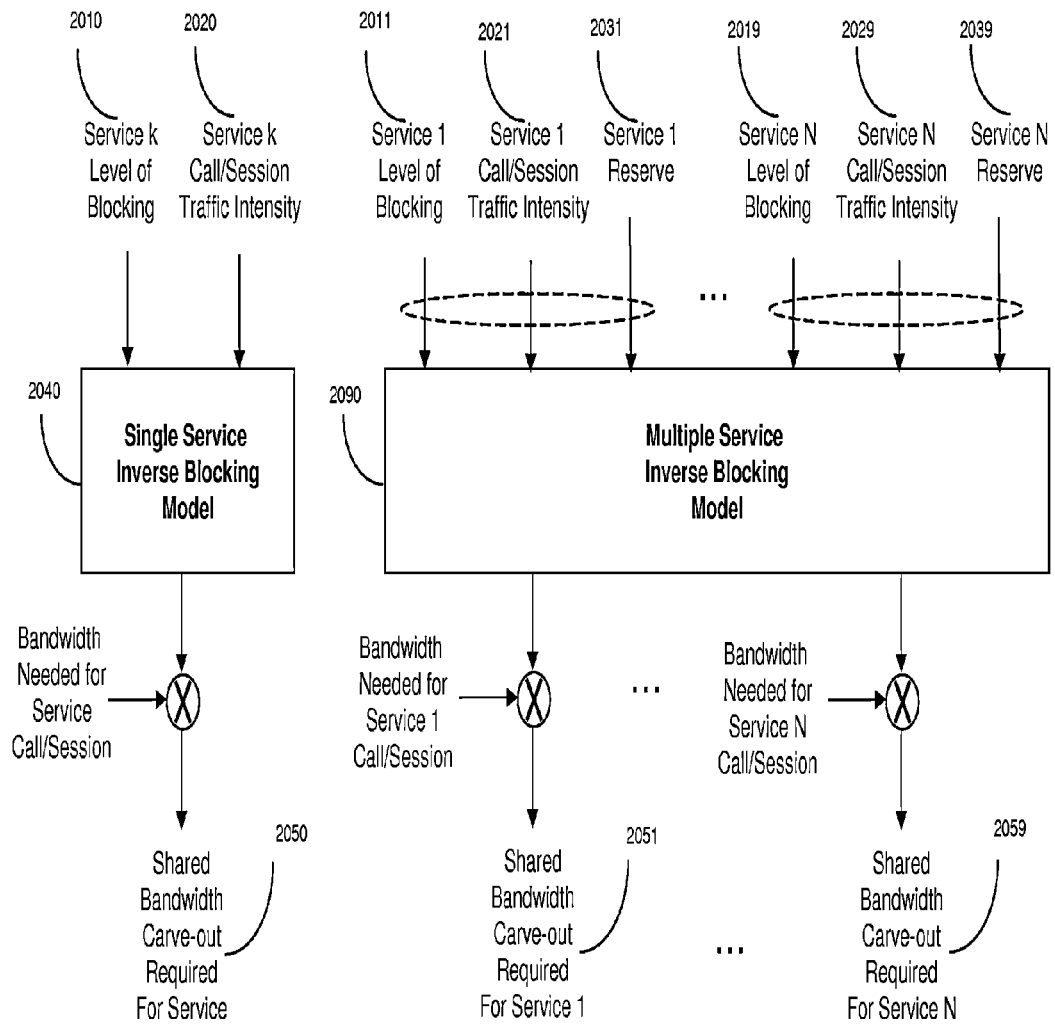

FIG. 21a shows how single service inverse blocking algorithm associated with FIG. 20a can be used to emulate the real-world service experience provided by each individual bandwidth reservation system. FIG. 21a illustrates a flow chart for using this type of algorithm 2040 in this way. With an instance of the arrangement of FIG. 21a for each service, the Unified Bandwidth Manager, such as Unified Bandwidth Manager 110, can predict the amount of bandwidth 2050 each bandwidth reservation system in each of the plurality of communication silos will require to be carved out given currently observed (or forward predicted) traffic intensity 2020 associated with that communication silo service for a specified level of blocking performance 2010.

FIG. 21b illustrates now a multiple service inverse blocking algorithm associated with FIG. 20b can be used to emulate the real-world service experience provided by a bandwidth reservation system.

FIG. 21b shows an extension of the arrangement of FIG. 21a utilizing an algorithmic inversion 2090 of the Kelley/Kauffman multiple service blocking calculations described earlier. For each service, currently observed (or forward predicted) traffic intensity 2021-2029 and specified level of blocking performance 2011-2019 are specified. The multiple service algorithmic inversion 2090 provides the amount of bandwidth 2051-2059 each bandwidth reservation system in each of the exemplary plurality of communication silos will require to be carved out. Additionally the multiple service algorithmic inversion 2090 provides the ability to guarantee minimum bandwidth allocations 2031-2039 to ensure fairness should that feature be useful to the Unified Bandwidth Manager feature set. Through mathematical manipulation these fairness settings can also be used in other contexts, including the maximum call bounds associated with each bandwidth reservation system.

Figure 22:
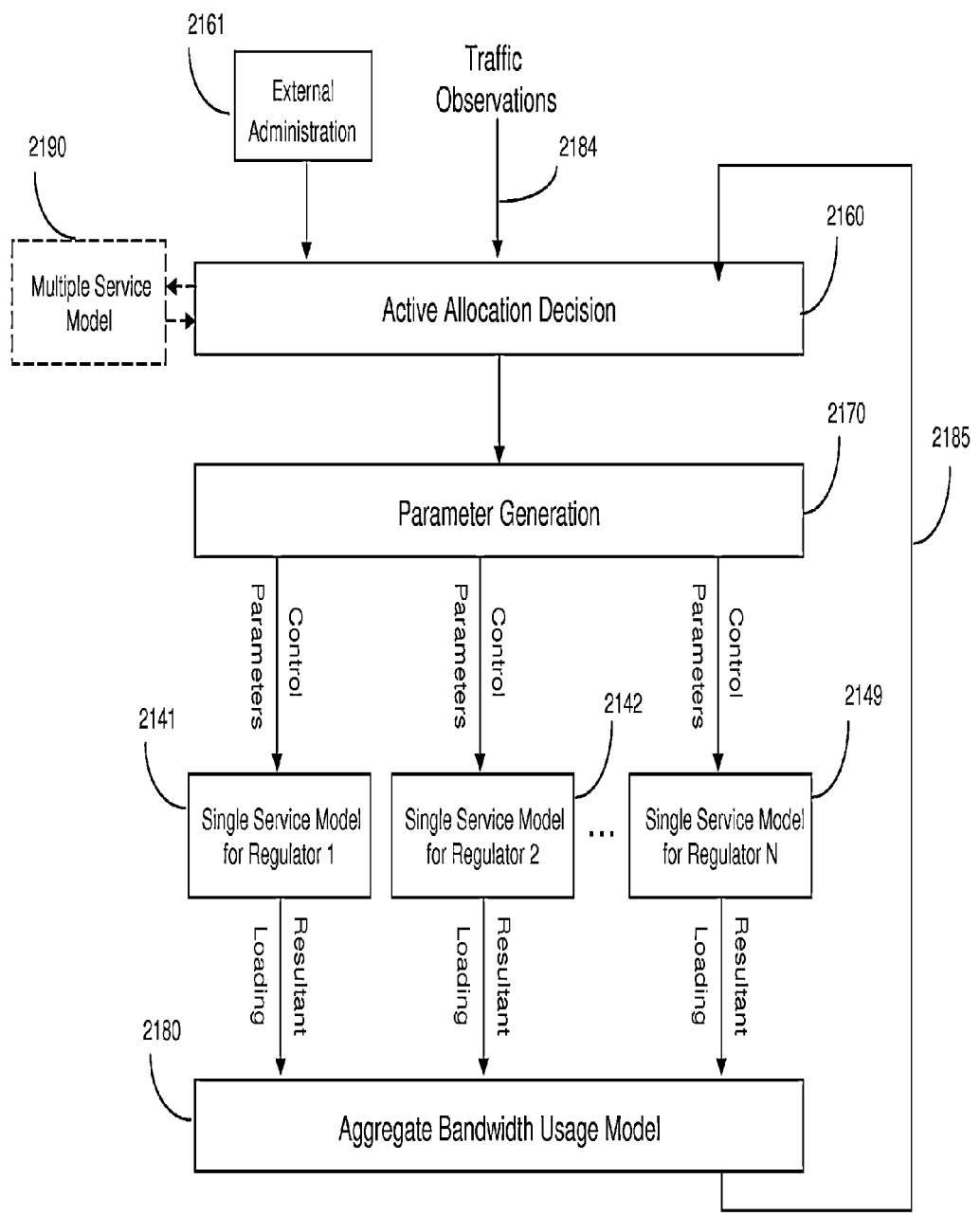
FIG. 22 and FIG. 23 depict exemplary ways the Unified Bandwidth Manager can internally calculate maximum call and session admission settings for each of the bandwidth reservation systems.

The Unified Bandwidth Manager 110 can use these in various ways to internally calculate maximum bandwidth settings for each of the bandwidth reservation systems. One embodiment is depicted in FIG. 22. FIG. 22 depicts an exemplary embodiment of ways the Unified Bandwidth Manager 110 can internally calculate maximum call and session admission settings for each of the bandwidth reservation systems. Here, an allocation module 2160 can obtain information 2184 from traffic observations, information 2184 from an aggregate bandwidth allocation usage model 2180, and external administration information 2184. Trial high-level allocation decisions are directed to a parameter generation module 2170 that provides parameters suitable to send to the bandwidth reservation systems. These control parameter settings are instead sent to single service models 2141-2149 of the bandwidth reservation systems. These are as described in conjunction with FIG. 21*a*, and produce the resulting bandwidth requirement loads they need to guarantee their associated performance levels. These resulting bandwidth requirement loads are combined, potentially with other model outputs and considerations, in the aggregate bandwidth allocation usage model 2180.

In some embodiments, the allocation module 2160 can interact with the multiple service model 2190 so as to include broader inter-service interaction effects and fairness-oriented considerations in the allocation decisions made by the allocation model 2160.

Figure 23:
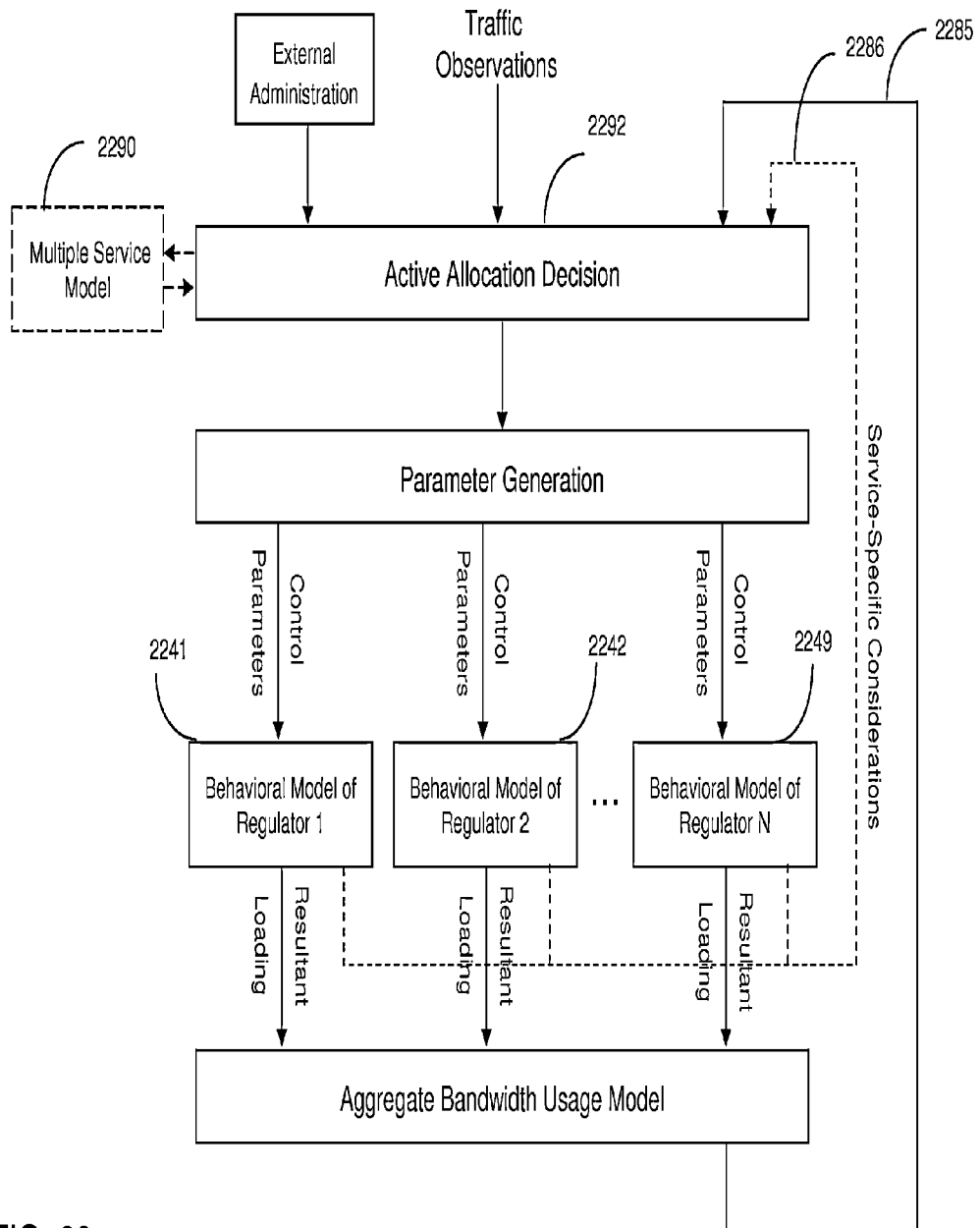

FIG. 23 depicts an embodiment of ways for the Unified Bandwidth Manager to internally calculate maximum bandwidth settings for each of the bandwidth reservation systems. FIG. 23 depicts a variation of the arrangement of FIG. 22 wherein behavioral models 2241, 2242 and 2249 have been enhanced with additional service-specific attributes and which pass additional service-specific considerations 2286 to the allocation decision module 2292.

In some embodiments, allocation decision module 2292 is similar to allocation module 2160, except it additionally includes any of the following additional components and methods: empirical predictors for traffic variations (trend based, time-of-day based, event based, etc.), empirical behavior models for unknown dynamics of a bandwidth reservation system product, topological considerations regarding specific communication Links and Site networks, failure handling, recovery, and post-failure allocation, topological call-based routing, and merger of like communications silos and associated traffic that are segregated into separate administrative domains.

In some embodiments, the Unified Bandwidth Manager 110 can include one or more of traffic predictors and empirical behavior models for unknown dynamics of bandwidth reservation system products. Empirical predictors for traffic variations (trend based, time-of-day based, event based, etc.) are known in the art. These can comprise formal system estimation and/or time-series models. In some embodiments, the Unified Bandwidth Manager 110 can include various forms of these. Empirical behavior models for unknown internal dynamics of a dynamical system are known in the art. These can be applied to estimating the unknown internal dynamics of a bandwidth reservation system product. In some embodiments, the Unified Bandwidth Manager, such as Unified Bandwidth Manager 110, includes various forms of these.

At the level of simply granting or denying a new incoming call/session request, there are at least two approaches that can be employed:

Approaches wherein the admission control system is not involved with or responsive to packet level processes (considered in this section), and Approaches wherein the admission control system is involved with and/or responsive to packet level processes (considered Section 6).

Because the underlying media is packet-oriented, admission control systems that are not involved with or responsive to packet level processes treat each call/session a particular service type as if it occupies or consumes some sort of bandwidth footprint, (i.e. an "effective bandwidth" value, "average bandwidth" value, "peak bandwidth" value, etc.), that is an abstract block of bandwidth for each call/session of a particular service type. This is as was discussed in the opening portions of this document, but is brought forward as a reminder here.

Figure 24:
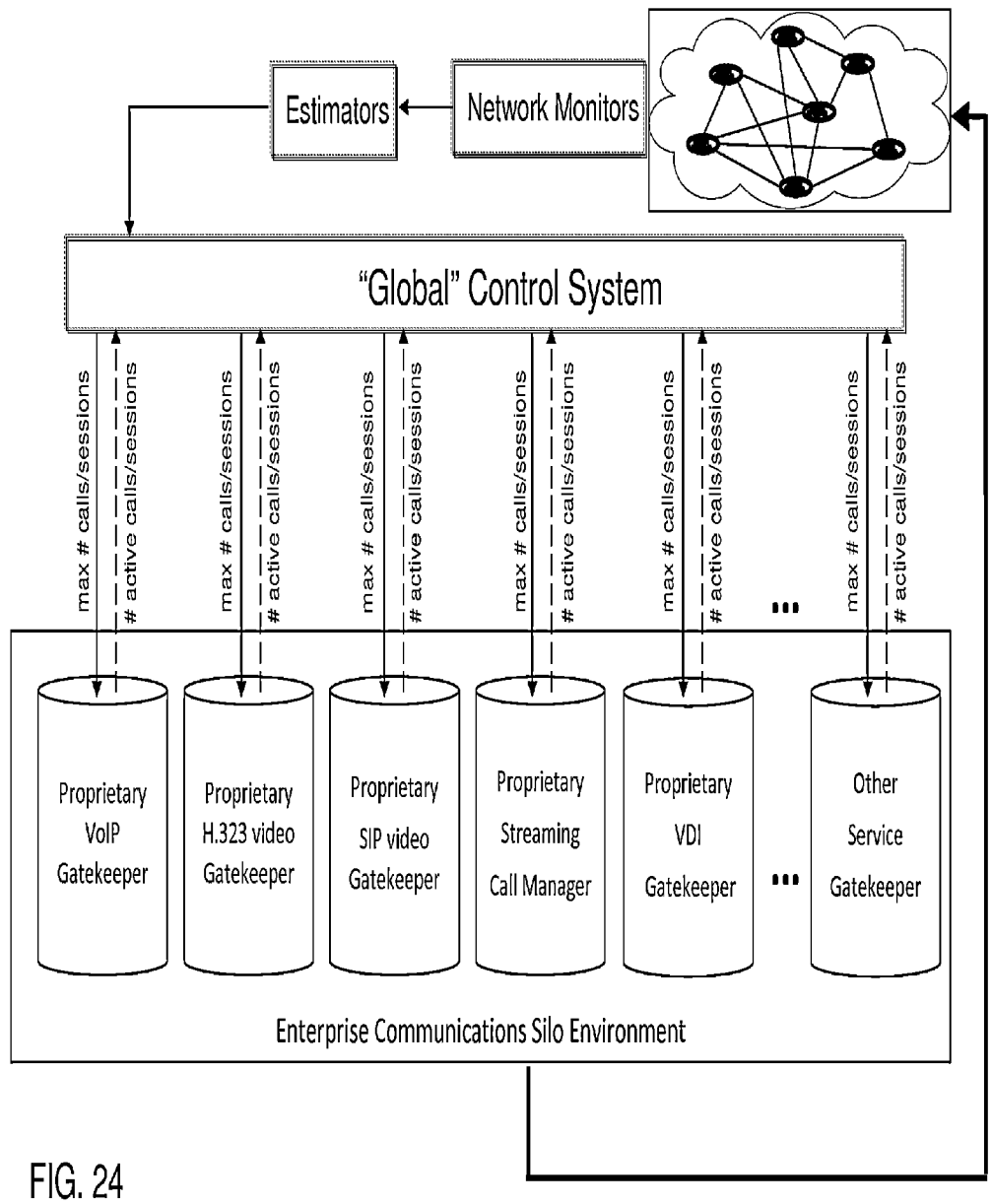
FIG. 24 depicts an example implementation of a reservation system for a multiservice network wherein a "global" control system provides updates to the each of the gateways as to the maximum number of calls/sessions each service is to permit.

3.1 Example Architectures for Implementing Adaptive Admission Control Reservations As just described in the previous section, a control system provided with at least call/session state information can be used to implement a fixed or adaptive reservation system across multiple services on a common network by manipulating the settings for the maximum number of simultaneously active calls/sessions for each participating gatekeeper, applications, or other aspects within each individual communications service silo. The control and measured information flows of such a system can be implemented, for example, as depicted in FIG. 24. Alternatively, the reservation system can be implemented without a centralized controller through use of a shared database or shared files (as suggested by FIG. 25), direct peer-to-peer communications among the communications silos (as suggested by FIG. 26), as well as other possible approaches.

For arrangements such as depicted in FIG. 24, there are at least two approaches for incorporating adaptive control given that a control system is already in place. In one approach, the fixed reservation control system is replaced by an adaptive reservation control system, or modified so as to provide adaptive reservation control capabilities.

In a second approach to incorporating adaptive control into arrangements such as that depicted in FIG. 24, the fixed reservation control system in FIG. 24 is arranged to be in turn controlled by an additional control system that can modulate the fixed reservation settings. Inputs to the additional control system are not shown in but can include one or more of:

the same information provided to the global controller, subsets of the information provided to the global controller, additional information provided by the communications silos additional information obtained by additional estimators and/or network monitor measurements of traffic on the network.

Figure 25:
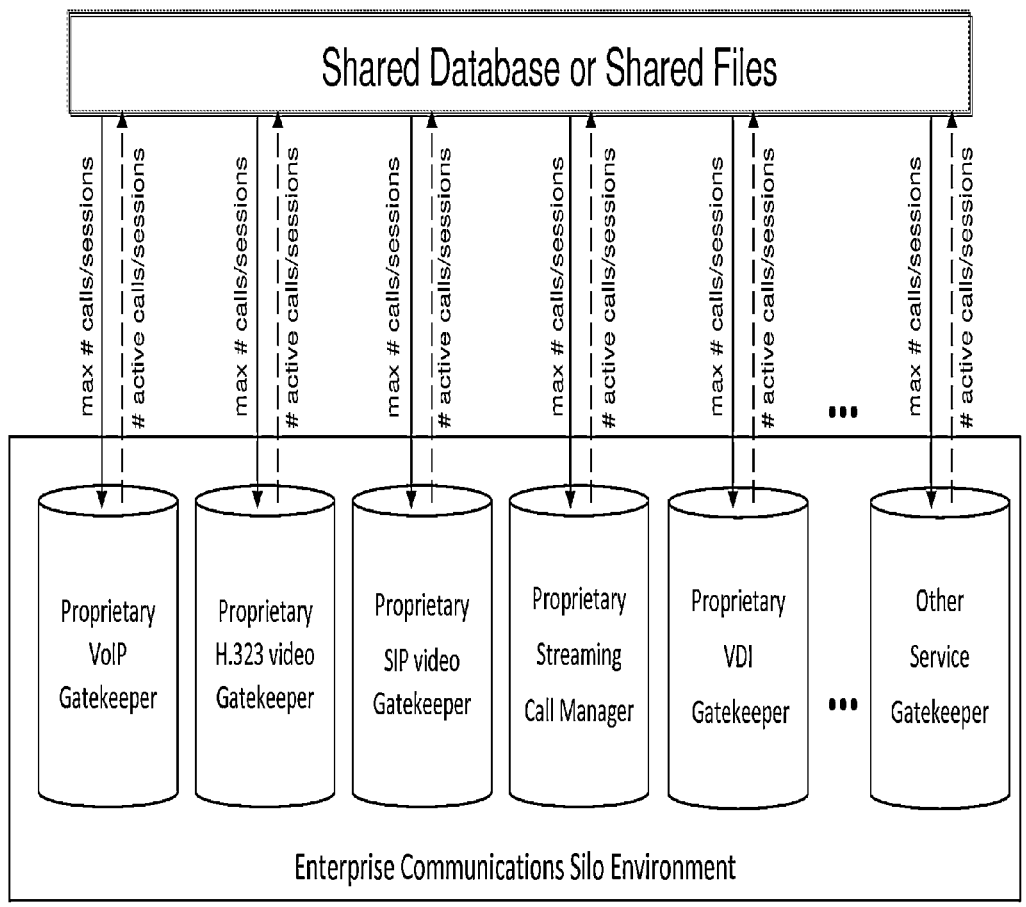
FIG. 25 depicts an example arrangement wherein information setting the maximum number of currently permitted calls/sessions for each service and the number of currently active calls/sessions can be exchanged among communications silos through use of a shared database or shared files

For arrangements such as depicted in FIG. 25, an external adaptive reservation control system can communicate with the shared database or shared files. Inputs to the additional control system are not shown in but can include one or more of:

additional information provided by the communications silos additional information obtained by additional estimators and/or network monitor measurements of traffic on the network.

Figure 26:
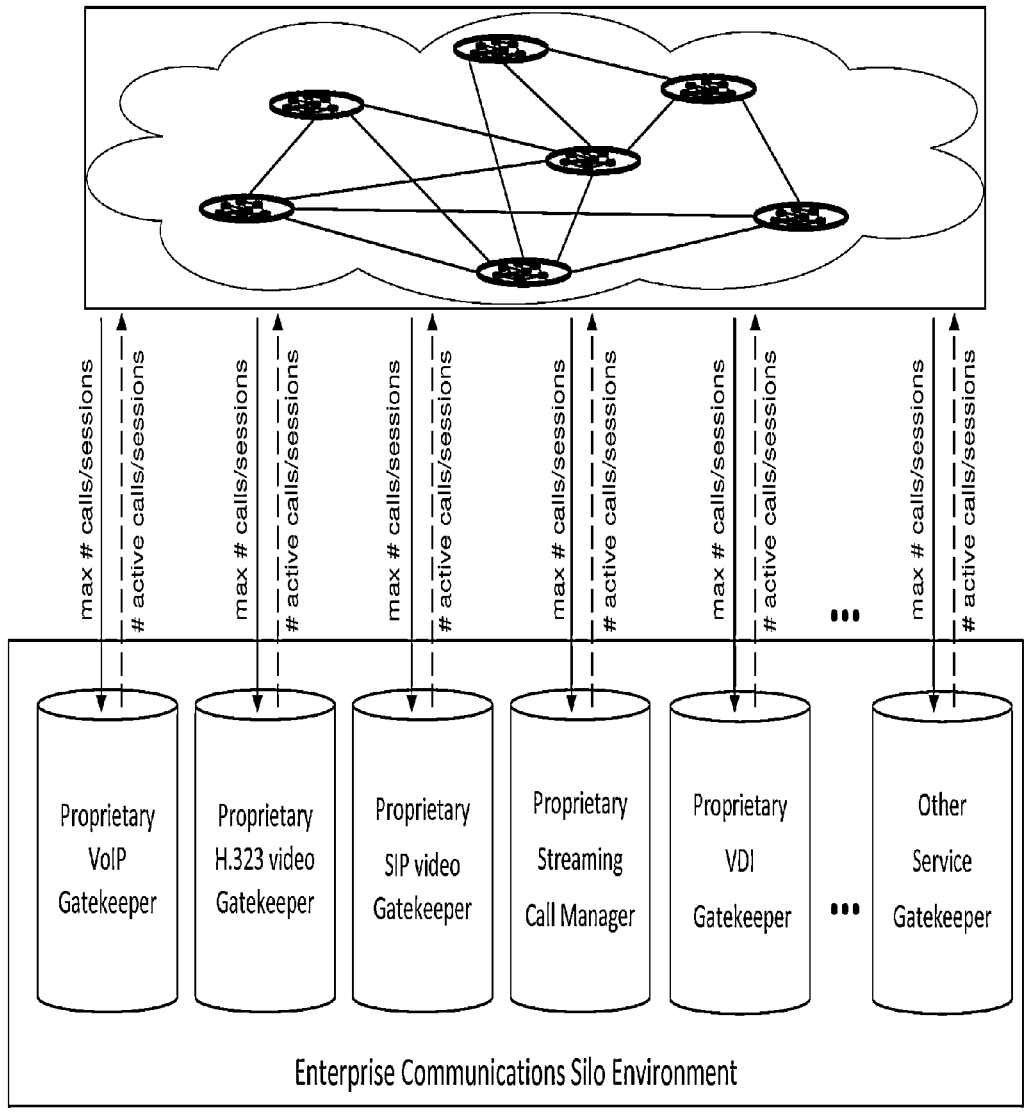
FIG. 26 depicts an example arrangement wherein information setting the maximum number of currently permitted calls/sessions for each service and the number of currently active calls/sessions can be exchanged among communications silos through direct peer-to-peer communications among the communications silos.

For arrangements such as depicted in FIG. 26, an external adaptive reservation control system can communicate with each of the communications silos. Inputs to the additional control system are not shown in but can include one or more of:
- additional information provided by the communications silos
- additional information obtained by additional estimators and/or network monitor measurements of traffic on the network.

Figure 27:
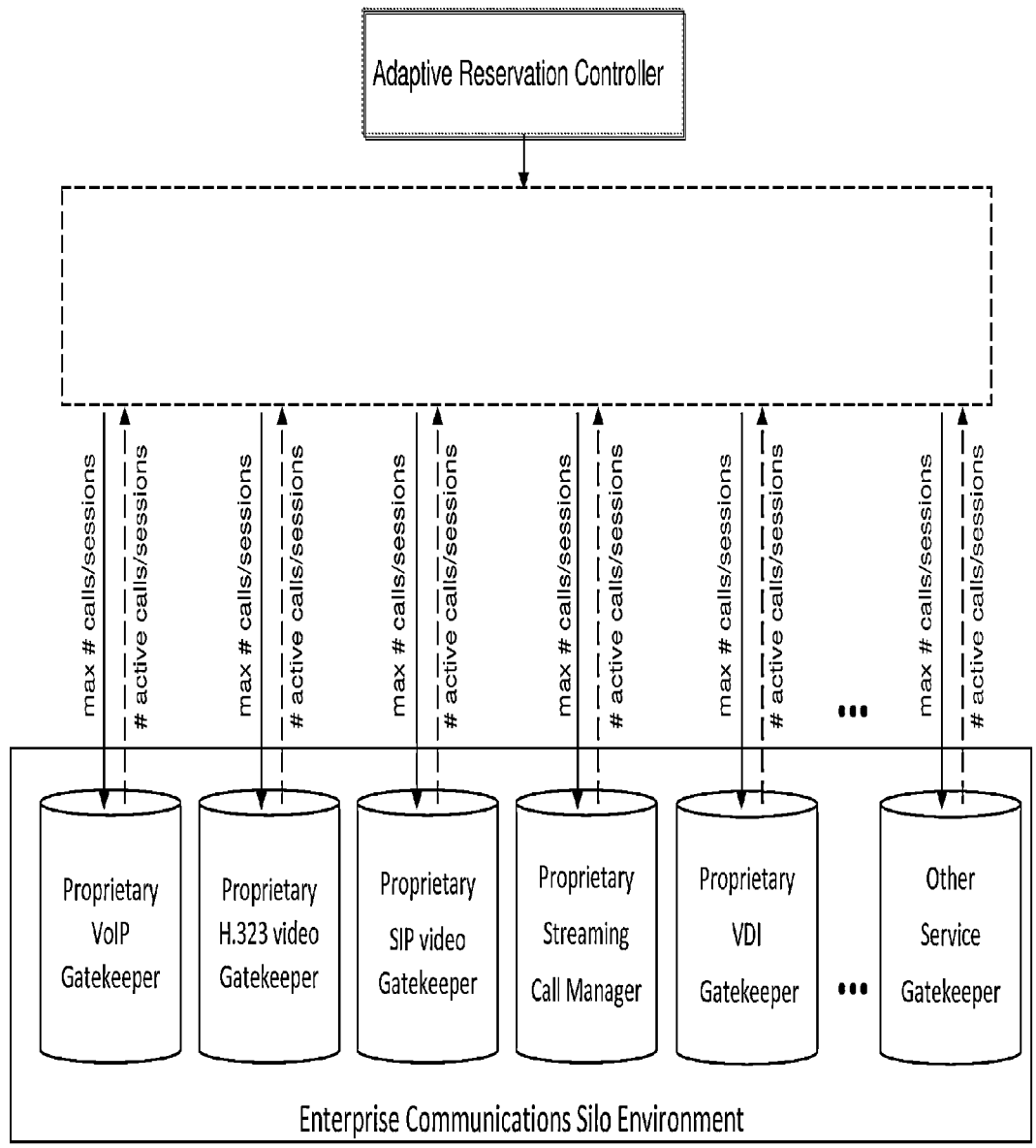
FIG. 27 depicts a representation generalizing various arrangements for realizing adaptive reservation control environments.
Figure 28:
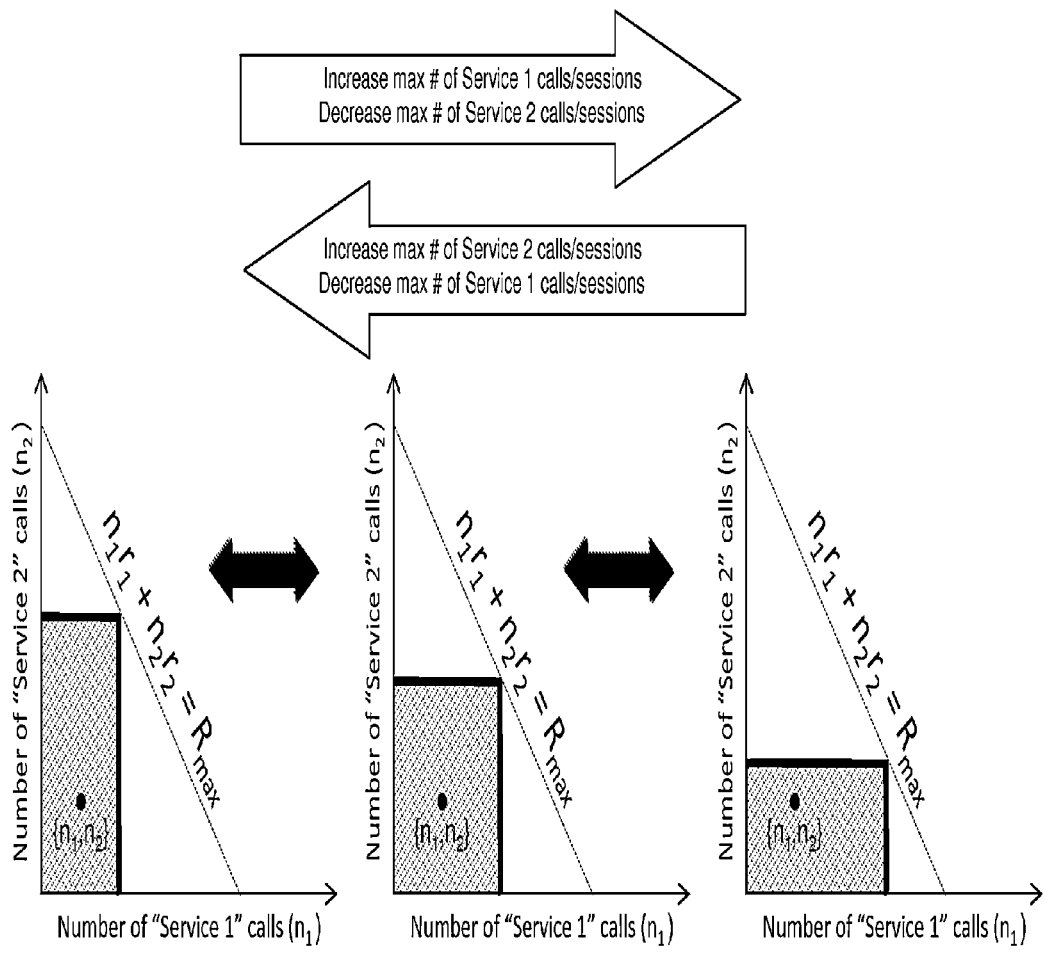
FIG. 28 depicts an example of how such a "global" control system can manipulate the maximum number of calls/sessions each service is to permit so as to create a reservation system.

FIG. 27 shows a representation generalizing each of the examples described in conjunction above (as well as others), as suggested by the 2-service examples depicted in FIG. 28 the settings for each service silo's maximum number of simultaneously active calls/sessions can be widely adjusted so as to ride the full-sharing boundary. If this is done only to specific limiting values, reservation systems with allowed state spaces can be implemented. If these limiting values are fixed (for example, by a communications service administrator or network administrator, the result behaves a fixed reservation system, If instead these limiting values are allowed to vary under feedback control, the result is an adaptive reservation system, 3.2 Control as a Function of Active Call/Session State As a first example implementation of adaptive reservation control, the reservation boundaries can be changed as a function of the state. The rational for this is worthy of a brief philosophical aside:
- The whole purpose of reservations is to guarantee a minimum amount of bandwidth for a particular service when one or more other services would otherwise consume all available shared bandwidth;
- However, if at least one service is experiencing high traffic demands while one or more other services hardly have any usage, then the result is unfair to the heavily loaded service(s), and further is wasteful as the reserved bandwidth goes unused;
- If the reservations are large, or there are many services with reservations, then the waste and unfairness can become extensive.

Figures 29, 30:
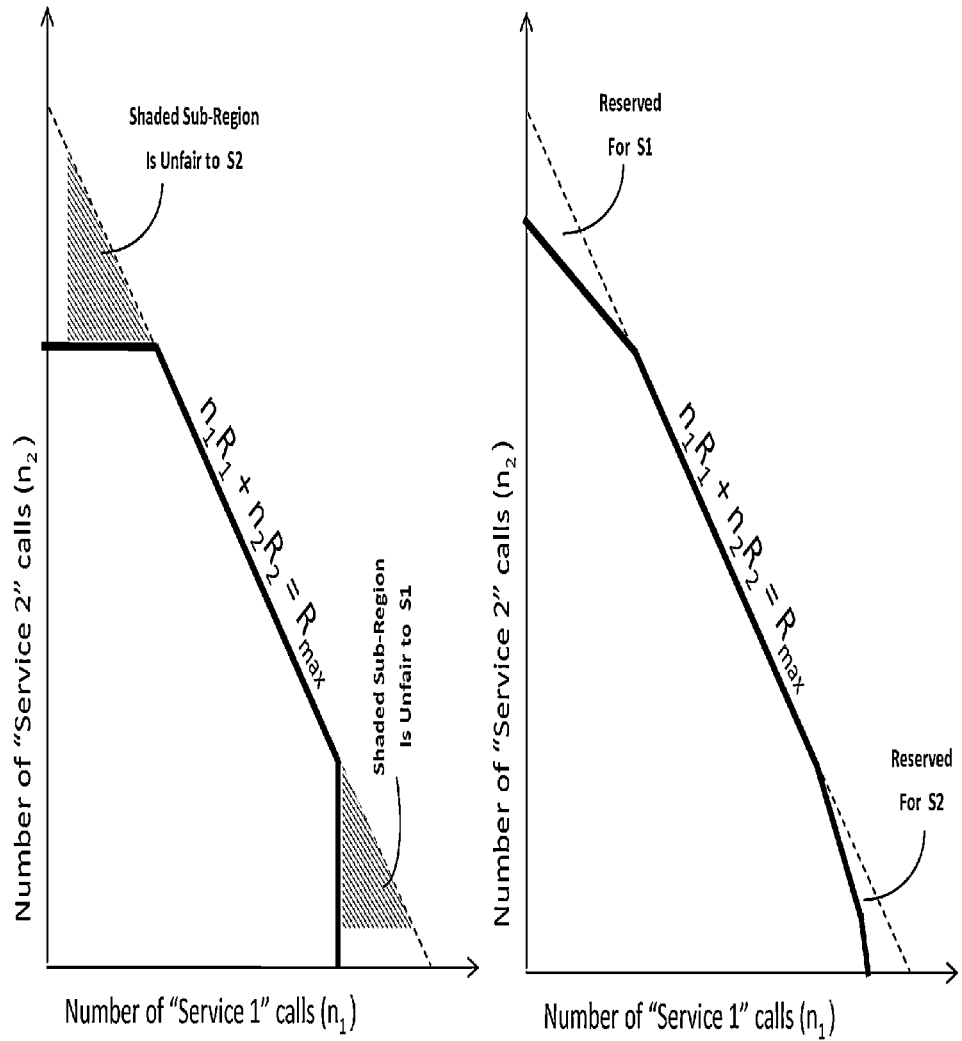
FIG. 29 depicts example shaded sub-regions of reservation regions are unfair to the other service(s).
FIG. 30 depicts example alternative reservation boundary shapes.

A moment's reflection on the above points yields at some point that reservation arrangements provide some of what is desired for a service but in fact too much protection for that service in that some portions of the reservations are excessive. As a start to this, consideration of the example presented in FIG. 29 shows that at least most of the shaded sub-regions of the reservation regions are unfair to the other service(s). Thus the problem with fixed reservations is that the reservation region has the wrong-shaped boundary. Further review of desired policy can produce more desirable boundary shapes for the reservations region. For example, in FIG. 30 the reservation boundary associated with Service 1 is sloped at a different angle than the corresponding reservation boundary of FIG. 29, and the reservation boundary associated with Service 1 comprises at least one breakpoint. In general forms of this arrangement as provided for by the invention, state information can be used to control the maximum number of calls/sessions so as control the shapes of the reservation boundaries in arbitrary ways. Typically, however, it is advantageous to have whatever the resulting shape of the entire bold curve be convex (for as shown in [X2] non-convex shapes can give rise to unrealistic and/or undesired outcomes).

In another example implementation, conditional tests are performed on the values of current-state input, the outcome of the conditional tests causing the generation of a control message to change the maximum number of calls/sessions for at least one service.

3.3 Quantizing and Hysteresis

With quick reference to FIG. 14C, it can be seen that the angular-sloped portions of the bold curves in FIG. 29 and FIG. 30 require an ongoing flux (and typically a high number) of communications messages from the controller to the individual communications silos as the state changes from one state value to another. Also, importantly, it can be seen that the arrangement of FIG. 30 requires a higher number of communications messages from the controller to the individual communications silos than the arrangement of FIG. 29—this is because the reservation regions of FIG. 29 will not require further communications messages from the controller until the state leaves these regions). One signature of the latter circumstance is that a reservation boundary is parallel to a coordinate axes.

Thus, the number of messages can be reduced if the various slopes depicted in the arrangements of FIG. 29 and FIG. 30 and their higher-dimensional generalizations are quantized into staircases (for two services) or more generally (for three or more services) quantized into convex hulls with surfaces parallel to planes defined by pairs of coordinate axes. The greater the level of this form of quantization, the less message flux required from the controller to the individual communications silos so as to adjust the maximum number of calls/sessions for each service as suggested in FIG. 24. In order to reduce the message flux from the controller to the individual communications silos, the quantization process is implemented in the controller.

Another way to reduce the message flux is to employ hysteresis in the adjustment of the maximum number of calls/sessions for each service. In one example implementation, the hysteresis process introduces directional memory into the adjustment process of the maximum number of calls/sessions for each service. In order to reduce the message flux from the controller to the individual communications silos, the hysteresis process is implemented in the controller. Yet other arrangements are possible, anticipated, and accordingly provided for by the invention.

3.4 Controller Dynamics Considerations

In the situations described thus far, the call/session request dynamics can cause the state to vary widely, so much so that only use of current state (i.e., the current number of active calls/sessions at a given instant) may result in both erratic behavior and a high flux of control messages. One approach to improve these shortcomings would be to include the rate-of-change of the state (i.e., the rate-of-change of the number of active calls/sessions at a given instant) as an input to the adaptive reservation controller. This allows, for example, the observance of high rates-of-change in the state (current number of active calls/sessions at a given instant) to cause anticipatory adjustments in relevant reservation settings.

In an example implementation, the rate-of-change measurement can be implemented as a simple difference between a previous state value and the current state value. In another example implementation, the rate-of-change measurement can be implemented as a more sophisticated numerical difference operator approximating a time-derivative (for example, multi-point stencil, difference quadrature, etc.).

In contrast to rate-of-change "time-derivative" controller input which produces anticipatory behavior, "time-integral" input can be used to produce lagging conservative influences in the response. More generally, a weighted combination of current-state input, rate-of-change "time-derivative" input, and "time-integral" input can be used to produce a response with more desirable dynamics. In the case of a linear controller, such an arrangement would correspond to a "Proportional/Integral/Derivative" or PID controller. The invention provides for use of linear PID controllers but also provides for the use of nonlinear PID controllers as advantageous in various applications. For example:

In an example implementation, a linear PID controller (comprising separate weighting coefficients for current-state input, rate-of-change "time-derivative" input, and "time-integral" input) is arranged so that the weighting coefficients are adjusted as function of state (for example, with different anticipatory versus conservative lagging behaviors when the state is nearer resource limit and reservation boundaries than when the state is farther from these resource limit and reservation boundaries;

In another example implementation, conditional tests are performed on the values of current-state input and one or more of rate-of-change "time-derivative" input and "time-integral" input, the outcome of the conditional tests causing the generation of a control message to change the maximum number of calls/sessions for at least one service.

Many other dynamic control arrangements are possible and are provided for by the invention. For example, the controller can comprise one or more of:

A linear predictor;
A nonlinear predictor;
A traditional Kalman (Gaussian) filter;
A modified Kalman filter (for example, non-Gaussian)
A time-driven ramp generator;
A periodic or dithering function;
A quantization process;
A hysteresis process.

Yet other arrangements are possible, anticipated, and accordingly provided for by the invention.

3.5 Stochastic Model Considerations

In another approach, the adaptive reservations controller can include aspects structured around a model of the stochastic dynamics and/or statistics of the call/session arrival and departure processes. These can facilitate the advantage or need for providing the adaptive reservations controller with other types of input information. For example:

In one example implementation an adaptive reservations controller can comprise aspects specifically designed around mathematical expressions derived from models employing Markovian dynamics. In such an arrangement, it can be advantageous to provide the adaptive reservations controller with real-time estimates of arrival rates and holding times.

As another example, an implementation an adaptive reservations controller can comprise aspects based on Bayesian decision theory. In such an arrangement, it can be advantageous to provide the adaptive reservations controller with real-time estimates of various probability distributions with respect to a set of observations.

As yet another example, an implementation an adaptive reservations controller can comprise aspects based on time series data. In such an arrangement, it can be advantageous to provide the adaptive reservations controller with real-time estimates of various time series quantities with respect to a set of observations.

As still another example, an implementation an adaptive reservations controller can comprise aspects based on other types of models, for example UPC parameters. In such an arrangement, it can be advantageous to provide the adaptive reservations controller with real-time tabulations of various UPC parameter values and demographics with respect to the currently active calls/sessions.

Yet other arrangements are possible, anticipated, and accordingly provided for by the invention.

4. Adapting Wireless Rate-Adaptation Congestion Control Methods and Systems to Mobile Networks In an embodiment, the invention provides for adaptations of thin-client AV methods and systems to support aspects of highly scalable multi-service environments comprising video for mobile devices.

Attention is again directed to FIG. 6 depicts in part adaptations and combinations of multiservice bandwidth management technology, A/V gateway technologies, and rate-adaptation congestion control methods and systems developed for wireless networks to create multiservice mobile networks and devices supporting 2-way video. Shown here is how the bandwidth management system controls the rate adaption parameters of one or more rate-adaptation systems.

The arrangement can be further extended to control the bit-rate allocation for new calls/sessions (allocated at their admission), thus affecting the bandwidth footprint of that particular session/call. For example, as traffic levels increase, new session/call requests are allocated less bandwidth.

Figure 31:
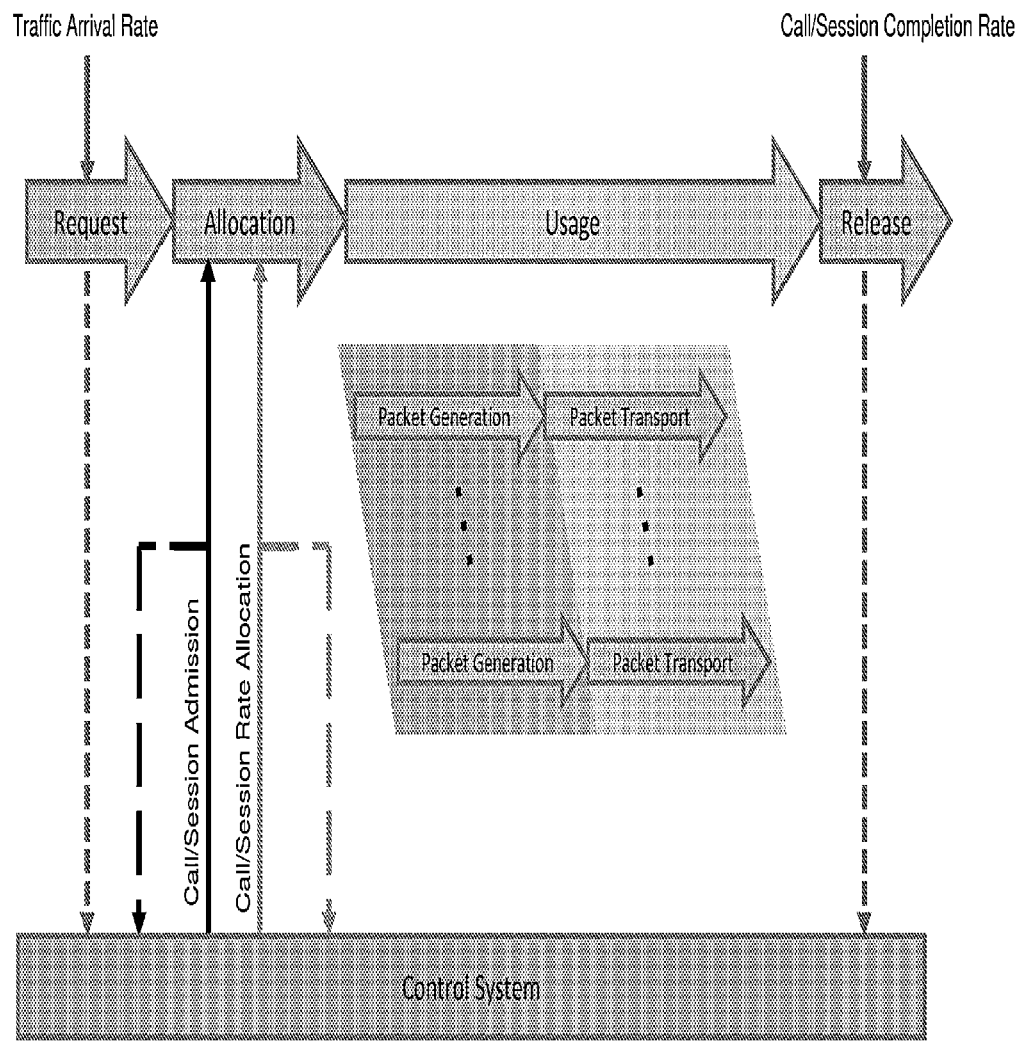
FIG. 31 depicts an example arrangement wherein the basic session admission closed-loop control system also variably controls call/session rate allocation made at the beginning of each new call/session allocation.
Figure 32:
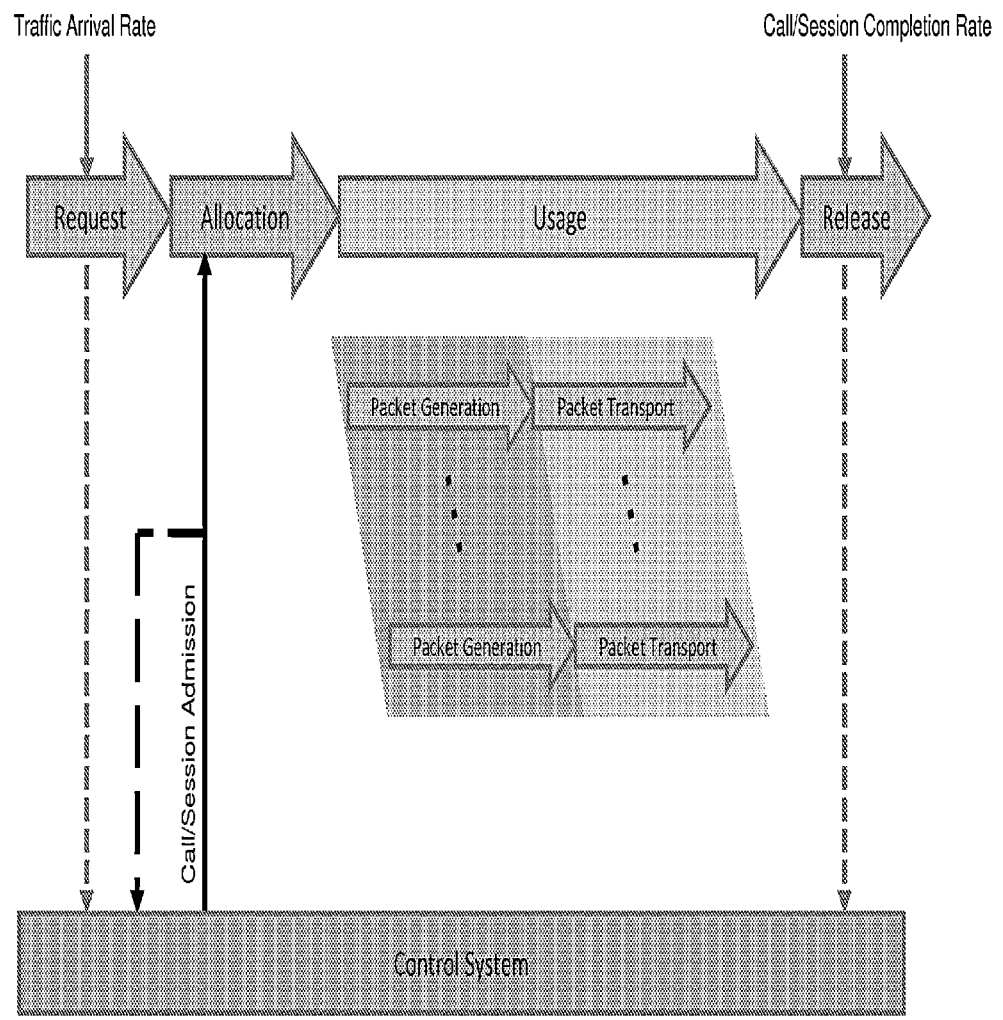
FIG. 32 depicts an example call/session admission closed-loop control system.

FIG. 31 depicts an example adaptation of the arrangement of FIG. 32 wherein the basic session admission closed-loop control system also variably controls call/session rate allocation made at the beginning of each new call/session allocation. An adaptive reservation controller could be designed, as advantageous, to take various policy actions in response to current traffic, traffic measurements, call/session parameter demographics, traffic trends, etc.

As with adaptive call/session allocation reservation control, the control of control the bit-rate allocation for new calls/sessions (allocated at their admission) could also be made to respond to network packet statistics. This approach is considered in Section 6.

4.1 Example Rate Allocation Control Actions and Policies

Some example actions and policies pertaining to actions for the control of bit-rate allocations made at each new call/session acceptance can include the following (as well as mixtures, variations, and feature combinations of these and others):

Admitting all new calls/session at higher bit rates when the network is lightly loaded with active calls/sessions and admitting all new calls/session at lower bit rates when the network is more heavily loaded with active calls/sessions.

Admitting all new calls/session at higher bit rates when the network is lightly loaded with active calls/sessions and admitting some new calls/session at lower bit rates when the network is more heavily loaded with active calls/sessions.

In cases where only some new calls/session are admitted at lower bit rates, the selection could be made according to:
i. round-robin w/ fixed duty cycle
ii. round-robin w/ variable duty cycle Admitting all new calls/sessions of certain types at higher bit rates when the network is lightly loaded with active calls/sessions and admitting all new calls/session of these certain types or classes at lower bit rates when the network is very heavily loaded with active calls/sessions (while admitting all new calls/sessions of other at higher bit rates when the network is lightly loaded with active calls/sessions and admitting some new calls/session at lower bit rates when the network is only somewhat heavily loaded with active calls/sessions)

As with the aforedescribed call/session adaptive (admission) reservations controllers, rate allocation control actions can include similar types of features, attributes and behaviors as described below.

4.2 Control as a Function of Active Call/Session State

As a first example implementation of call/session rate allocation control, the allocated rate can be changed as a function of the state. For example, conditional tests are performed on the values of current-state input, the outcome of the conditional tests causing the generation of a control message to change the bit rate allocated to new calls/sessions for at least one service until the next update.

4.3 Quantizing and Hysteresis

The number of rate allocation control messages can be reduced if the allowed bit rates are quantized in some way, for example from a list of standardized values, a list of conveniently spaced values, or according to a mathematical quantization function. The greater the level of this form of quantization, the less message flux required from the controller to the individual communications silos. In order to reduce the message flux from the controller to the individual communications silos, the quantization process is implemented in the controller. Another way to reduce the rate allocation control message flux is to employ hysteresis in the adjustment of the rate allocation for new calls/sessions for each affected service. In one example implementation, the hysteresis process introduces directional memory into the rate allocation adjustment process. In order to reduce the message flux from the controller to the individual communications silos, the hysteresis process is implemented in the controller. Yet other arrangements are possible, anticipated, and accordingly provided for by the invention.

4.4 Controller Dynamics Considerations

In the situations described thus far, the call/session request dynamics can cause the state to vary widely, so much so that only use of current state (i.e., the current number of active calls/sessions at a given instant) may result in both erratic behavior and a high flux of control messages. One approach to improve these shortcomings would be to include the rate-of-change of the state (i.e., the rate-of-change of the number of active calls/sessions at a given instant) as an input to the adaptive reservation controller. This allows, for example, the observance of high rates-of-change in the state (current number of active calls/sessions at a given instant) to cause anticipatory adjustments in relevant rate allocation settings.

In an example implementation, the rate-of-change measurement can be implemented as a simple difference between a previous state value and the current state value. In another example implementation, the rate-of-change measurement can be implemented as a more sophisticated numerical difference operator approximating a time-derivative (for example, multi-point stencil, difference quadrature, etc.).

In contrast to rate-of-change "time-derivative" controller input which produces anticipatory behavior, "time-integral" input can be used to produce lagging conservative influences in the response. More generally, a weighted combination of current-state input, rate-of-change "time-derivative" input, and "time-integral" input can be used to produce a response with more desirable dynamics. In the case of a linear controller, such an arrangement would correspond to a "Proportional/Integral/Derivative" or PID controller. The invention provides for use of linear PID controllers but also provides for the use of nonlinear PID controllers as advantageous in various applications. For example:

- In an example implementation, a linear PID controller (comprising separate weighting coefficients for current-state input, rate-of-change "time-derivative" input, and "time-integral" input) is arranged so that the weighting coefficients are adjusted as function of state (for example, with different anticipatory versus conservative lagging behaviors when the state is nearer resource limit and reservation boundaries than when the state is farther from resource limit and reservation boundaries;
- In another example implementation, conditional tests are performed on the values of current-state input and one or more of rate-of-change "time-derivative" input and "time-integral" input, the outcome of the conditional tests causing the generation of a control message to adjust bit rate allocations.

Many other dynamic control arrangements are possible and are provided for by the invention. For example, the controller can comprise one or more of:

- A linear predictor;
- A nonlinear predictor;
- A traditional Kalman (Gaussian) filter;
- A modified Kalman filter (for example, non-Gaussian)
- A time-driven ramp generator;
- A periodic or dithering function;
- A quantization process;
- A hysteresis process.

Yet other arrangements are possible, anticipated, and accordingly provided for by the invention.

4.5 Stochastic Model Considerations

In another approach, rate allocation control can include aspects structured around a model of the stochastic dynamics and/or statistics of the call/session arrival and departure processes. These can facilitate the advantage or need for providing the adaptive reservations controller with other types of input information. For example:

- In one example implementation, rate allocation control can comprise aspects specifically designed around mathematical expressions derived from models employing Markovian dynamics. In such an arrangement, it can be advantageous to provide the adaptive reservations controller with real-time estimates of arrival rates and holding times.
- As another example, an implementation of rate allocation control can comprise aspects based on Bayesian decision theory. In such an arrangement, it can be advantageous to provide the rate allocation control function with real-time estimates of various probability distributions with respect to a set of observations.
- As yet another example, an implementation of rate allocation control can comprise aspects based on time series data. In such an arrangement, it can be advantageous to provide the rate allocation control function with real-time estimates of various time series quantities with respect to a set of observations.
- As still another example, an implementation of rate allocation control can comprise aspects based on other types of models, for example UPC parameters. In such an arrangement, it can be advantageous to provide the rate allocation control function with real-time tabulations of various UPC parameter values and demographics with respect to the currently active calls/sessions.

Yet other arrangements are possible, anticipated, and accordingly provided for by the invention.

A number of rate adaption approaches can be employed by the invention, for example [Z1], [Z2], [Z3], [Z4].

5. Bandwidth Management at the Packet-Process (QoS) Level

It is noted that this section comprises material adapted from the teachings in pending provisional U.S. Patent Application 61/503,053 but which have been modified for mobile services to form integrative and synergetic aspects and capabilities along with other parts of the invention. Additional teachings applicable to the present invention are also to be found in pending provisional U.S. Patent Application 61/503, 053.

Despite the immense gap between envisioned and available QoS capabilities, the extremely wide range of possible QoS capabilities, and the possible extensive reach of QoS infrastructure (potentially threaded through applications, endpoint devices, operating systems, servers, network switches, routers, firewalls, and WANs), it is nonetheless possible to incorporate QoS generically into a broader bandwidth management control system as will be seen.

Just as the session/call admission and rate adaptation parameters can be governed by closed-loop feedback control environment so as to increase network performance towards the extreme limit possible by the policy to which the control system is optimized, a similar closed-loop feedback control environment can be applied to QoS parameters.

Figure 33:
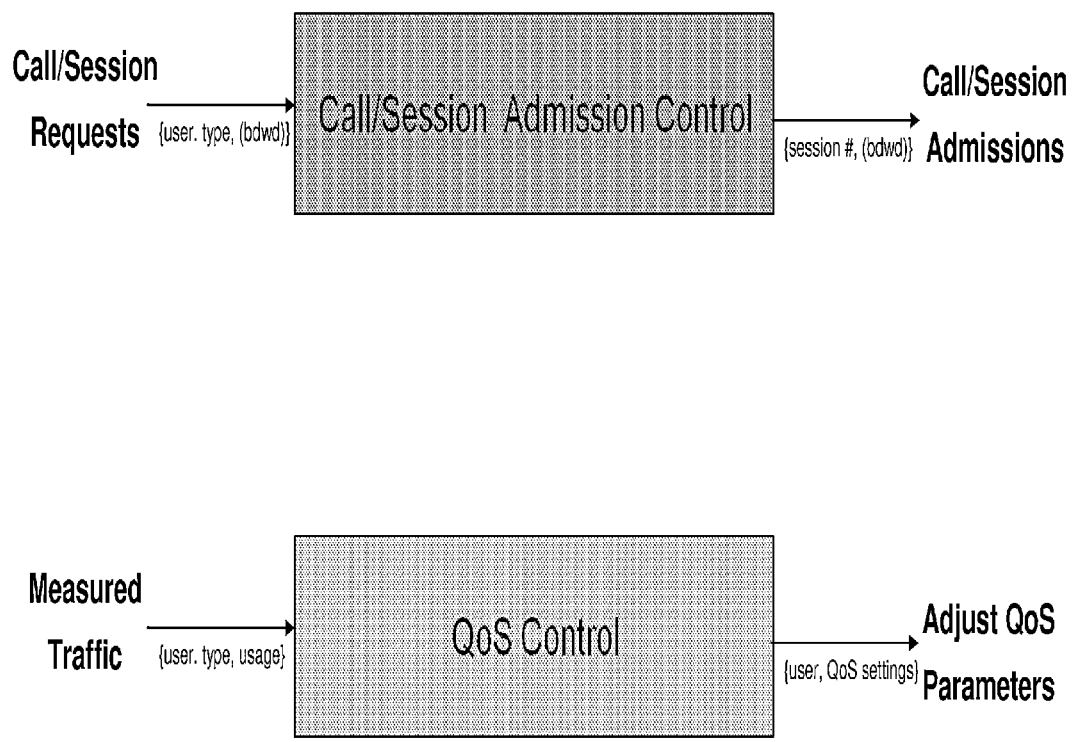
FIG. 33 depicts an example of a multiple-layer control implementation with no coordination between call/session admission control and QoS control.
Figure 34:
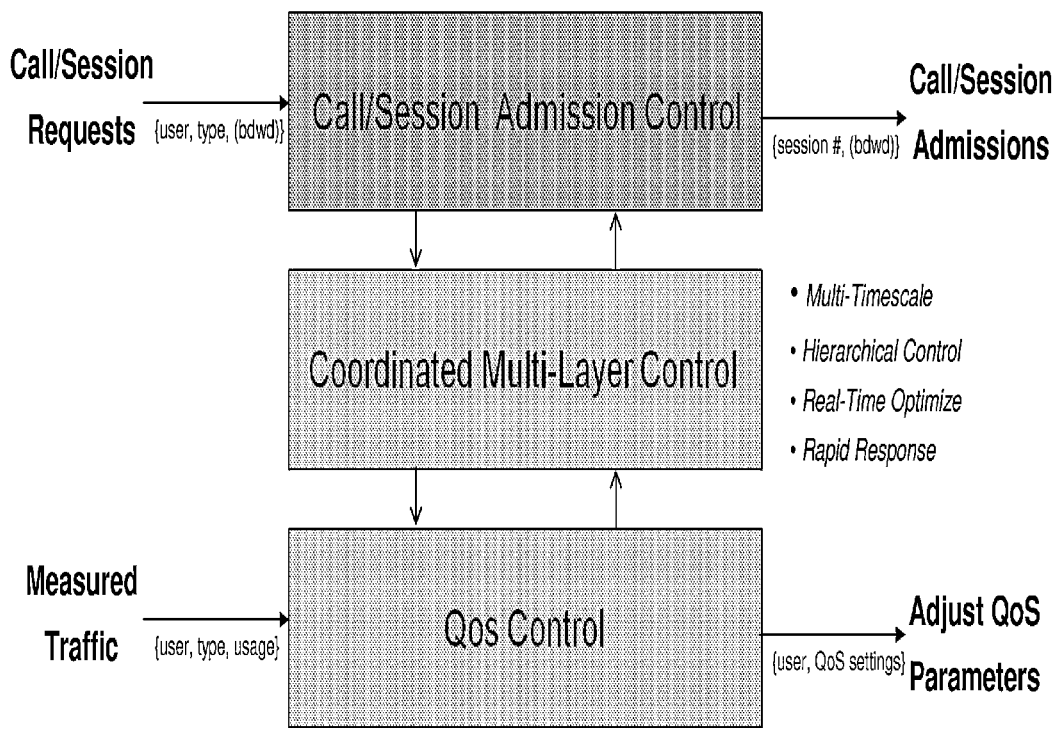
FIG. 34 depicts an example of a multiple-layer control implementation with coordination between call/session admission control and QoS control.

As described below, the present invention provides for combining closed-loop feedback control of session/call admission and rate adaptation parameters with closed-loop feedback control of QoS parameters. The combinations can be made in various ways, for example via a multiple-layer control implementation with no coordination between call/session admission control and QoS control (for example, as represented in FIG. 33), as addressed in this section. Alternatively a multiple-layer control implementation with coordination between call/session admission control and QoS control (for example, as represented in FIG. 34) can be used, as addressed in Section 6.

An immense amount of analytical, standards, and technology development work has been undertaken to explore the possibilities and capabilities of QoS for ATM and IP networks. On the technology development side, some QoS features are implemented to varying degrees in network products (such as IP switches) from major network equipment manufacturers. On the standards side, earlier QoS standards material developed for ATM is being repurposed for IP networks. Some aspects, such as some IPC parameters, suffer from definitions and concepts that present implementation difficulties in practical product offerings. On the analytical side, vast amounts of mathematical modeling, innovation, performance prediction, optimization, approximation, definitional, metric, simulation, and other work has been performed. This work was initially directed towards ATM and later repurposed, adapted, and continued for IP networks and more recently wireless and mobile networks. The creative solutions and mathematical prowess of these results are in many aspects truly astonishing and worthy of great praise. However, without any criticism or mount of prejudice, it has turned precious few of these results lend themselves to direct use in current network technology. Many of the wide range of analytical results have nonetheless made important contributions to the conceptual base, behavioral understanding, definitional rigor, intuition, and design principles. With full respect to all the far reaching work performed by all camps, one reference providing practical QoS implementation approaches in terms of contemporary product technology is the book by Miguel Barreiros and Peter Lundqvist entitled *QOS-Enabled Networks: Tools and Foundations* published 2010 by John Wiley & Sons, Ltd. [X4].

In practical QoS systems deployed in products from major network equipment manufacturers typically [X5, X6, X7] perform functions such as:
 Identification of individual traffic flows/classes/groups;
 Classification/reclassification these, for example:
  using DiffServ Code Point (DSCP) field in IP packets;
  using 802.1p Class of Service (CoS) field in Ethernet packets;
  source/destination IP or MAC address;
  Layer 4 Transmission Control Protocol (TCP)ports;
  User Datagram Protocol (UDP) ports;
 Policing incoming packets;
 Marking of incoming packets;
 Traffic Shaping;
 Rate Shaping;
 Assigned to an appropriate outgoing switch queue;
 Perform of scheduling input queue-servicing, for example:
  Weighted Round Robin (WRR) scheduling;
  Strict priority scheduling;
 Dynamic creation of new classes of service;
 Rate adaptation (in wireless 802.11 networking).

However, these provisions provided in contemporary networking products are typically performed responsive to associated configuration QoS parameter settings made (and on rare occasion adjusted) by network administrators and are not varied over time by a control system responsive to network traffic conditions. In contrast, the present invention provides for such QoS parameter settings to be varied over time by a control system responsive to network traffic conditions. Further, the actions taken by the afore-listed provisions provided in contemporary networking technology are (with the exception of rate adaptation) typically performed strictly within network-internal packet transport systems such as switches and routers. In contrast, the present invention provides for other QoS-related actions to be taken by applications in some instances where advantageous, A QoS parameter whose control has been studied and which at least conceptually involves QoS-related actions taken by applications to be varied over time responsive to network traffic conditions is rate adaptation as used in wireless 802.11 networks (wherein the bit rate of an active call/session is changed from the bit-rate value initially allocated to a new bit-rate value). The invention provides for including the variation of bit rate at an application by a control system wherein the variation is responsive to network traffic conditions. The invention further provides for a control system that combines real-time control of rate adaptation at applications together with real-time control of packet transport QoS parameters. In various situations it can be advantageous to control these together, selectively or in combination varying one or both of these over time responsive to network traffic conditions.

Yet further, the present invention provides for QoS-related actions taken by applications to be varied over time by a control system responsive to network traffic conditions. Aside from rate adaptation, this is not a direction taken by either the QoS community nor applications developers. However, such an approach could be useful in some situations, for example in real-time video encoding. In some circumstances it could be advantageous to only adjust QoS-related actions taken by applications and this is anticipated and provided for by the invention. In most circumstances, however, it would be more be advantageous for a common control system to vary both QoS parameters at applications and packet transport QoS parameters at network elements, varying these over time responsive to network traffic conditions.

5.1 Example QoS Control Actions and Policies

Some example actions and policies pertaining to actions for the control of QoS parameters can include the following (as well as mixtures, variations, and feature combinations of these and others):

Adjusting packet transport QoS parameters for calls/sessions operating at higher bit rates.

Adjusting packet transport QoS parameters for all calls/sessions of a particular service, class, or type.

Adjusting packet transport QoS parameters for only most recent calls/sessions of a particular service, class, or type when the network becomes loaded with active calls/sessions.

Admitting all new calls/session at higher bit rates when the network is lightly loaded with active calls/sessions and admitting some new calls/session at lower bit rates when the network is more heavily loaded with active calls/sessions.

In cases where only some packet flows and/or applications are to have QoS parameters adjusted, the selection could be made according to:
  i. round-robin w/ fixed duty cycle
  ii. round-robin w/ variable duty cycle

5.2 Control as a Function of Active Call/Session State

As a first example implementation of QoS parameter control (at network elements and/or at applications), QoS parameters can be changed as a function of the state. For example, conditional tests are performed on the values of current-state input, the outcome of the conditional tests causing the generation of a control message to change a QoS parameter until the next update.

5.3 Quantizing and Hysteresis

The number of QoS control messages can be reduced if the allowed bit rates are quantized in some way, for example from a list of standardized values, a list of conveniently spaced values, or according to a mathematical quantization function. The greater the level of this form of quantization, the less message flux required from the controller to the individual communications silos. In order to reduce the message flux from the controller to the individual communications silos, the quantization process is implemented in the controller. Another way to reduce QoS control message flux is to employ hysteresis in the adjustment of the rate allocation for new calls/sessions for each affected service. In one example implementation, the hysteresis process introduces directional memory into the rate allocation adjustment process. In order to reduce the message flux from the controller to the individual communications silos, the hysteresis process is implemented in the controller. Yet other arrangements are possible, anticipated, and accordingly provided for by the invention.

5.4 Controller Dynamics Considerations

In the situations described thus far, the call/session request dynamics can cause the state to vary widely, so much so that only use of current state (i.e., the current number of active calls/sessions at a given instant) may result in both erratic behavior and a high flux of control messages. One approach to improve these shortcomings would be to include the rate-of-change of the state (i.e., the rate-of-change of the number of active calls/sessions at a given instant) as an input to the adaptive reservation controller. This allows, for example, the observance of high rates-of-change in the state (current number of active calls/sessions at a given instant) to cause anticipatory adjustments in relevant QoS parameters.

In an example implementation, the rate-of-change measurement can be implemented as a simple difference between a previous state value and the current state value. In another example implementation, the rate-of-change measurement can be implemented as a more sophisticated numerical difference operator approximating a time-derivative (for example, multi-point stencil, difference quadrature, etc.).

In contrast to rate-of-change "time-derivative" controller input which produces anticipatory behavior, "time-integral" input can be used to produce lagging conservative influences in the response. More generally, a weighted combination of current-state input, rate-of-change "time-derivative" input, and "time-integral" input can be used to produce a response with more desirable dynamics. In the case of a linear controller, such an arrangement would correspond to a "Proportional/Integral/Derivative" or PID controller. The invention provides for use of linear PID controllers but also provides for the use of nonlinear PID controllers as advantageous in various applications. For example:

In an example implementation, a linear PID controller (comprising separate weighting coefficients for current-state input, rate-of-change "time-derivative" input, and "time-integral" input) is arranged so that the weighting coefficients are adjusted as function of state (for example, with different anticipatory versus conservative lagging behaviors when the state is nearer resource limit and reservation boundaries than when the state is farther from resource limit and reservation boundaries;

In another example implementation, conditional tests are performed on the values of current-state input and one or more of rate-of-change "time-derivative" input and "time-integral" input, the outcome of the conditional tests causing the generation of a control message to adjust bit rate allocations.

Many other dynamic control arrangements are possible and are provided for by the invention. For example, the controller can comprise one or more of:

A linear predictor;
A nonlinear predictor;
A traditional Kalman (Gaussian) filter;
A modified Kalman filter (for example, non-Gaussian)
A time-driven ramp generator;
A periodic or dithering function;
A quantization process;
A hysteresis process.

Yet other arrangements are possible, anticipated, and accordingly provided for by the invention.

5.5 Stochastic Model Considerations

In another approach, QoS parameter control (at network elements and/or at applications) can include aspects structured around a model of the stochastic dynamics and/or statistics of the call/session arrival and departure processes. These can facilitate the advantage or need for providing the adaptive reservations controller with other types of input information. For example:

In one example implementation, rate allocation control can comprise aspects specifically designed around mathematical expressions derived from models employing Markovian dynamics. In such an arrangement, it can be advantageous to provide a controller of QoS parameter control (at network elements and/or at applications) with real-time estimates of arrival rates and holding times.

As another example, an implementation of rate allocation control can comprise aspects based on Bayesian decision theory. In such an arrangement, it can be advantageous to provide the QoS control function with real-time estimates of various probability distributions with respect to a set of observations.

As yet another example, an implementation of rate allocation control can comprise aspects based on time series data. In such an arrangement, it can be advantageous to provide the QoS control function with real-time estimates of various time series quantities with respect to a set of observations.

As still another example, an implementation of QoS parameter control (at network elements and/or at applications) can comprise aspects based on other types of models, for example UPC parameters. In such an arrangement, it can be advantageous to provide the QoS control function with real-time tabulations of various UPC parameter values and demographics with respect to the currently active calls/sessions.

Yet other arrangements are possible, anticipated, and accordingly provided for by the invention.

6. Joint Bandwidth Management Control Spanning Both the Call/Session Allocation Level and Packet-Process (QoS) Level It is noted that this section comprises material adapted from the teachings in pending provisional U.S. Patent Application 61/503,053 but which have been modified for mobile services to form integrative and synergetic aspects and capabilities along with other parts of the invention. Additional teachings applicable to the present invention are also to be found in pending provisional U.S. Patent Application 61/503,053.

As mentioned before, the invention provides closed-loop feedback control of session/call admission parameters and packet-level process, for example by closed-loop feedback control of QoS parameters. In Section 7, closed-loop feedback control of session/call admission parameters is done in parallel and independently from the closed-loop feedback control of QoS parameters. The closed-loop feedback control of session/call admission parameters acts on a slower time-scale than the closed-loop feedback control of QoS parameters. Each of the two control systems can be separately optimized without coordination between them. Such an arrangement was depicted earlier as the example provided in FIG. 33.

In this section, the closed-loop feedback control of session/call admission parameters is done together with the closed-loop feedback control of network QoS parameters. Such a control system acts on two time-scales in a manner that permits a coordinated optimization of both course and fine structure of bandwidth allocation and utilization. Such an arrangement was depicted earlier as the example provided in FIG. 34.

Some examples of joint multiple-time-scale call/session and packet (QoS) closed-loop control include:

Control of rate adaptation (bit-rate of active calls/sessions after their admission, thus changing the bandwidth footprint of that particular active session/call) as a function of the number and type of active calls/sessions. For example, as traffic levels increase, various active sessions/calls are allocated less bandwidth.

Combined closed-loop feedback control of session/call admission, rate adaptation parameters, and network element QoS parameters.

Yet other arrangements are possible, anticipated, and accordingly provided for by the invention.

In principle, a number of methods can be used to construct a control system operating at two such differing time scales. These include but are not restricted to:

Abstracting the faster (packet) dynamics into statistical moments (averages, variances, etc.), extremal values, etc. to create control signals for slower (call/session) dynamics Abstracting the faster (packet) dynamics into extremal values to create control signals for slower (call/session) dynamics Abstracting the slower (call/session) dynamics to piecewise constant controls to the faster (packet) dynamics Use of rare events models Use of singular perturbation techniques Combinations of these among themselves and or with yet other techniques.

Yet other arrangements are possible, anticipated, and accordingly provided for by the invention.

6.1 Example Control Actions and Policies

Some example actions and policies pertaining to actions for the control of QoS parameters can include the following (as well as mixtures, variations, and feature combinations of these and others):

Adjusting packet transport QoS parameters for calls/sessions operating at higher bit rates.

Adjusting packet transport QoS parameters for all calls/sessions of a particular service, class, or type.

Adjusting packet transport QoS parameters for only most recent calls/sessions of a particular service, class, or type when the network becomes loaded with active calls/sessions.

Admitting all new calls/session at higher bit rates when the network is lightly loaded with active calls/sessions and admitting some new calls/session at lower bit rates when the network is more heavily loaded with active calls/sessions.

In cases where only some packet flows and/or applications are to have QoS parameters adjusted, the selection could be made according to:
  i. round-robin w/ fixed duty cycle
  ii. round-robin w/ variable duty cycle

6.2 Control as a Function of Active Call/Session State

As a first example implementation of QoS parameter control (at network elements and/or at applications), QoS parameters can be changed as a function of the state. For example, conditional tests are performed on the values of current-state input, the outcome of the conditional tests causing the generation of a control message to change a QoS parameter until the next update.

6.3 Quantizing and Hysteresis

The number of QoS control messages can be reduced if the allowed bit rates are quantized in some way, for example from a list of standardized values, a list of conveniently spaced values, or according to a mathematical quantization function. The greater the level of this form of quantization, the less message flux required from the controller to the individual communications silos. In order to reduce the message flux from the controller to the individual communications silos, the quantization process is implemented in the controller. Another way to reduce QoS control message flux is to employ hysteresis in the adjustment of the rate allocation for new calls/sessions for each affected service. In one example implementation, the hysteresis process introduces directional memory into the rate allocation adjustment process. In order to reduce the message flux from the controller to the individual communications silos, the hysteresis process is implemented in the controller. Yet other arrangements are possible, anticipated, and accordingly provided for by the invention.

6.4 Controller Dynamics Considerations

In the situations described thus far, the call/session request dynamics can cause the state to vary widely, so much so that only use of current state (i.e., the current number of active calls/sessions at a given instant) may result in both erratic behavior and a high flux of control messages. One approach to improve these shortcomings would be to include the rate-of-change of the state (i.e., the rate-of-change of the number of active calls/sessions at a given instant) as an input to the adaptive reservation controller. This allows, for example, the observance of high rates-of-change in the state (current number of active calls/sessions at a given instant) to cause anticipatory adjustments in relevant QoS parameters.

In an example implementation, the rate-of-change measurement can be implemented as a simple difference between a previous state value and the current state value. In another example implementation, the rate-of-change measurement can be implemented as a more sophisticated numerical difference operator approximating a time-derivative (for example, multi-point stencil, difference quadrature, etc.).

In contrast to rate-of-change "time-derivative" controller input which produces anticipatory behavior, "time-integral" input can be used to produce lagging conservative influences in the response. More generally, a weighted combination of current-state input, rate-of-change "time-derivative" input, and "time-integral" input can be used to produce a response with more desirable dynamics. In the case of a linear controller, such an arrangement would correspond to a "Proportional/Integral/Derivative" or PID controller. The invention provides for use of linear PID controllers but also provides for the use of nonlinear PID controllers as advantageous in various applications. For example:

- In an example implementation, a linear PID controller (comprising separate weighting coefficients for current-state input, rate-of-change "time-derivative" input, and "time-integral" input) is arranged so that the weighting coefficients are adjusted as function of state (for example, with different anticipatory versus conservative lagging behaviors when the state is nearer resource limit and reservation boundaries than when the state is farther from resource limit and reservation boundaries;
- In another example implementation, conditional tests are performed on the values of current-state input and one or more of rate-of-change "time-derivative" input and "time-integral" input, the outcome of the conditional tests causing the generation of a control message to adjust bit rate allocations.

Many other dynamic control arrangements are possible and are provided for by the invention. For example, the controller can comprise one or more of:

- A linear predictor;
- A nonlinear predictor;
- A traditional Kalman (Gaussian) filter;
- A modified Kalman filter (for example, non-Gaussian)
- A time-driven ramp generator;
- A periodic or dithering function;
- A quantization process;
- A hysteresis process.

Yet other arrangements are possible, anticipated, and accordingly provided for by the invention.

6.5 Stochastic Model Considerations

In another approach, QoS parameter control (at network elements and/or at applications) can include aspects structured around a model of the stochastic dynamics and/or statistics of the call/session arrival and departure processes. These can facilitate the advantage or need for providing the adaptive reservations controller with other types of input information. For example:

- In one example implementation, rate allocation control can comprise aspects specifically designed around mathematical expressions derived from models employing Markovian dynamics. In such an arrangement, it can be advantageous to provide a controller of QoS parameter control (at network elements and/or at applications) with real-time estimates of arrival rates and holding times.
- As another example, an implementation of rate allocation control can comprise aspects based on Bayesian decision theory. In such an arrangement, it can be advantageous to provide the QoS control function with real-time estimates of various probability distributions with respect to a set of observations.
- As yet another example, an implementation of rate allocation control can comprise aspects based on time series data. In such an arrangement, it can be advantageous to provide the QoS control function with real-time estimates of various time series quantities with respect to a set of observations.
- As still another example, an implementation of QoS parameter control (at network elements and/or at applications) can comprise aspects based on other types of models, for example UPC parameters. In such an arrangement, it can be advantageous to provide the QoS control function with real-time tabulations of various UPC parameter values and demographics with respect to the currently active calls/sessions.

Yet other arrangements are possible, anticipated, and accordingly provided for by the invention.

7. Including Resources Other than Bandwidth in Bandwidth Management in Call/Session Admissions The following provides material adapted from the teachings in pending U.S. patent application Ser. No. 12/828,145 which are modified for mobile services to form integrative and synergetic aspects and capabilities along with other parts of the invention.

In addition to network bandwidth allocations, many contemporary network-based computer and communications services, applications, and capabilities also involve the associated allocation of various types of communications processing resources such as (but not limited to):

- Protocol translating gateways (for example H.323/SIP gateways such as those taught in pending U.S. patent application Ser. No. 12/572,226),
- Signal transcoder Banks (for example H.263/Flash, H.263/Quicktime, etc.),
- Network firewalls,
- Conference bridges (a.k.a. "MCUs"),
- Media stream encryption engines.

as well as other types of server-based assets such as those residing on (but not limited to):

- Video storage servers
- Media processing servers
- Interactive map and GIS servers
- Network-hosted application servers.

Using the simplified abstracted representation of FIG. 13b as the point of departure, the present invention is directed to expanding at least two capabilities of the control environment provided by the exemplary Unified Bandwidth Manager features and embodiments taught in pending U.S. patent application Ser. No. 12/572,226, namely:

- assistance to human-operator control, and
- automatic control.

Figure 35:
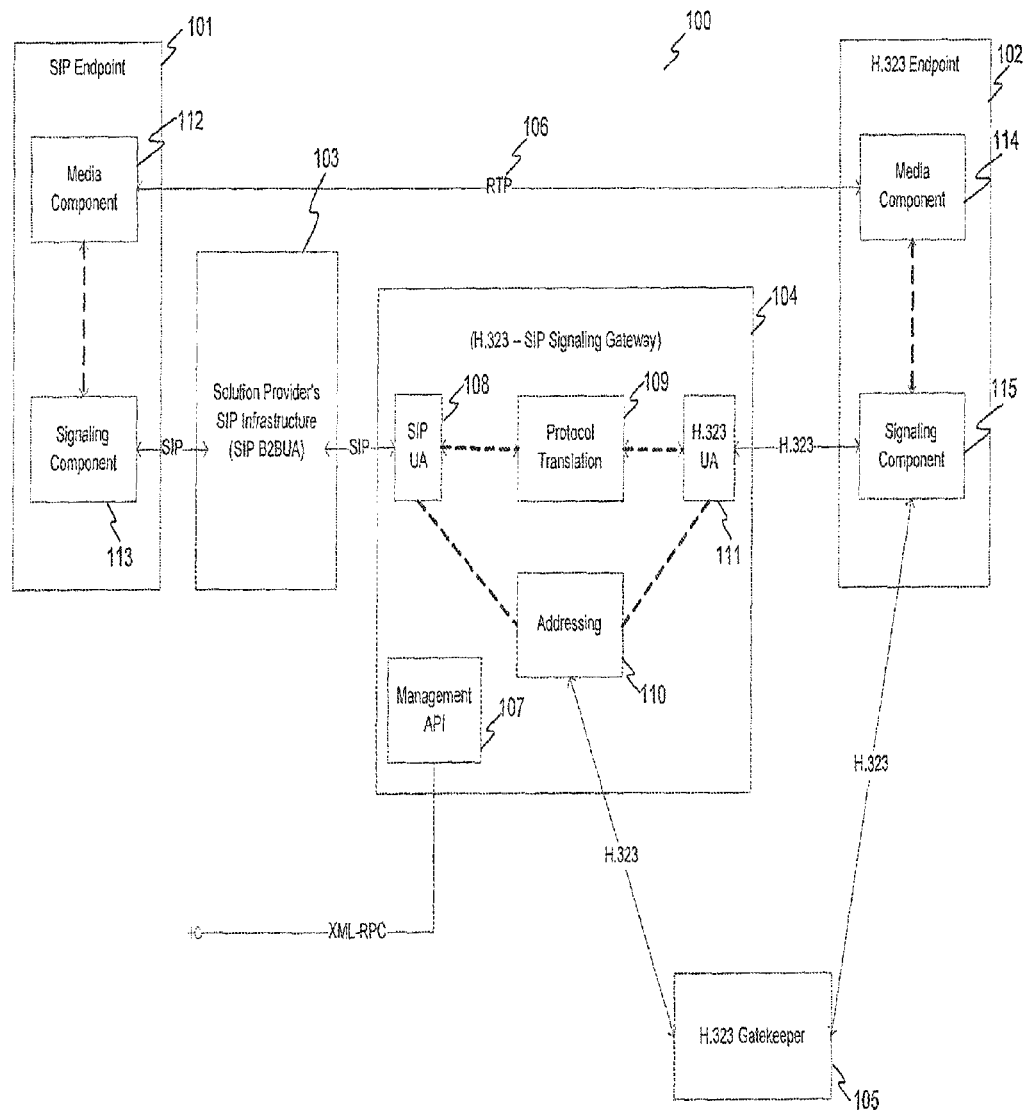
FIG. 35 depicts an example implementation of a SIP/H.323 protocol gateway as taught in pending U.S. patent application Ser. No. 12/572,226

Within these the present invention provides for the inclusion of associated "network communications processing" resources such as (but not limited to):

- Protocol translating gateways (for example H.323/SIP gateways such as those taught in pending U.S. patent application Ser. No. 12/572,226 and depicted in FIG. 35),
- Signal transcoder banks (for example H.263/Flash, H.263/Quicktime, etc.),
- Network firewalls,
- Conference bridges (a.k.a. "MCUs"),
- Media stream encryption engines.

Additionally, the systems and methods can be extended to other types of server-based assets such as those residing on (but not limited to):

Video storage servers

Media processing servers

Interactive map and GIS servers

Network-hosted application servers.

Again, each of the lists and associate remarks provided above are merely exemplary and are not to be taken as limiting.

In an embodiment, the invention provides for bandwidth associated multi-service resource management systems such as those taught in pending U.S. patent application Ser. No. 12/828,145 to support aspects of highly scalable multi-service environments comprising video for mobile devices.

Figure 36:
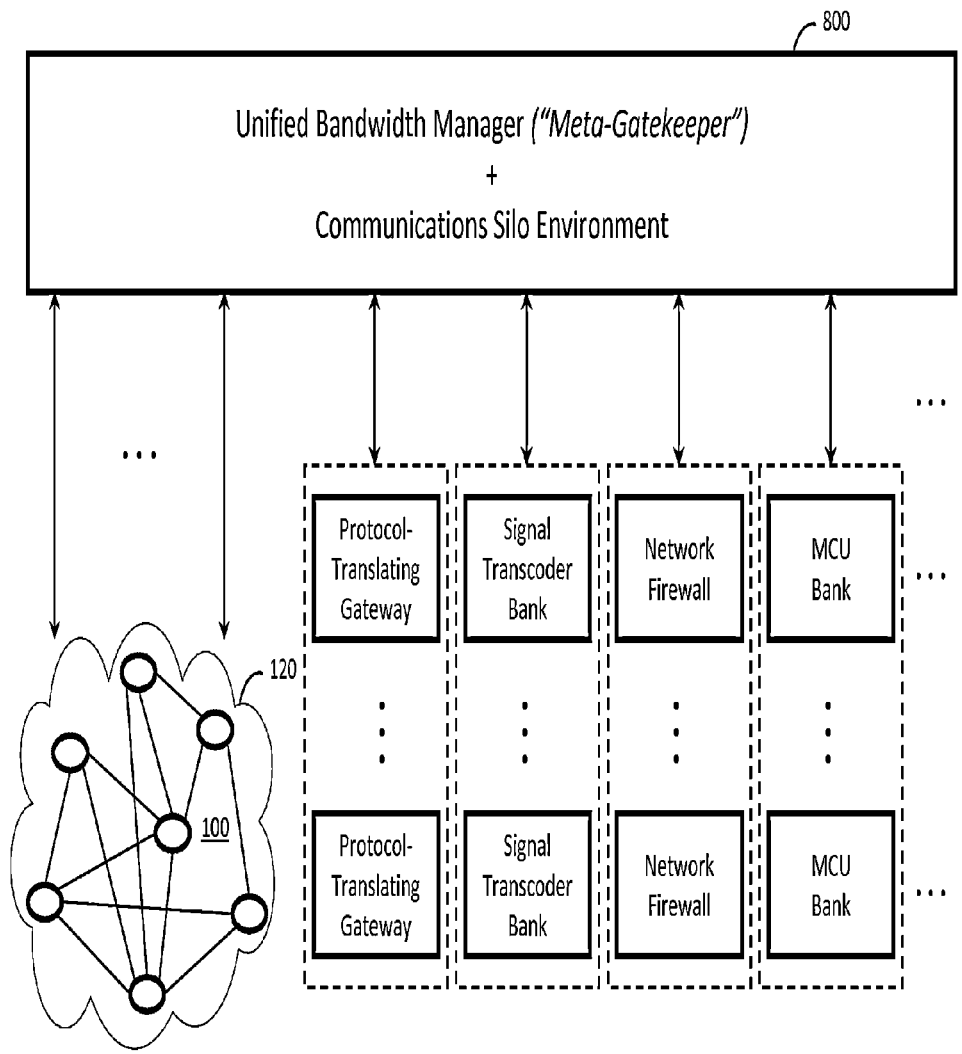
FIG. 36 depicts an exemplary arrangement augmenting the exemplary arrangement depicted in FIG. 13b in an exemplary manner provided for by the invention.

FIG. 36 depicts an exemplary arrangement augmenting the exemplary arrangement depicted in FIG. 13b in an exemplary manner provided for by the invention. In this exemplary arrangement, servers or other configurations provide for instances of:

Protocol translating gateways sessions

Signal transcoder sessions

Network firewall traversal sessions

Conference bridges (a.k.a. "MCUs") sessions.

The depicted collection of gateways, banks, firewalls, etc. is merely exemplary—any of the above can be omitted or replaced with other types of network communications processing resources and/or server-based assets, for example (but not limited to):

Media stream encryption sessions

Video storage server sessions

Media processing server sessions

Interactive map server sessions

GIS server sessions

Network-hosted application server sessions.

Additionally, the depicted collection need not have pluralities of gateways, banks, firewalls, etc., but can have one instance, that instance capable of providing a plurality of sessions. A contemporary network-based computer and communications service, application, or capability can request or require bandwidth allocations and additionally at least one associated allocation of a communications processing resource such as those listed above. The invention provides for at least some of these allocations to be directly or indirectly controlled by an expanded version 800 of the combined Unified Bandwidth Manager and Communications Silo Environment entity 700 of FIG. 13b.

Figure 37:
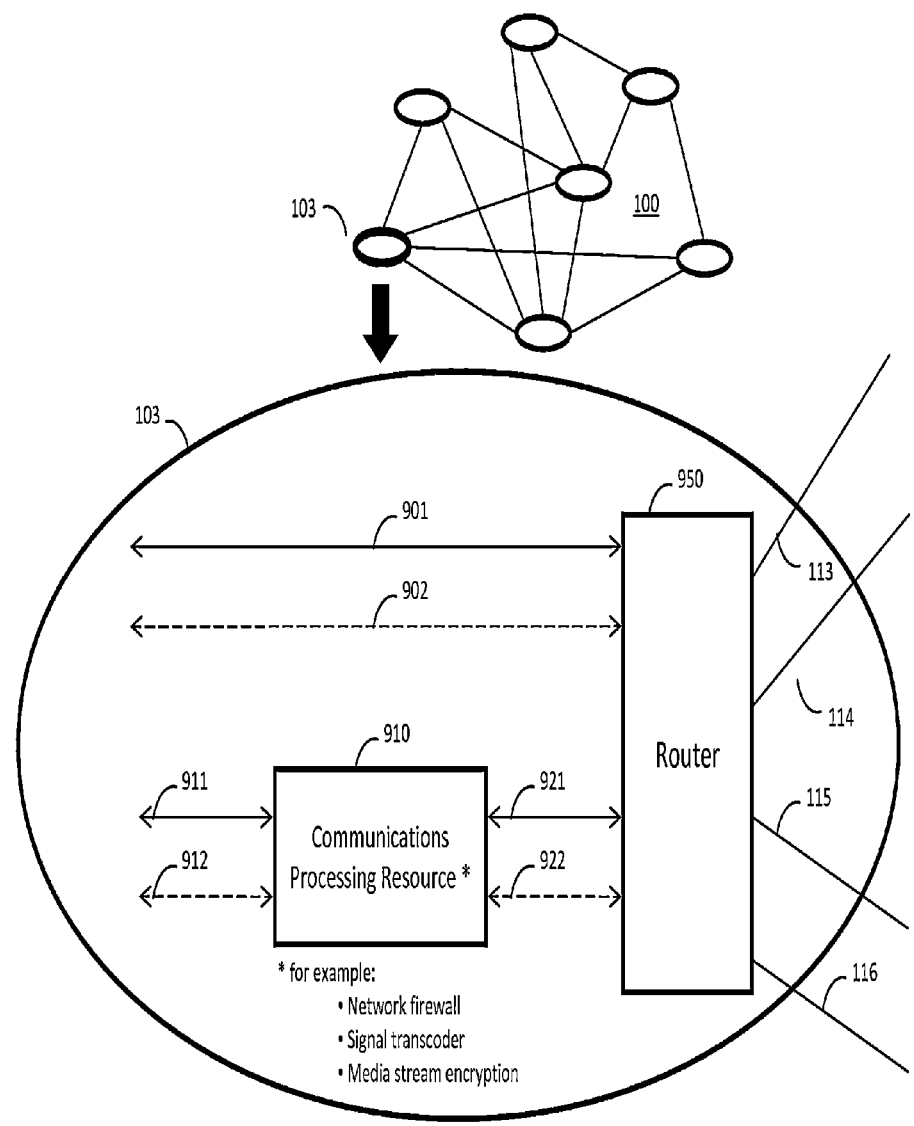
FIG. 37 depicts an example where an exemplary node within an exemplary mobile communications network comprises a router linking network data flows inside the node with network data flows outside the node.

FIG. 37 depicts an example where an exemplary node 103 within an exemplary mobile communications network 100 comprises a router 950 linking network data flows inside the node (for example 901, 902, 911, 912, 921, 922) with network data flows outside the node (for example 113, 114, 115, 116). In the example of FIG. 37, some network data flows 901, 911, 921 (denoted as solid lines) are under the (direct or indirect) bandwidth allocation control of the combined Unified Bandwidth Manager and Communications Silo Environment entity 800, while other network data flows 902, 912, 922 (denoted as dashed lines) are not under the (direct or indirect) bandwidth allocation control of the combined Unified Bandwidth Manager and Communications Silo Environment entity 800. Of the network data flows 901, 911, 921 under (direct or indirect) bandwidth allocation control by the combined Unified Bandwidth Manager and Communications Silo Environment entity 800, some 901 transact directly with the router as inherent, as option, as fall-back, etc. in the a given first individual or first collection of network-based computer and communications service(s), application(s), or capability(ies). Other network data flows 911 under (direct or indirect) bandwidth allocation control by the combined Unified Bandwidth Manager and Communications Silo Environment entity 800 involve action of a session provided by a communications processing resource 910 before or after the router 950 and have an associated corresponding network flow 921 between the communications processing resource 910 and the router 950. In some situations, implementations, or embodiments provided for by the invention, the communications processing resource 910 additionally can support network flows 912, 922 not under (direct or indirect) bandwidth allocation control by the combined Unified Bandwidth Manager and Communications Silo Environment entity 800. The communications processing resource 910 depicted in FIG. 37 can, for example, provide one or more of a network firewall traversal session, a signal transcoding session, a media stream encryption session among many other possibilities as suggested above.

For the example considered here, a bandwidth allocation for network flow 901 does not require a session allocation of the communications processing resource 910, but a bandwidth allocation for network flow 911 does require a session allocation of the communications processing resource 910 as well as a bandwidth allocation for the collateral network flow 921. The communications processing resource 910 will provide up to a maximum number of simultaneous sessions. In some cases, the maximum number of simultaneous sessions can be somewhat variable, driven by computational loading for example. More commonly, the maximum number of simultaneous sessions is a fixed value implemented in the software of the communications processing resource 910. For example:

A transcoder server can only permit a maximum number of simultaneous VoIP and/or Video transcoding sessions;

A network firewall can only permit a maximum number of simultaneous VoIP and/or Video traversal sessions;

A media stream encryption server can only permit a maximum number of simultaneous VoIP and/or Video encryption sessions.

Additionally, albeit for different reasons, implementations of a protocol translating gateway can only permit a maximum number of sessions even though such a gateway is not actively handling media flows.

Exemplary Unified Bandwidth Manager features and embodiments taught in pending U.S. patent application Ser. No. 12/572,226 provide for control systems and human operator modeling tools leveraging a multiservice blocking model. Because of the typical statistics of sessions and properties of the associated aggregated request traffic, the aggregated service requests advantageously closely conform to a Poisson arrival process. Session statistics also typically lead to exponential holding times, although this is not strictly required for the resulting stochastic dynamics to behave as a product-form network. The resulting dynamics have the both remarkable property that if system behavior can be structured in such a fashion as to truncate the state-space, the remaining permitted states and state-transitions maintain their relative probability ratios and thus the resulting dynamics only requires calculation of the normalization factor. This normalization factor is calculated by summing all of the relative probabilities assuming any normalization and finding the normalization factor (for example reciprocal of the sum) that cause the sums of all probabilities to equal a value of 1. This can advantageously exploited in the present invention by structuring the allocations of sessions from communications processing resources (such as element 910 in FIG. 37) so as to impose a truncation on the product-form state space in such a way that the probabilities for the permitted states and/or state-transitions can be explicitly algebraically summed and used to solve for the factor needed to normalize the state and/or state-transition probabilities.

As a result, the system and method of the present invention allow for inclusion of associated communications processing resources along with bandwidth allocations. The system and method of the present invention thus delivers a powerful enhancement to the exemplary Unified Bandwidth Manager features and embodiments taught in pending U.S. patent application Ser. No. 12/572,226.

Figure 38:
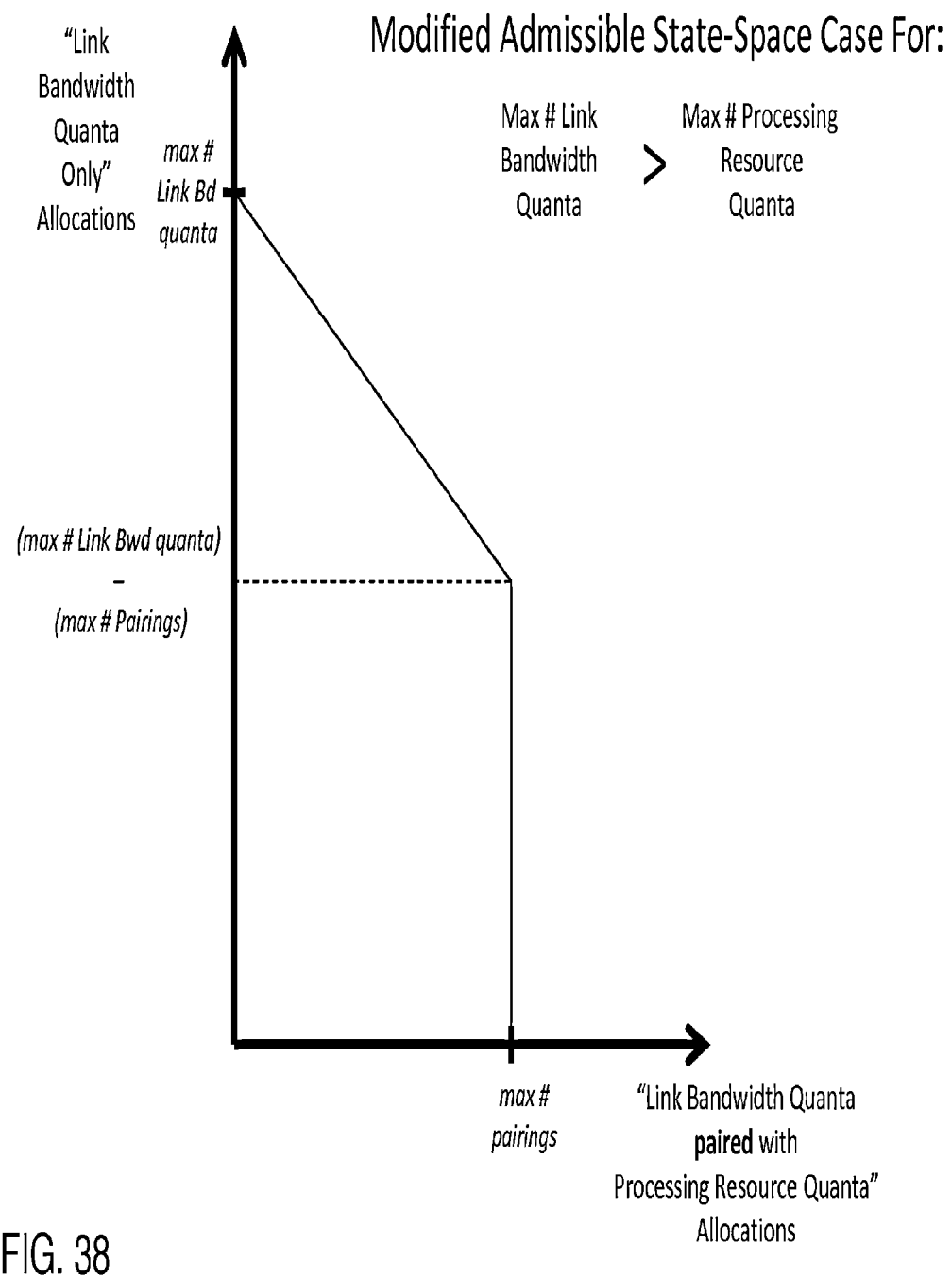
FIG. 38 shows exemplary state-space modifications and/or truncations of the product-form state-space and/or state-transitions.

Additionally, these powerful new features are added by simply "tapping into" the control and modeling framework taught in pending U.S. patent application Ser. No. 12/572,226 with state-space modifications (for example, addition of an additional vector space coordinate) and/or truncations of the product-form state-space and/or state-transitions. FIG. 38 shows exemplary state-space modifications (which may or may not be necessary, depending on the starting point) and/or truncations of the product-form state-space and/or state-transitions).

In this example, the given service, application, etc. (for example, a VoIP call, video call, etc.) is assumed to require an allocation of a uniform-sized "quanta" of bandwidth. This quanta can, for example, be fixed, represent an average, or be a function of an average together with higher statistical moments of underlying packet traffic. Some instances (for example VoIP call, video call) can require a communications processing resource (such as element 910 in FIG. 37) session while others do not. For this particular example, one could pair the session of communications processing resource session with the associated bandwidth allocation. In some situations this can include an added bandwidth element (for example, recognizing the extra bandwidth required by the pair of flows 911 and 921 as compared to the flow 901). FIG. 38 shows a case wherein the maximum number of bandwidth quanta is larger than the number of sessions made available by the communications processing resource. If further, for example, there is only one bandwidth quanta used in each session pairing, one could envision the following example:

One bandwidth quanta used in each session pairing
Max of 10 pairings (horizontal state-space axis)
Max of 16 bandwidth quanta
The state-space truncation is then governed by the following:
If there are no requests for pairings, then all 16 bandwidth quanta are available for non-pairing call allocations.
For each pairing allocated, there is one fewer bandwidth quanta available for non-pairing call allocations.
If all ten pairings are allocated, no more pairings are possible and only 6 bandwidth quanta are available for non-pairing call allocations.

Thus the truncated state space has the shape depicted in FIG. 38. Variations of the assumptions result in associated variations, for example the location of the extremal vertex, slope of the lines, etc. Similarly, for more complex arrangements, a higher-order vector space is used in the product-form state space, and the truncation boundary is a convex hull.

In an embodiment, the invention provides for adaptations of protocol gateways and transcoders to support aspects of highly scalable multi-service environments comprising video for mobile devices. In an embodiment, the invention provides for adaptations of video multipoint bridges to support aspects of highly scalable multi-service environments comprising video for mobile devices. In an embodiment, the invention provides for adaptations of real-time data collaboration to support aspects of highly scalable multi-service environment for mobile devices. In an embodiment, the invention provides for adaptations of real-time data collaboration multipoint bridges to support aspects of highly scalable multi-service environments comprising video for mobile devices.

8. Adapting Thin-Client AV Methods and Systems to Mobile Networks

In an embodiment, the invention provides for adaptations of thin-client AV methods and systems, such as taught in pending U.S. patent application Ser. Nos. 12/828,249 and Ser. No. 12/828,253, to support aspects of highly scalable multi-service environments comprising video for mobile devices. Attention is again directed to FIG. 6 which depicts adaptations and combinations of multiservice bandwidth management technology, AN gateway technologies, and thin-client A/V technologies to create multiservice mobile networks and devices supporting 2-way video. Although many aspects of the aforementioned thin-client technology can be applied to mobile communications, a first aspect of particular interest is multi-component partitioning capabilities. A second aspect of particular interest is auto-dividing capabilities.

Closing

The terms "certain embodiments", "an embodiment", "embodiment", "embodiments", "the embodiment", "the embodiments", "one or more embodiments", "some embodiments", and "one embodiment" mean one or more (but not all) embodiments unless expressly specified otherwise. The terms "including", "comprising", "having" and variations thereof mean "including but not limited to", unless expressly specified otherwise. The enumerated listing of items does not imply that any or all of the items are mutually exclusive, unless expressly specified otherwise. The terms "a", "an" and "the" mean "one or more", unless expressly specified otherwise.

While the invention has been described in detail with reference to disclosed embodiments, various modifications within the scope of the invention will be apparent to those of ordinary skill in this technological field. It is to be appreciated that features described with respect to one embodiment typically can be applied to other embodiments without departing from the spirit or scope of the invention. It is to be appreciated that features described with respect to one embodiment typically may be applied to other embodiments. It is intended that the specification and examples be considered as exemplary only, with the true scope and spirit of the invention being indicated by the following claims.

The invention can be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

Although exemplary embodiments have been provided in detail, various changes, substitutions and alternations could be made thereto without departing from spirit and scope of the disclosed subject matter as defined by the appended claims. Variations described for the embodiments may be realized singly or in any combination desirable for each particular application. Thus particular limitations and embodiment enhancements described herein, which may have particular advantages to a particular application, need not be used for all applications. Also, not all limitations need be implemented in methods, systems, and apparatuses including one or more concepts described with relation to the provided embodiments. Therefore, the invention properly is to be construed with reference to the claims.

References

[X1] L. Ludwig, "Adaptive Links—A Methodology for Dynamic Bandwidth Allocation," *Proc. 6th International Conference on Computer Communications*, London, September 1982.

[X2] J. S. Kaufman, "Blocking in a Shared Resource Environment," *IEEE Transactions on Communications*, vol. COM-29, No. 10, October 1981 pp. 1474-1481.

[X3] K. W. Ross, *Multiservice Loss Models for Broadband Telecommunication Networks*, Springer, 1995, ISBN 3-540-19918-7.

[X4] Miguel Barreiros and Peter Lundqvist, *QOS-Enabled Networks: Tools and Foundations*, John Wiley & Sons, Ltd, 2010 (ISBN-10 0470686979; ISBN-13 978-0-470-68697-3).

[X5] Cisco Systems, "Cisco Catalyst 2950 Series Switches with Enhanced Image SW" htt://www.cisco.com/en/US/prod/collateral/switches/ps5718/ps628/product_data_sheet09186a00801cfb64_ps6558_Products_Data_Sheet.html (visited Jun. 29, 2011).

[X6] Juniper Networks, "EX Server Ethernet Switches: QoS Enabling the Enterprise," http://www.juniper.net/us/en/local/pdf/whitepapers/2000255-en.pdf (visited Jun. 29, 2011).

[X7] Juniper Networks, "JUNOSe Policy and QoS Configuration Guide—Configuring Quality of Service," http://www.juniper.net/techpubs/software/erx/junose61/swconfig-policy-qos/frameset.htm (visited Jun. 29, 2011).

[Z1] Zhang, Wu, Lui, "Stability and sensitivity for congestion control in wireless mesh networks with time varying link capacities," *Ad Hoc Networks*, Volume 5, Issue 6 (August 2007) Pages: 769-785.

[Z2] Siris, Triantafyllidou, "Seamless Congestion Control over Wired and Wireless IEEE 802.11 Networks," Wireless IEEE 802.11 Networks. Proc. of Networking, 2004.

[Z3] Acharya, et al., "Congestion-Aware Rate Adaptation in Wireless Networks: A Measurement-Driven Approach," 2007.

[Z4] Zhu, Han, Girod, "Congestion-Aware Rate Allocation For Multipath Video Streaming . . . ," *IEEE International Conference on Image Processing*, 2004.

What is claimed is:

1. A bandwidth management system for multiple-service mobile networks for use with a plurality of instances of mobile communications devices, the bandwidth management system comprising:

At least one first interface, the at least one first interface for receiving call/session state information from a plurality of communications silos using a mobile network, each communications silo providing at least one communications service;

At least one second interface, the at least one second interface for transmitting control messages to the plurality of communications silos, the control messages comprising call/session admission control settings and application QoS parameter settings;

At least one network monitor for measuring packet-level network transport and producing packet-level network transport measurement information responsive to packet-level network transport processes in the mobile network;

At least one control system in communications with the at least first and second interfaces, the control system for performing computations responsive to the received call/session state information and packet-level network transport measurement information, the control system producing the control messages to be transmitted to the plurality of communications silos;

wherein the control system controls both call/session admission control settings and application QoS parameter settings responsive to call/session state information and packet-level network transport measurement information.

2. The bandwidth management system of claim 1 wherein the at least one communications service from at least one communications silo involves a high-bandwidth communication.

* * * * *